(12) United States Patent
Lai et al.

(10) Patent No.: US 11,418,510 B2
(45) Date of Patent: Aug. 16, 2022

(54) SYSTEMS, METHODS, AND APPARATUSES FOR IMPLEMENTING A ROLE BASED ACCESS CONTROL AND AUTHORIZATION VALIDATOR VIA BLOCKCHAIN SMART CONTRACT EXECUTION USING DISTRIBUTED LEDGER TECHNOLOGY (DLT)

(71) Applicant: salesforce.com, inc., San Francisco, CA (US)

(72) Inventors: Brian Lai, Dublin, CA (US); Mohan Pindyala, San Francisco, CA (US); Raviprakash Ramanujam, San Francisco, CA (US); Peizan Wang, San Francisco, CA (US)

(73) Assignee: salesforce.com, inc.

( * ) Notice: Subject to any disclaimer, the term of this patent is extended or adjusted under 35 U.S.C. 154(b) by 353 days.

(21) Appl. No.: 16/777,304

(22) Filed: Jan. 30, 2020

(65) Prior Publication Data

US 2020/0344233 A1 Oct. 29, 2020

Related U.S. Application Data

(60) Provisional application No. 62/840,070, filed on Apr. 29, 2019.

(51) Int. Cl.
*H04L 29/06* (2006.01)
*H04L 9/40* (2022.01)
(Continued)

(52) U.S. Cl.
CPC .............. *H04L 63/101* (2013.01); *G06F 9/54* (2013.01); *G06F 16/2379* (2019.01);
(Continued)

(58) Field of Classification Search
None
See application file for complete search history.

(56) References Cited

U.S. PATENT DOCUMENTS

| 9,935,772 | B1 * | 4/2018 | Madisetti | H04L 9/0891 |
| 2022/0021711 | A1 * | 1/2022 | Marsh | H04L 9/3239 |

FOREIGN PATENT DOCUMENTS

WO WO-2019215040 A1 * 11/2019 ......... G06F 16/9035

* cited by examiner

*Primary Examiner* — Andrew J Steinle
(74) *Attorney, Agent, or Firm* — Elliott, Ostrander & Preston, P.C.

(57) ABSTRACT

Described herein are means for implementing a role based access control and authorization validator via blockchain smart contract execution using Distributed Ledger Technology (DLT) in conjunction with a cloud based computing environment. According to a particular embodiment, there is a system having at least a processor and a memory therein, wherein the system is configurable with means for: operating a blockchain interface to a public blockchain on behalf of a plurality of customers of the host organization, wherein each of the plurality of customers operate as a participating node on the blockchain; executing an API gateway on behalf of the plurality of customers; receiving an API definition from one of the plurality of customers defining at least access permissions for use of the defined API and a plurality of permitted functions for the defined API; transacting a new asset onto the blockchain having embodied therein, metadata representing the API definition and the access permissions for use of the defined API and the plurality of permitted functions for the defined API; intercepting, via the executing API gateway, an API call directed at the defined API; retrieving the metadata from the blockchain; authenticating an API caller associated with the API call based on the access permissions from the retrieved metadata; and (Continued)

forwarding the API call to the appropriate customer pursuant to successful authentication of the API caller. Other related embodiments are disclosed.

22 Claims, 33 Drawing Sheets

(51) Int. Cl.
    *G06Q 20/36*     (2012.01)
    *G06F 9/54*     (2006.01)
    *G06F 16/23*     (2019.01)
    *G06F 16/27*     (2019.01)
    *G06Q 10/10*     (2012.01)
    *G06Q 20/08*     (2012.01)
    *G06Q 20/40*     (2012.01)
    *G06Q 20/06*     (2012.01)
    *H04W 4/70*     (2018.01)
    *H04L 9/06*     (2006.01)

(52) U.S. Cl.
    CPC .............. *G06F 16/27* (2019.01); *G06Q 10/10* (2013.01); *G06Q 20/065* (2013.01); *G06Q 20/0855* (2013.01); *G06Q 20/3676* (2013.01); *G06Q 20/405* (2013.01); *G06Q 20/4014* (2013.01); *H04L 9/0637* (2013.01); *H04L 9/0643* (2013.01); *H04W 4/70* (2018.02); *G06Q 2220/00* (2013.01); *H04L 2209/38* (2013.01); *H04L 2209/56* (2013.01)

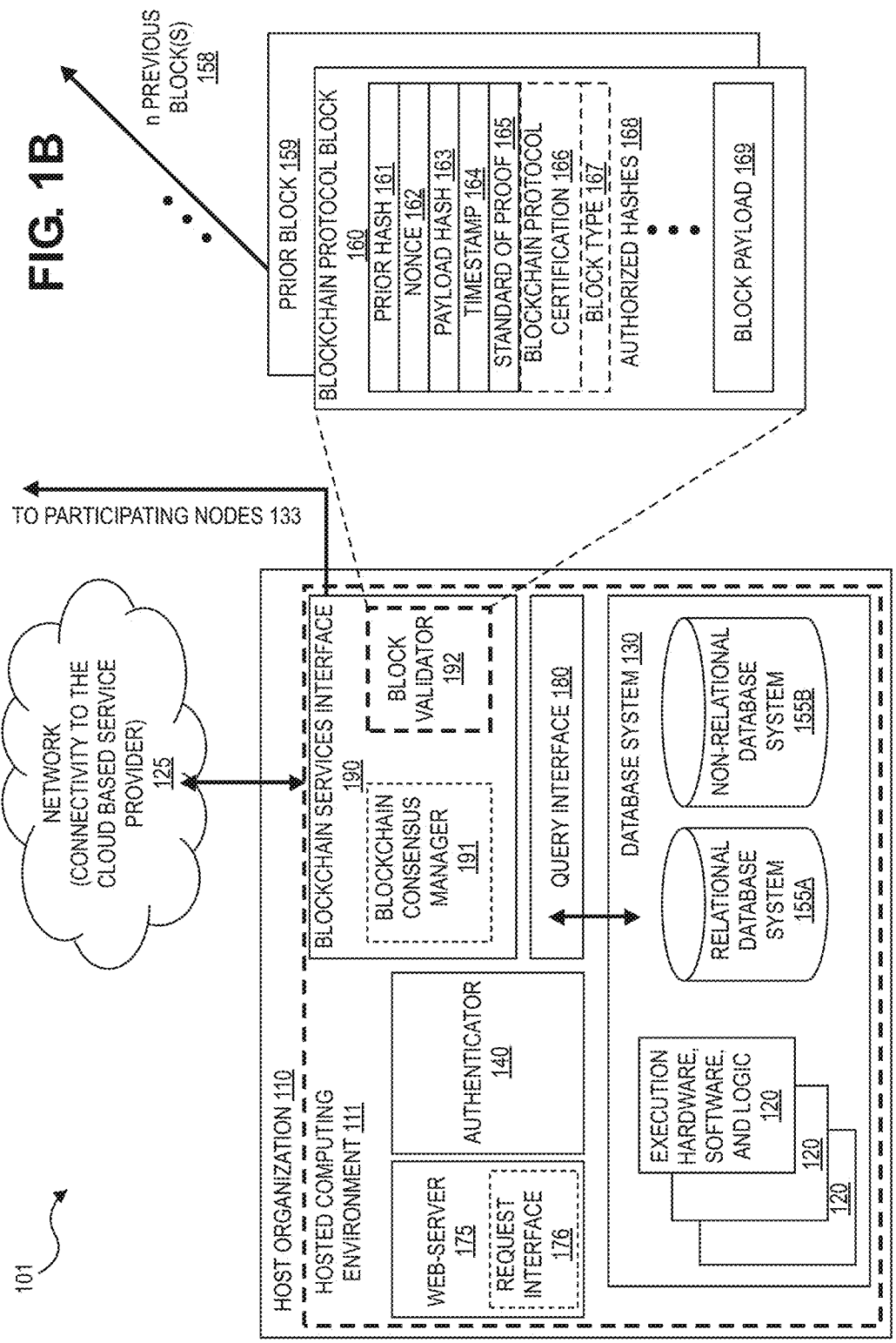

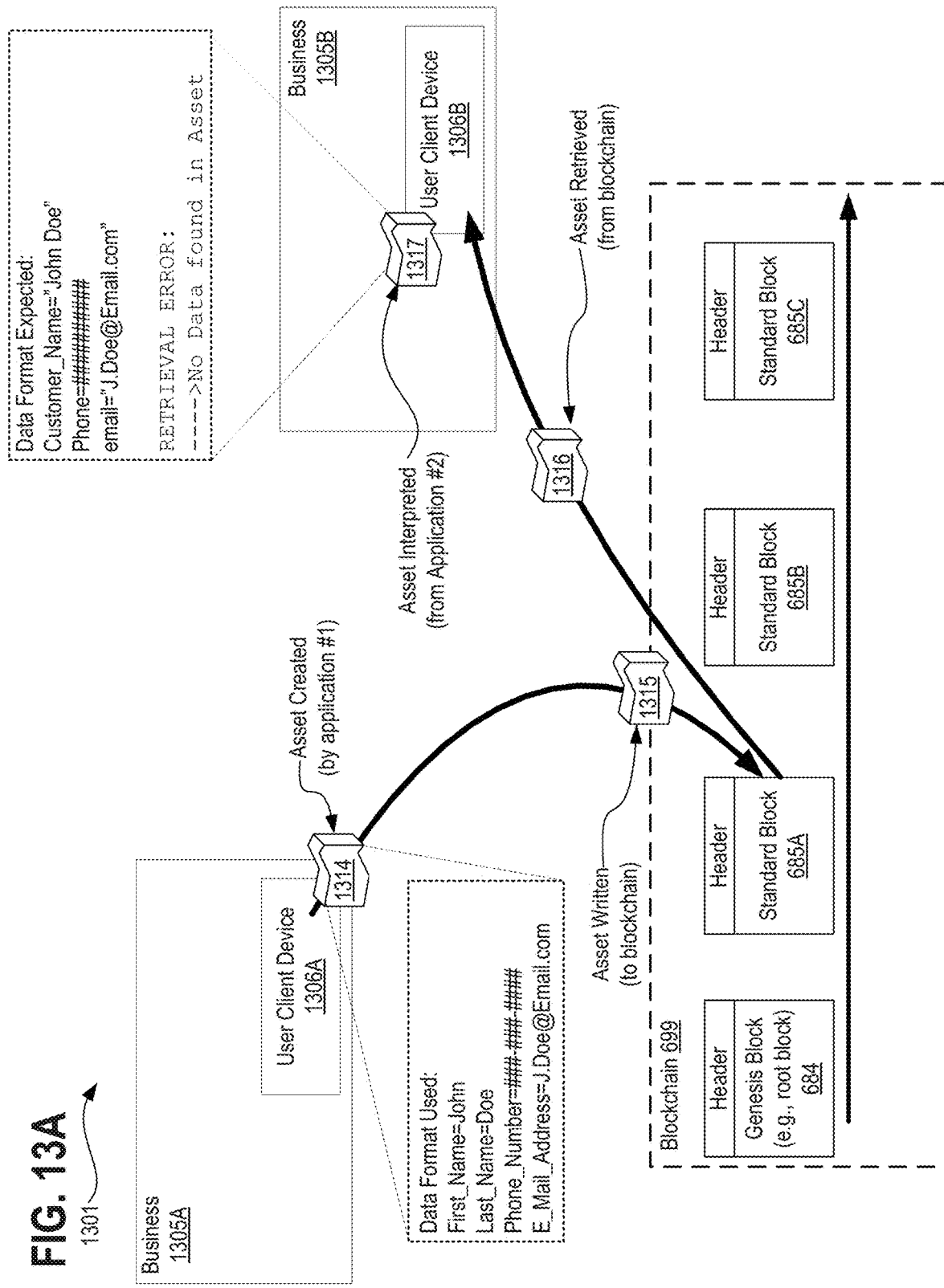

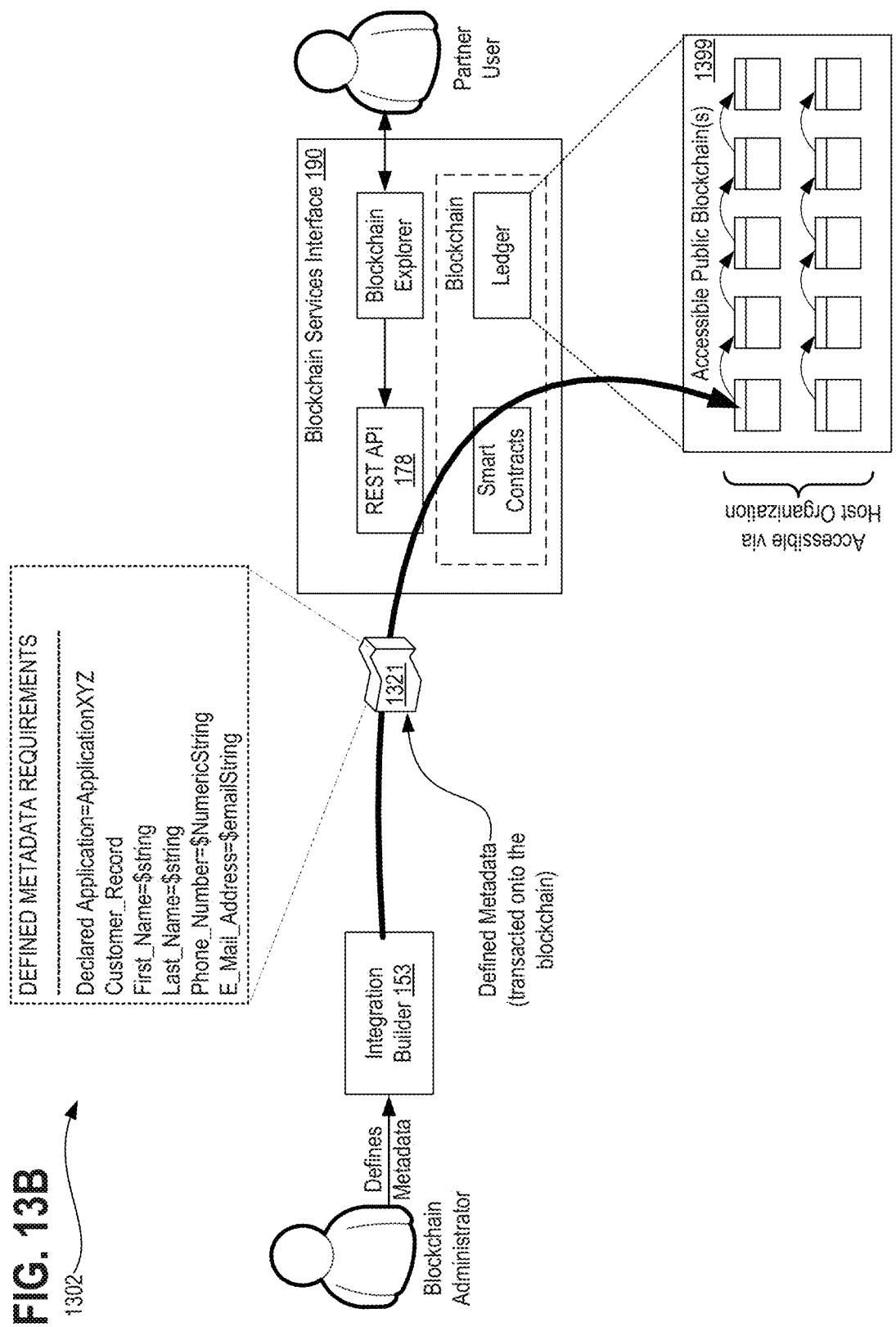

1401

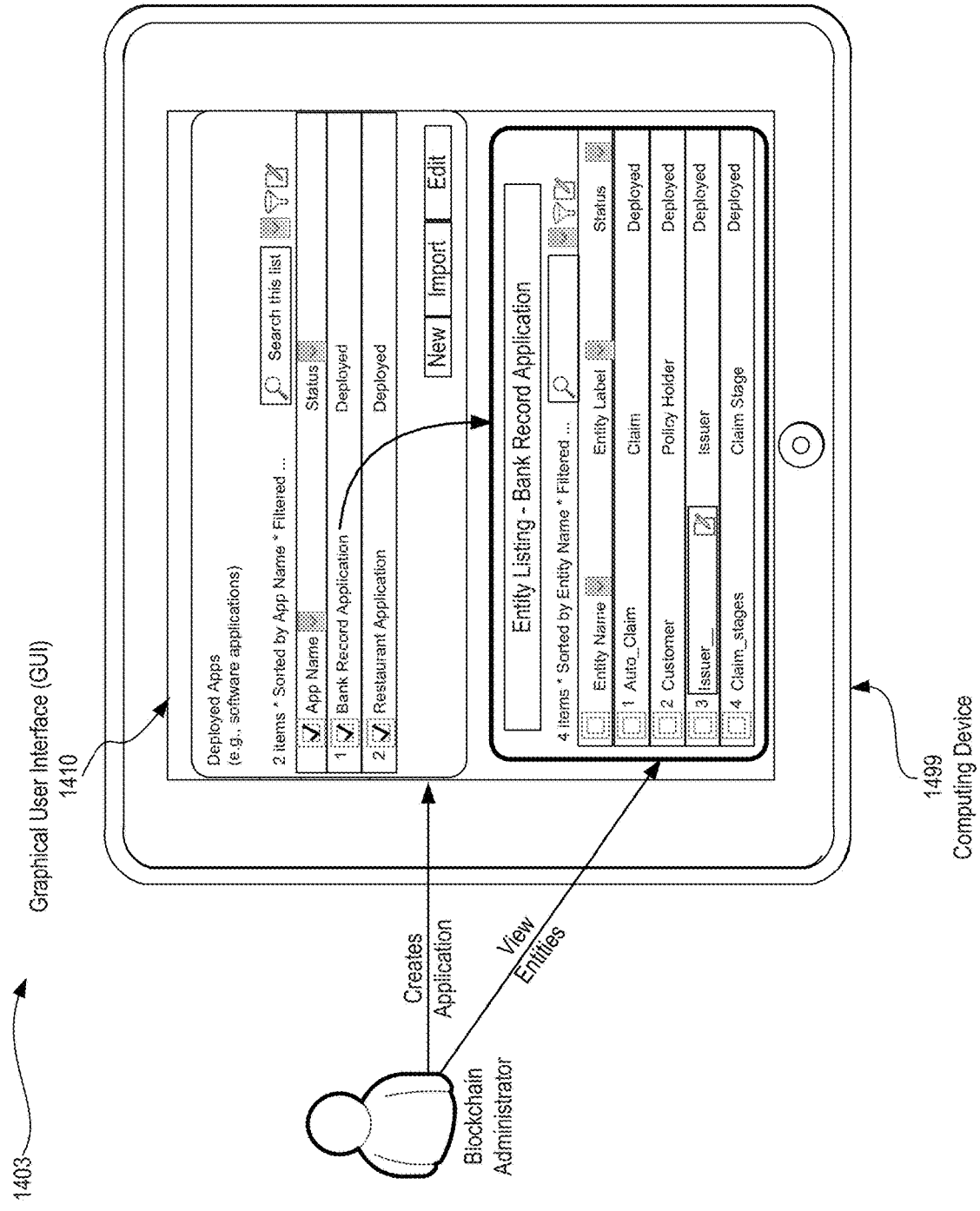

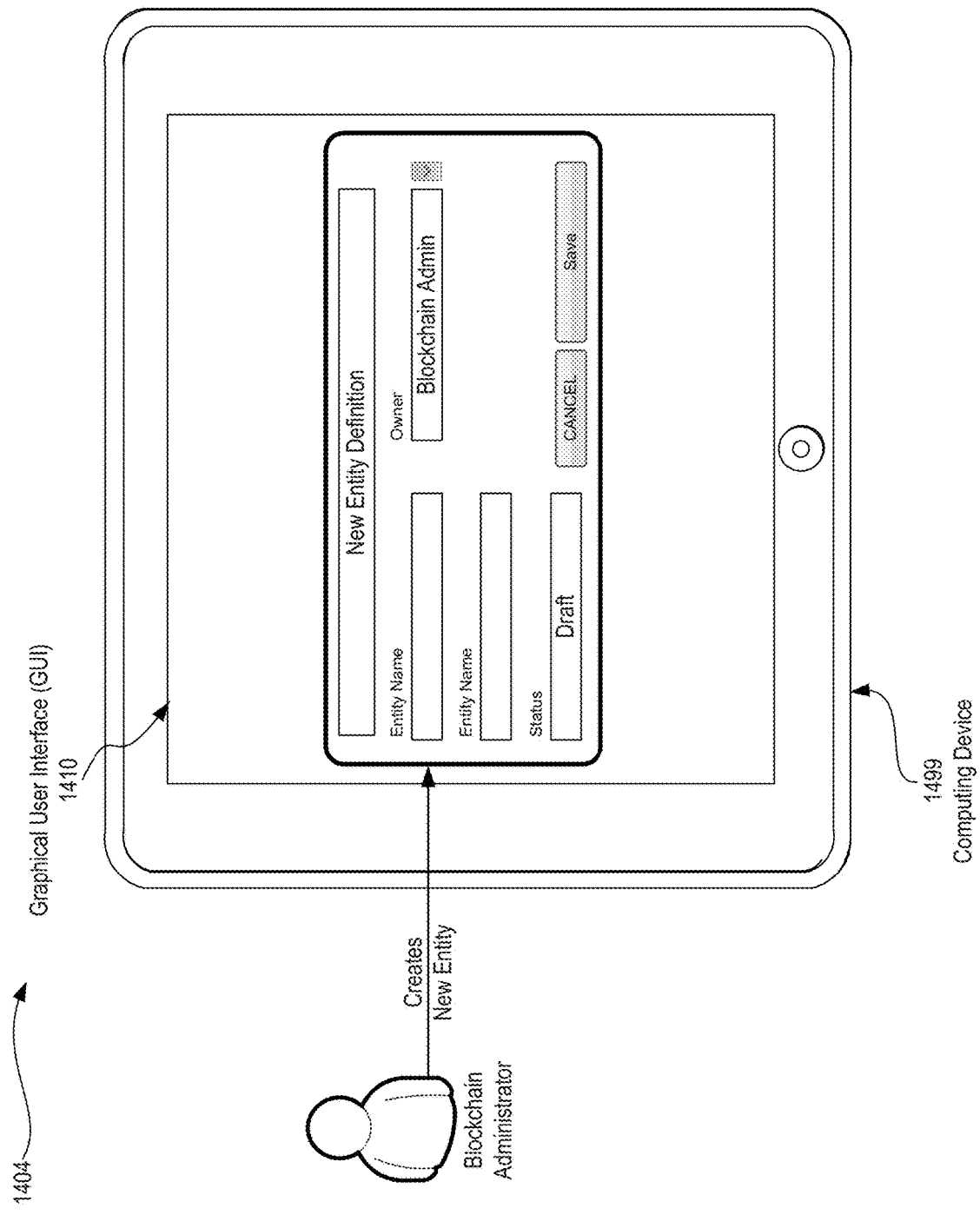

Generated Code 1407

Graphical User Interface (GUI) 1410

```
47.             {
48.                 "field_name": "created_by",
49.                 "is_system_field": true
50.             },
51.             {
52.                 "required": true,
53.                 "field_label": "Type",
54.                 "field_type": "TEXT",
55.                 "field_name": "type",
56.                 "is_system_field": true
57.             }
58.         ],
59.     {
60.         "entity_label": "Issuer",
61.         "entity_name": "issuer",
62.         "allowed_operations": {
63.             "allow_update": true
64.         }
65.     },
66.     {
67.         "field_definitions": [
68.             {
69.                 "required": true,
70.             }
71.         ]
72.     }
```

"issuer" entity defined

SYSTEMS, METHODS, AND APPARATUSES FOR IMPLEMENTING A ROLE BASED ACCESS CONTROL AND AUTHORIZATION VALIDATOR VIA BLOCKCHAIN SMART CONTRACT EXECUTION USING DISTRIBUTED LEDGER TECHNOLOGY (DLT)

CLAIM OF PRIORITY

This Non-Provisional U.S. Utility patent application is related to, and claims priority to, the provisional patent application number 62/840,070 entitled "SYSTEMS, METHODS, AND APPARATUSES FOR IMPLEMENTING A ROLE BASED ACCESS CONTROL AND AUTHORIZATION SYSTEM VIA BLOCKCHAIN SMART CONTRACT EXECUTION USING DISTRIBUTED LEDGER TECHNOLOGIES (DLT)," filed Apr. 29, 2019, the entire contents which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology and API gateways or platforms. More particularly, disclosed embodiments relate to systems, methods, and apparatuses for implementing a role based access control and authorization validator via blockchain smart contract execution using Distributed Ledger Technology (DLT) in conjunction with a cloud based computing environment.

BACKGROUND

The subject matter discussed in the background section should not be considered prior art merely because of its mention in the background section. Similarly, a problem mentioned in the background section or associated with the subject matter of the background section should not be considered to have been previously recognized in the prior art.

In modern financial systems, assets such as currencies, or securities, are typically held and traded electronically. Transferring assets often requires point-to-point interaction between multiple intermediaries, and reconciliation of duplicated ledgers. This system has some disadvantages, such as the time required for settlement of asset transfers or payments, which often takes days, transfers involve fee payments to multiple intermediaries, and reconciliation can involve expensive overhead, it may be difficult to find out the status of a pending transfer or the current owner of an asset, transfers may not complete, and it may be difficult to make one transfer conditional on another, the complexity of the such systems makes it difficult to prevent fraud or theft, and, whether transactions are reversible depends on the transfer mechanism, rather than the business requirements of the transacting party.

Many of these problems can be fixed if asset ownership were recorded on a single shared ledger. However, a combination of practical and technological constraints have made such ledgers difficult to adopt. Such a shared ledger would tend to require trust in a single party. That party would need to have the technical capacity to process every transaction in real time. Additionally, to address the disadvantages discussed above, the ledger would need to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and its virtual machine has only limited support for custom programs that determine asset movement, sometimes called smart contracts.

Ethereum, introduced in 2015, generalizes the concept of a blockchain to a fully programmable state replication mechanism. While it includes a much more powerful programming language, it presents additional challenges for scalability and efficiency.

In contrast to Bitcoin and Ethereum, which are designed to operate on the public Internet, most financial activity already occurs within restricted networks of financial institutions. A shared ledger operated within this network can take advantage of blockchain technology without sacrificing the efficiency, security, privacy, and flexibility needed by institutions, financial or otherwise.

The present state of the art may therefore benefit from the systems, methods, and apparatuses for implementing a role based access control and authorization validator via blockchain smart contract execution using Distributed Ledger Technology (DLT) in conjunction with a cloud based computing environment, as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 1B depicts another exemplary architecture, with additional detail of a blockchain protocol block 160, in accordance with described embodiments;

Figure 13C:
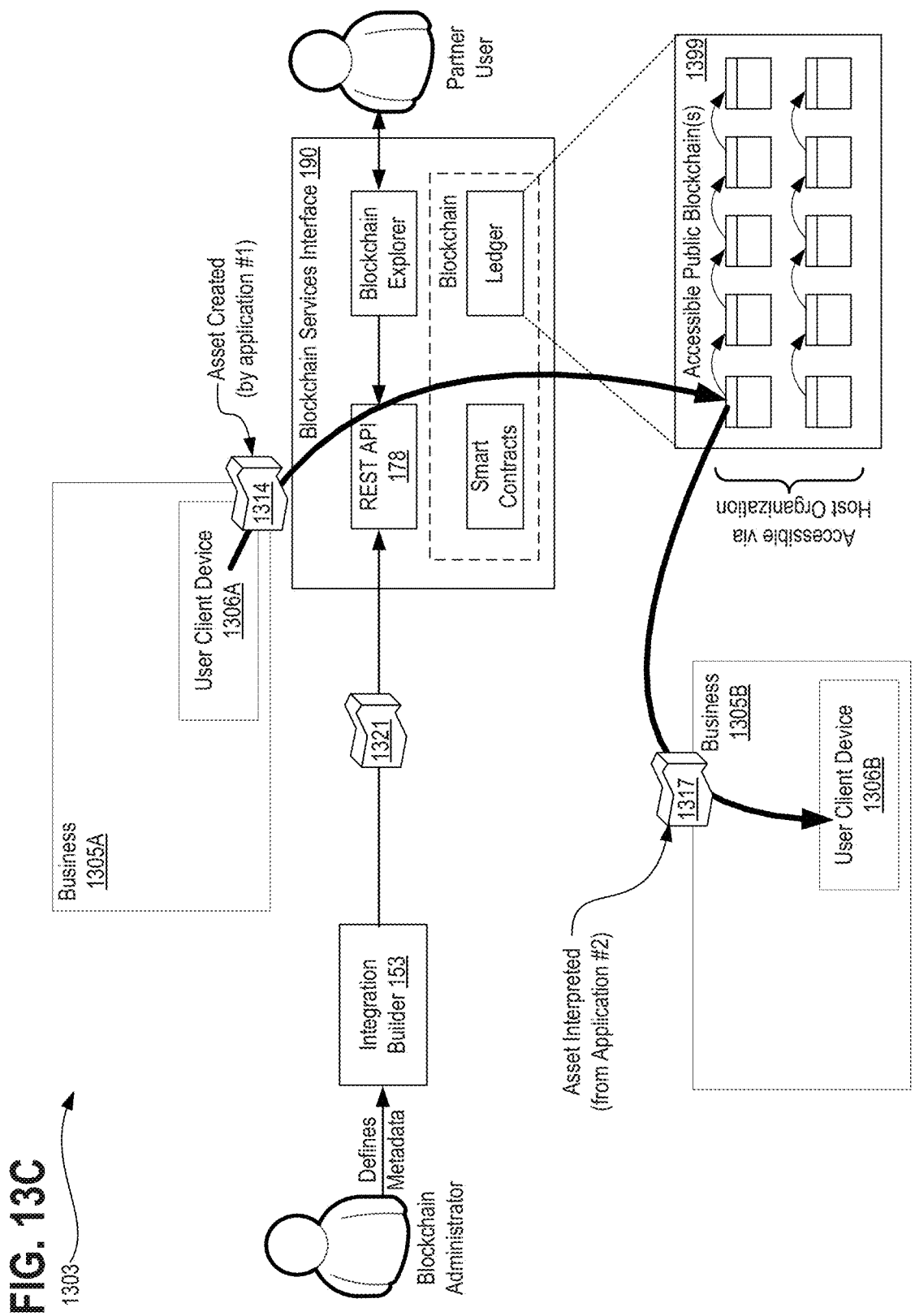
Figure 14A:
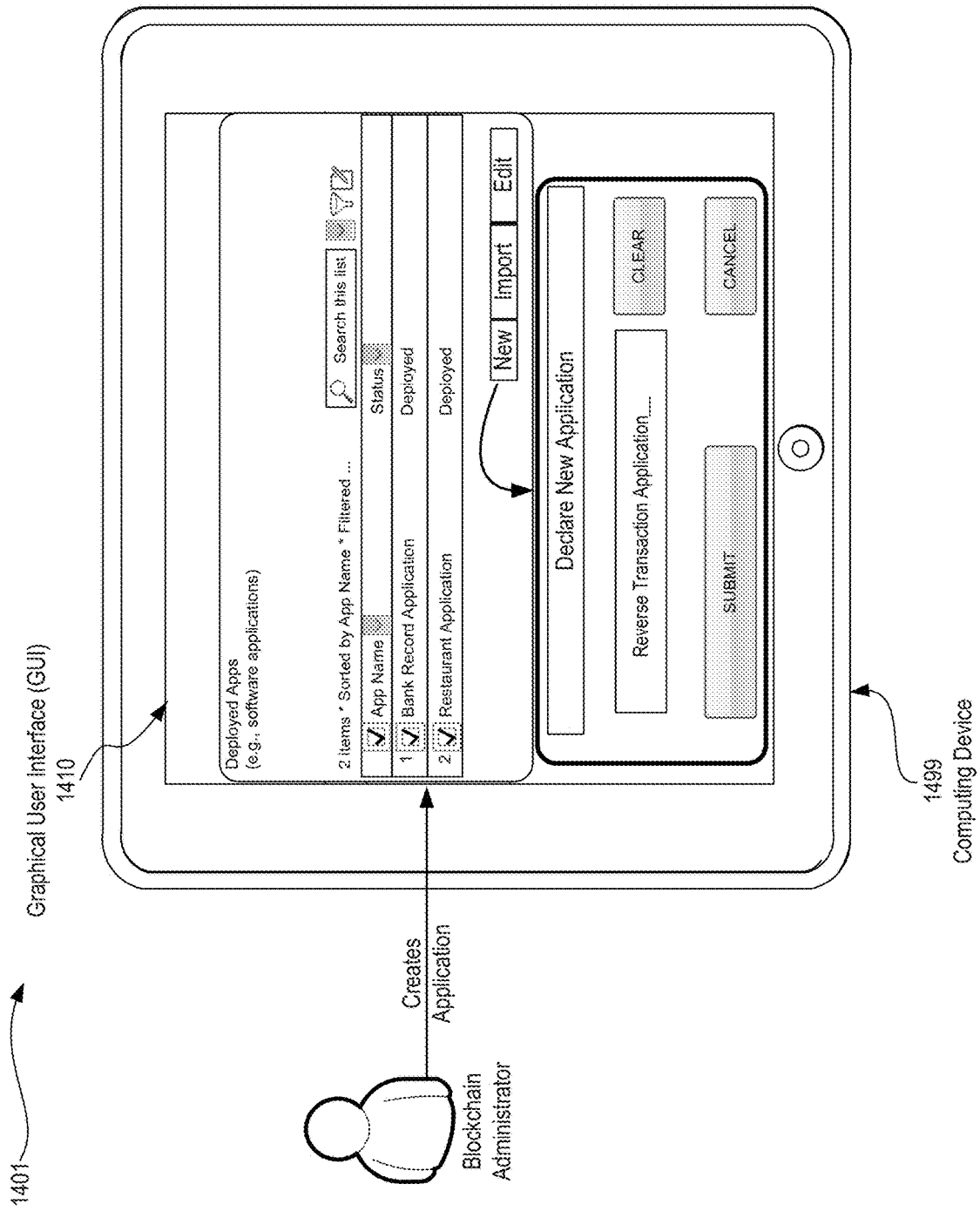
Figure 14B:
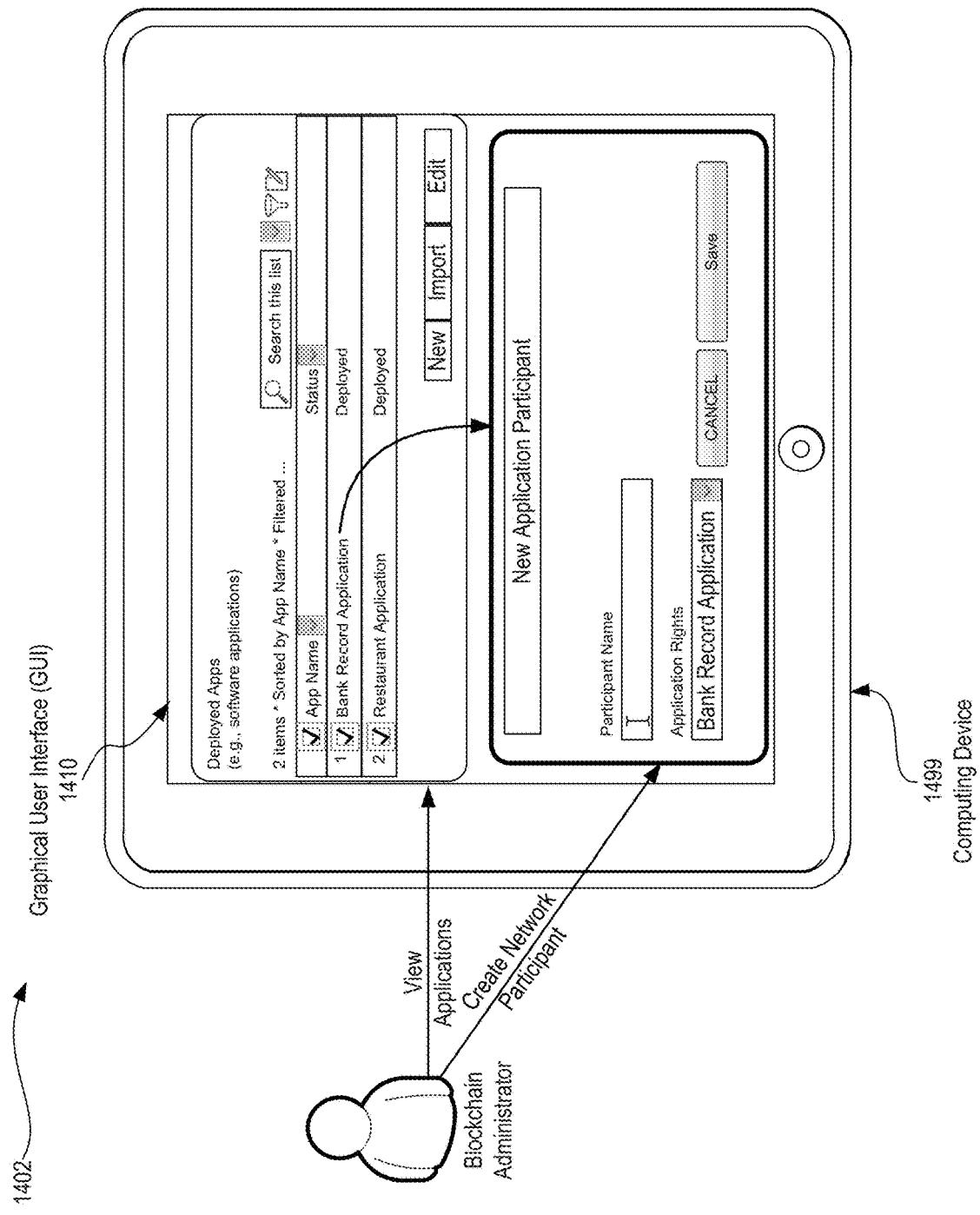
Figure 14E:
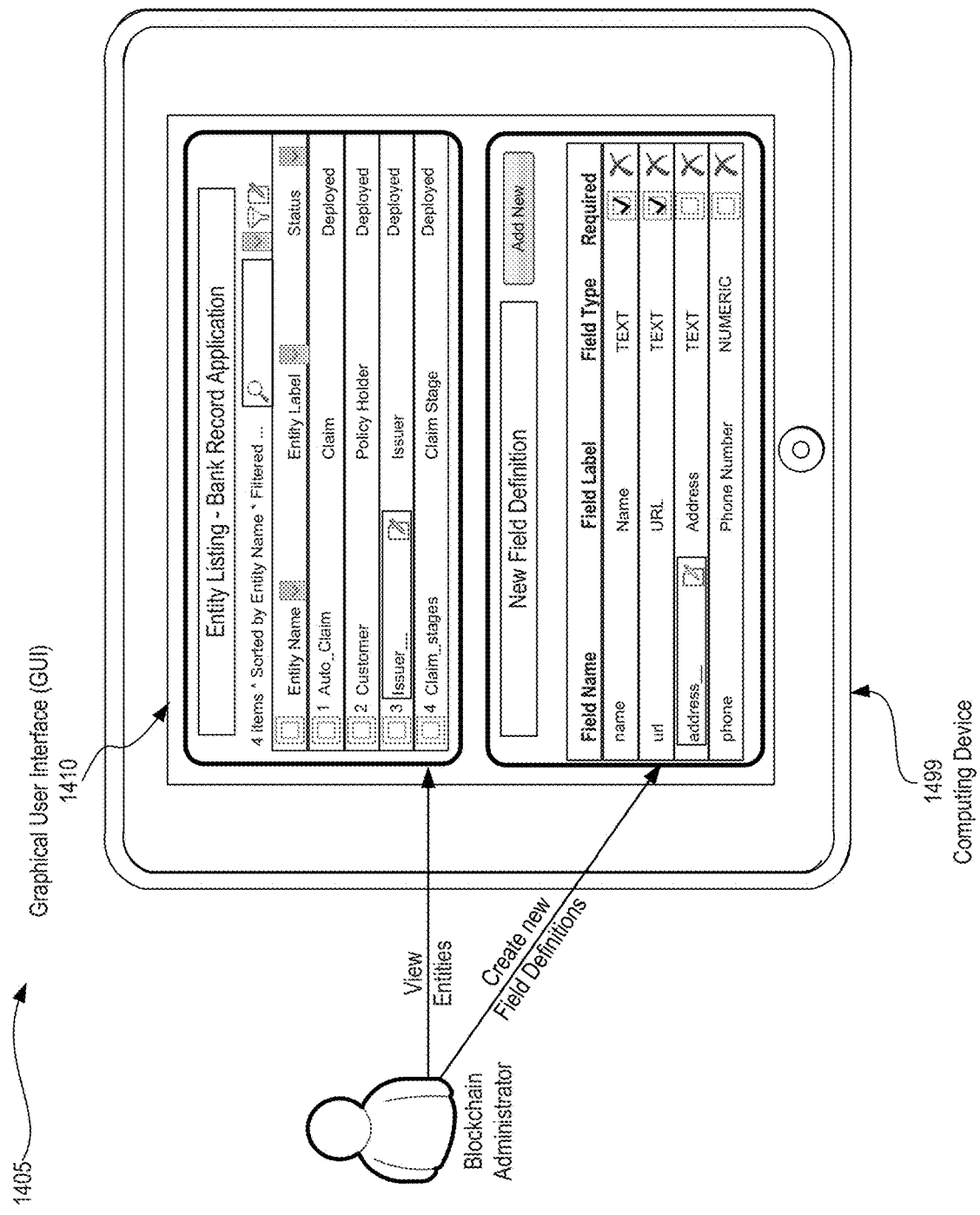
Figure 14F:
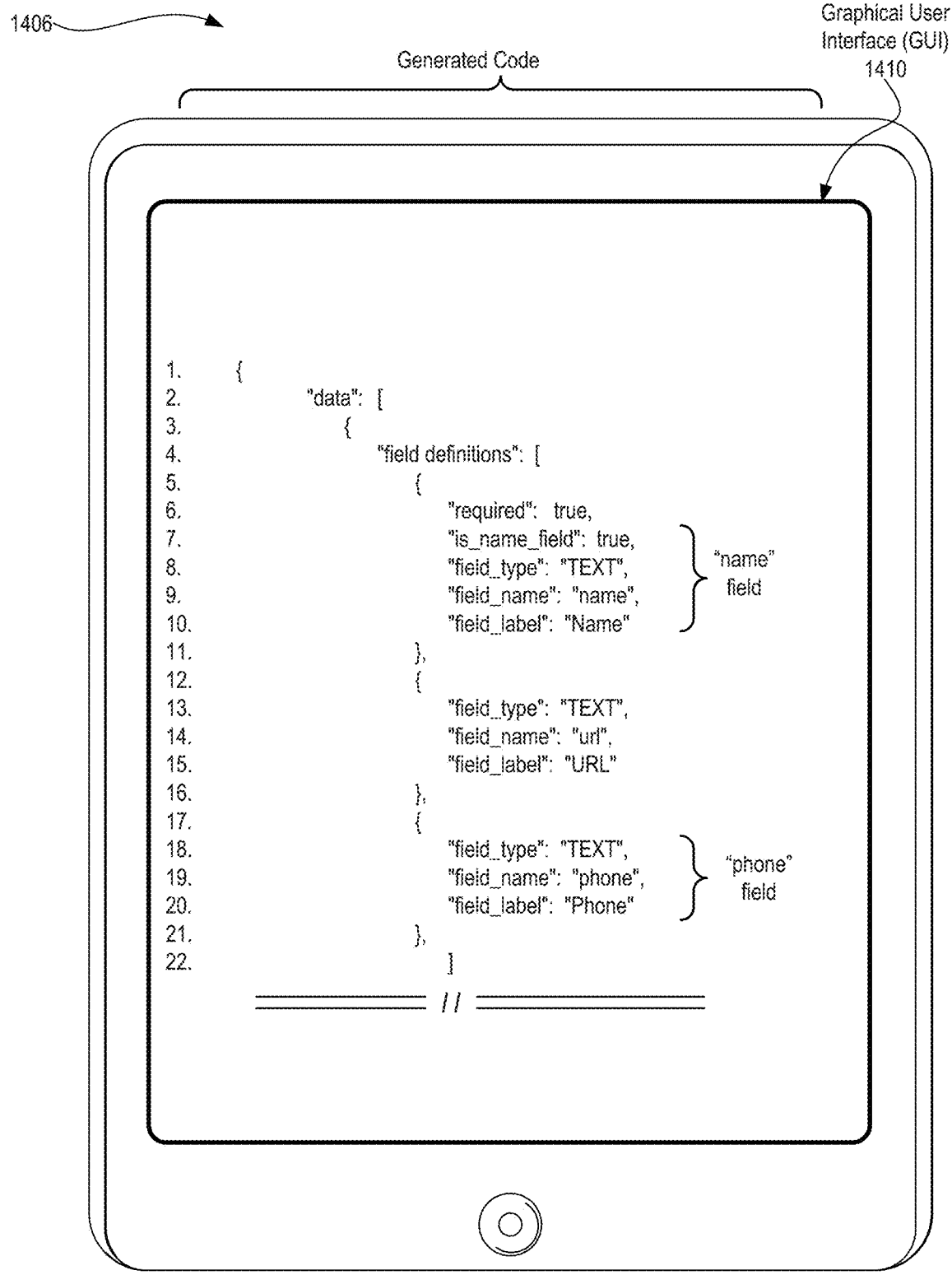
Figure 15:
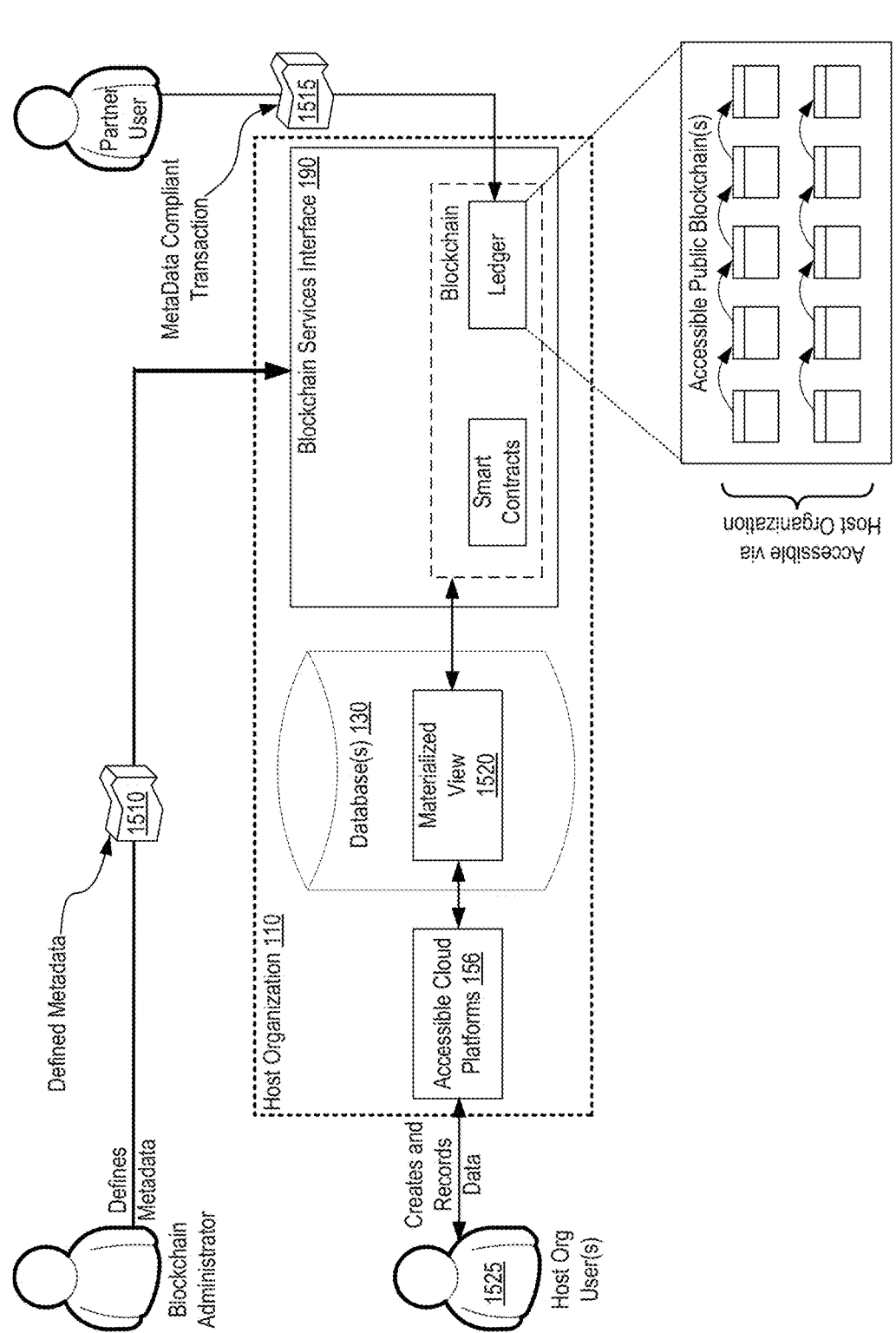

As depicted here, there is an Apex translation engine within the blockchain services interface, in accordance with described embodiments;

FIGS. 12, 13A, 13B, 13C, 14A, 14B, 14C, 14D, 14E, 14F, and 14G depict additional exemplary architectures in accordance with described embodiments; and FIG. 15 depicts another exemplary architecture in accordance with described embodiments.

DETAILED DESCRIPTION

Described herein are systems, methods, and apparatuses for implementing a role based access control and authorization validator via blockchain smart contract execution using Distributed Ledger Technology (DLT) in conjunction with a cloud based computing environment.

For instance, according to one embodiment, there is a method performed by a system having at least a processor and a memory therein and operates within a host organization. According to such an embodiment, the system is specially configurable to perform operations including: operating a blockchain interface to a public blockchain on behalf of a plurality of customers of the host organization, wherein each of the plurality of customers operate as a participating node on the blockchain; executing an API gateway on behalf of the plurality of customers; receiving an API definition from one of the plurality of customers defining at least access permissions for use of the defined API and a plurality of permitted functions for the defined API; transacting a new asset onto the blockchain having embodied therein, metadata representing the API definition and the access permissions for use of the defined API and the plurality of permitted functions for the defined API; intercepting, via the executing API gateway, an API call directed at the defined API; retrieving the metadata from the blockchain; authenticating an API caller associated with the API call based on the access permissions from the retrieved metadata; and forwarding the API call to the appropriate customer pursuant to successful authentication of the API caller.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

Figure 1A:
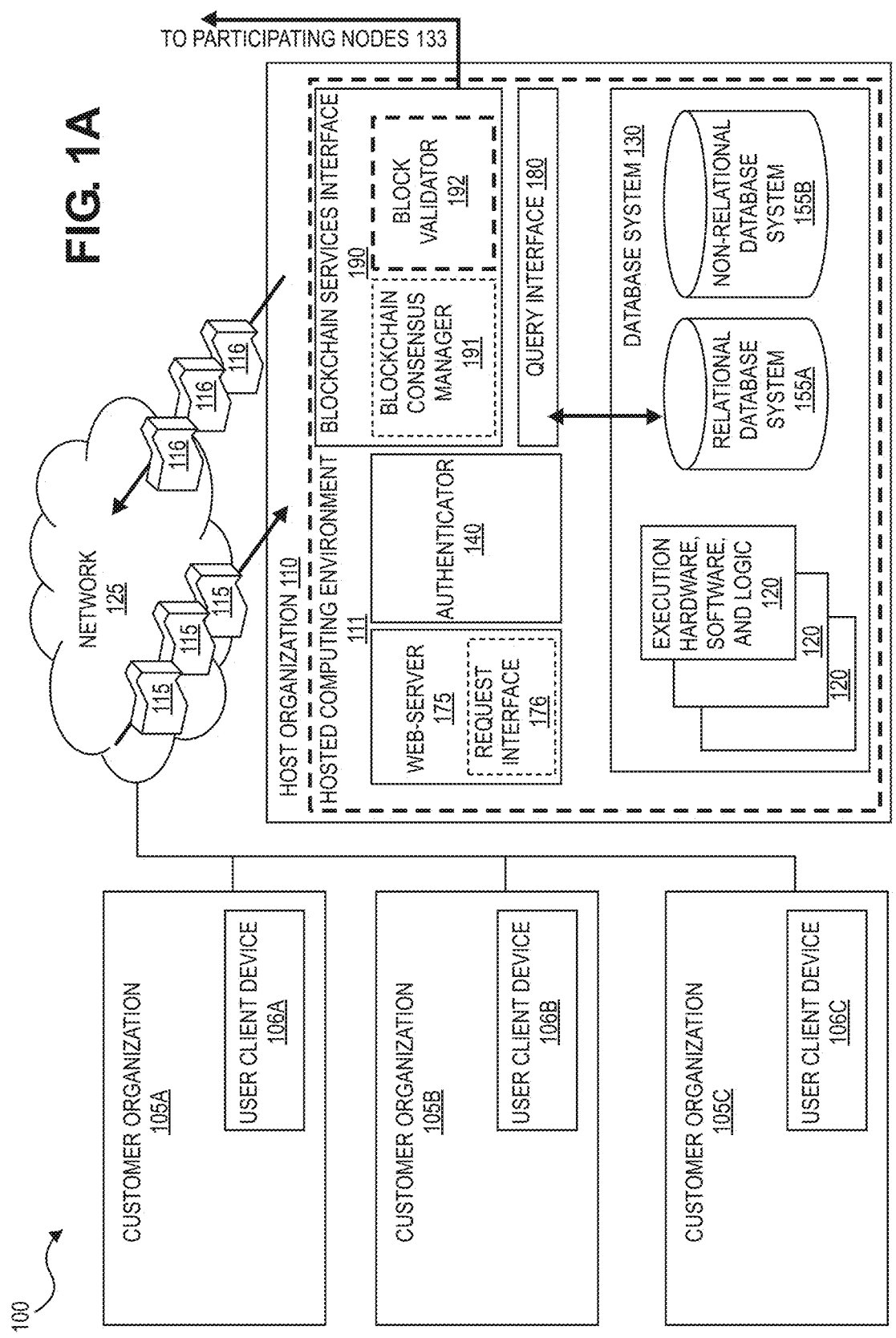
FIG. 1A depicts an exemplary architecture in accordance with described embodiments.

FIG. 1A depicts an exemplary architecture 100 in accordance with described embodiments. A hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 120 of the database system 130 are separate and distinct from the customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C may be a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 and a block validator 192. Blockchain services interface 190 communicatively interfaces the host organization 110 with other participating nodes 133 (e.g., via the network 125) so as to enable the host organization 110 to participate in available blockchain protocols by acting as a blockchain protocol compliant node so as to permit the host organization 110 to access information within such a blockchain as well as enabling the host organization 110 to provide blockchain services to other participating nodes 133 for any number of blockchain protocols supported by, and offered to customers and subscribers by the host organization 110.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system can be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high Byzantine fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers can exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing it, blockchain makes data transparent to everyone involved.

Every participating node 133 for a particular blockchain protocol within a decentralized system has a copy of the blockchain for that specific blockchain protocol. Data quality is maintained by massive database replication and computational trust. Generally speaking, no centralized official copy of the database exists and, by default, no user and none of the participating nodes 133 are trusted more than any other. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority should be considered a blockchain. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless, of the semantics, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is needed. This means that applications can be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

FIG. 1B depicts another exemplary architecture 101, with additional detail of a blockchain protocol block 160, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 is organized.

The prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 163 provides a hash of the data stored within the block payload 169 portion of the blockchain protocol block 160 and need not meet any specific standard of proof 165. However, the payload hash is included as part of the input when the hash is calculated for the purpose of storing it as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a timestamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized to store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standards of proof 165 may be utilized pursuant to the particular blockchain protocol chosen, such as proof of work, hash value requirements, proof of stake, a key, or some other indicator such as a consensus, or proof of consensus. Where consensus based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may all be of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

Figure 1C:
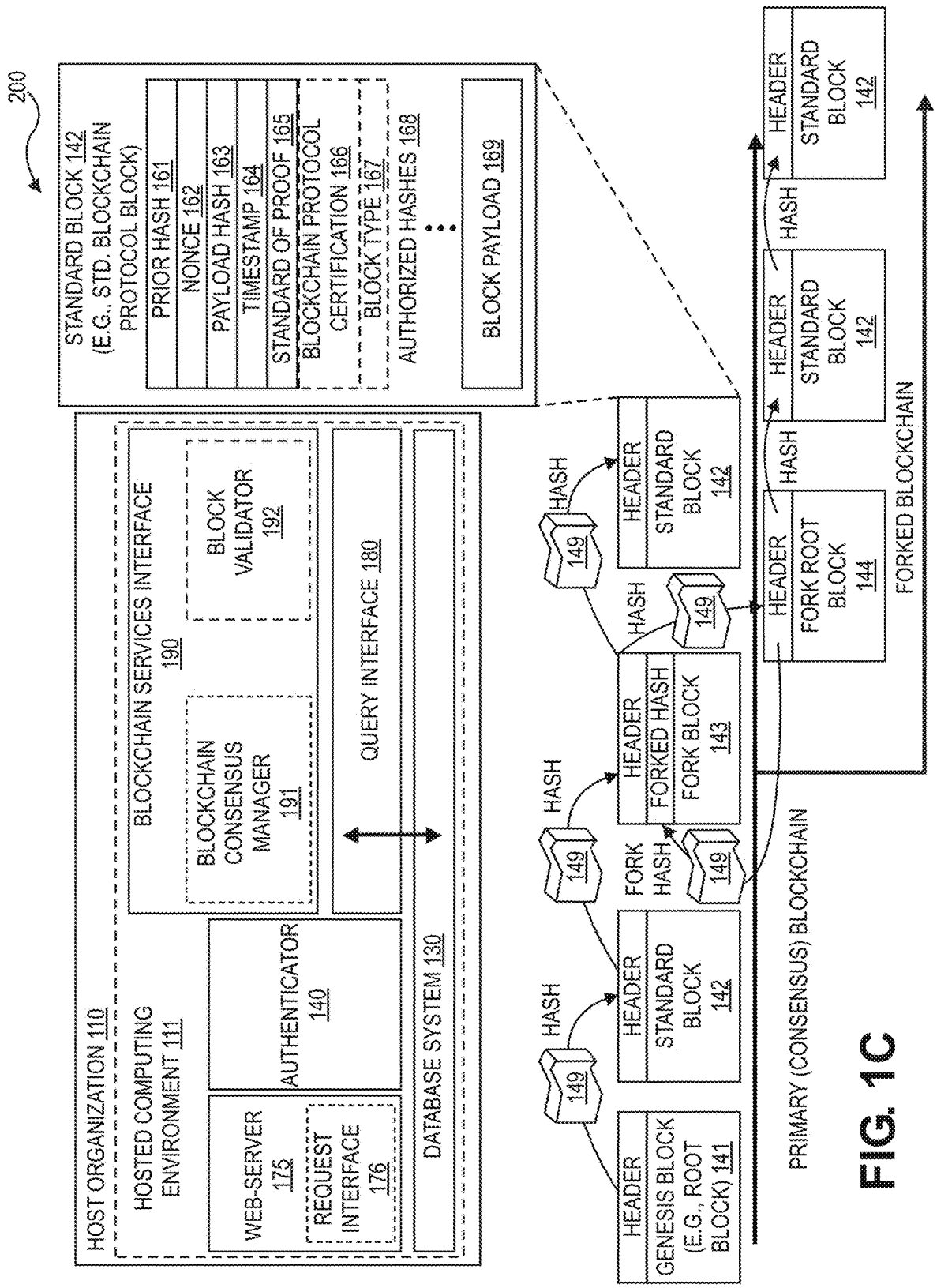
FIG. 1C depicts another exemplary architecture, with additional detail of a blockchain and a forked blockchain, in accordance with described embodiments.

FIG. 1C depicts another exemplary architecture 102, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary block chain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing potentially valid primary blockchains. Once consensus is reached (typically after one or two cycles and new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C#, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

Figure 2A:
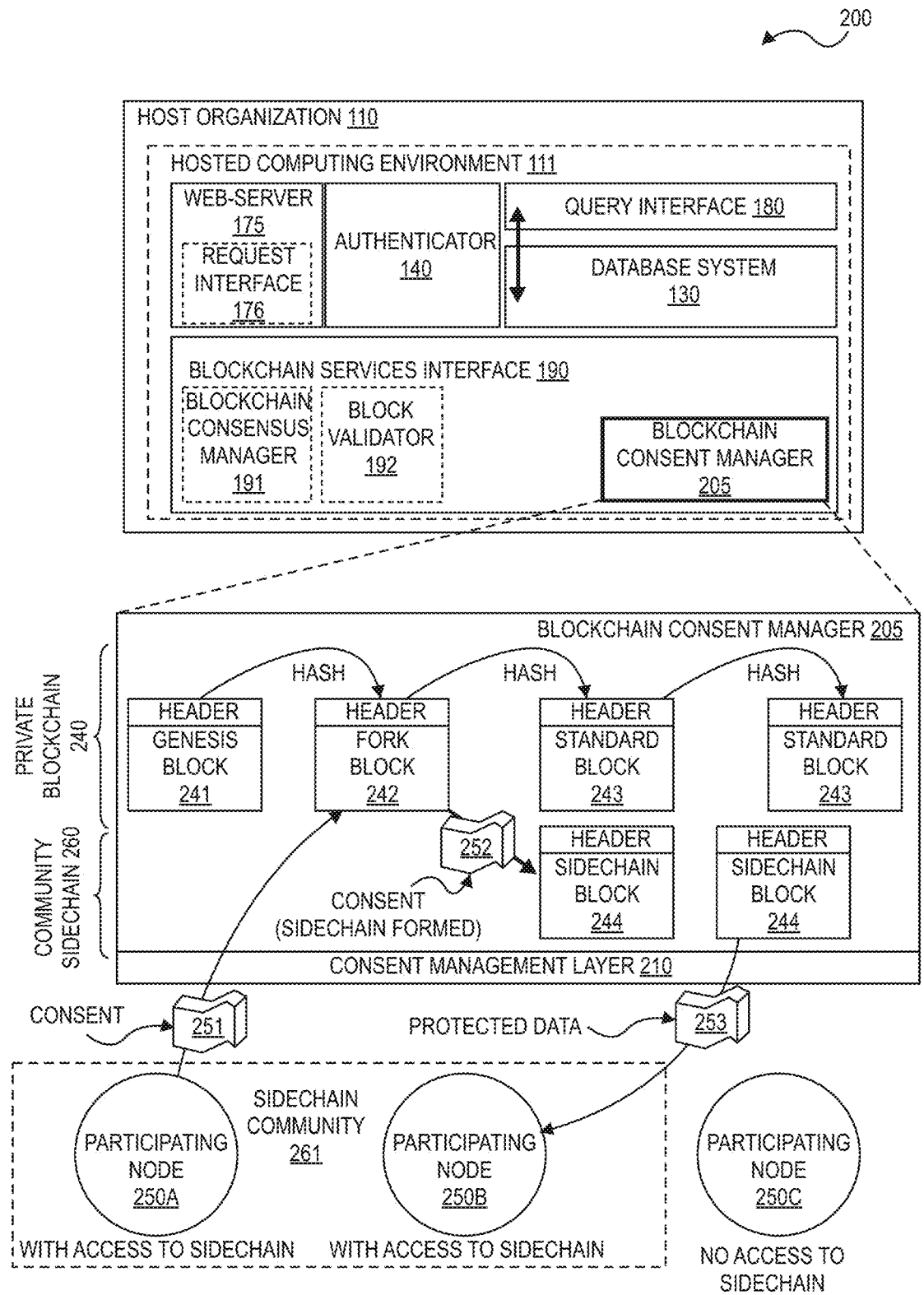
FIG. 2A depicts another exemplary architecture, with additional detail of a blockchain which implements community sidechains with consent management, in accordance with described embodiments.

FIG. 2A depicts another exemplary architecture 200, with additional detail of a blockchain which implements community sidechains with consent management, in accordance with described embodiments.

As depicted here, there is again a host organization 110 having a hosted computing environment 111 operating therein with a web-server 175, request interface 176, authenticator 140, query interface 180, and database system 130. As before, there is also a blockchain services interface 190 via which the host organization 110 provides a variety of blockchain related services to customers, subscribers, and other organizations and tenants which utilize the cloud computing services provided by the host organization 110.

More particularly, there is now depicted within the blockchain services interface 190 a blockchain consent manager 205 which implements community sidechain functionality with consent management to control access rights, readability, exchange permissions and disclosure capabilities of the payload data stored within the blockchain.

Conventionally, blockchain blocks are fully open and readable to any participating node for the blockchain protocol implementation. Such openness is by design as it permits any node to authenticate and validate that transactions are valid independently, without requiring permission from any authority. However, such openness is not always desirable. Therefore, the blockchain consent manager 205 and the blockchain services interface 190 expose additional functionality for certain blockchain protocol implementations supported by the host organization which permits certain data to be subjected to additional access restrictions, while nevertheless utilizing and benefiting from the distributed ledger technologies embodied within the blockchain functionality.

According to a particular embodiment, the blockchain consent manager 205 provides a community sidechain with consent management on a private blockchain. As depicted here, the blockchain consent manager 205 provides a private blockchain 240 (e.g., a community sidechain) which is comprised of an initial genesis block 241 beginning the sidechain as a private blockchain 240 followed by a sequence of standard blocks 243 as the private blockchain continues to grow. The private blockchain 240 is accessible to each of the participating nodes 250A and 250B and 250C. In practice, there are likely to be many more participating nodes for the private blockchain 240.

Community sidechains are useful where it is desirable to share data between two nodes of a blockchain, for instance, such as the ability to share medical information for a patient between a hospital and an insurance provider.

With conventional mechanisms, every participating node 250A-C has full access to all data once that data is written into the blockchain. While useful in many situations, it is readily apparent that medical information should not be freely accessible to view due to privacy concerns as well as HIPAA (Health Insurance Portability and Accountability Act of 1996) requirements. Notwithstanding the shortcomings, or design feature, of prior blockchain protocol implementations, which permit full visibility, the blockchain consent manager 205 of the host organization 110 provides specific customers, organizations, users (e.g., hospitals, doctor offices, insurance providers, etc., within the context of the patient medical records example) to benefit from the use of blockchain functionality such as immutability and non-centralized record keeping, while also respect patient privacy and comply with Federal HIPAA requirements. Financial organization have similar legal requirements to protect private information, yet may also benefit from the blockchain functionality as set forth herein to provide community sidechains with consent management capabilities via the blockchain consent manager 205.

According to one embodiment, the blockchain consent manager 205 implements a consent management layer 210 through which participating nodes 250A-C must traverse if they wish to view, read, or access certain information stored within the private blockchain 240. According to such an embodiment, some of the data within the private blockchain 240 is viewable to all participating nodes 250A-C whereas other data is restricted.

Unlike the distinction between a private blockchain and a public blockchain, in which anyone can access the public blockchain and view any information within it, and anyone having access to the private blockchain can access any information within it, the private blockchain 240 with consent management is different because even if a participating node has authority to access the private blockchain 240, such access does not necessarily confer the "consent" by which to access protected or restricted information stored within the private blockchain 240.

As depicted here, participating node 250A has provided consent 251 which is written into the private blockchain 240. Consequently, a new sidechain community 261 is formed by the blockchain consent manager 205. Specifically, the blockchain consent manager 205 creates a new community sidechain 260 formed from sidechain blocks 244. The community sidechain 260 is formed from the point of the fork block 242 which is viewed by the private blockchain 240 as a standard block, but includes a reference linking the newly formed community sidechain 260 with the private blockchain 240. The main private blockchain 240 then continues on after the creation of the community sidechain 260 via additional standard blocks 243 which follow the fork block 242.

Upon the consent 251 being received from participating node 250A and being written into the private blockchain 240, the blockchain consent manager 205 seeds the new community sidechain 252 with the consent, thus forming the new community sidechain 260. According to certain embodiments, no payload data whatsoever is written into the sidechain blocks 244 of the community sidechain. For example, the protected data 253 is not written into the community sidechain 260, but rather, remains within the private blockchain 240 in protected form, but is accessible to the participating nodes of the sidechain community 261 via a reference between the sidechain blocks 244 accessible only to the participating nodes 250A and 250B of the sidechain community which permits retrieval of the protected data 253 through the consent management layer. In other embodiments, protected data 253 may be written into the payload of the sidechain blocks 244, and through virtue of the participating nodes 250A and 250B residing within the sidechain community 261, those participating nodes 250A and 250B will have access to the protected data 253 without having to access the main chain (e.g., the private blockchain 240). As depicted here, the community sidechain 260 is linked to the private blockchain 240, and may therefore be considered a forked blockchain, whereas in other implementations, the community sidechain may be formed and permitted to operate independently from the private blockchain, so long as the blockchain consent manager 205 remains in control to manage which participating nodes are permitted to form any newly created sidechain community 261, and therefore, which participating nodes have access to the protected data 253 and which participating nodes do not have access to the protected data 253.

As is depicted here, participating nodes 250A and 250B have access to the sidechain as they form the entirety of the sidechain community 261, and thus, data is sharable between the nodes of the sidechain community, whereas the participating node 250C is not a member node of the sidechain community 261, and therefore cannot access the protected data and cannot share data with the participating nodes 250A and 250B.

Figure 2B:
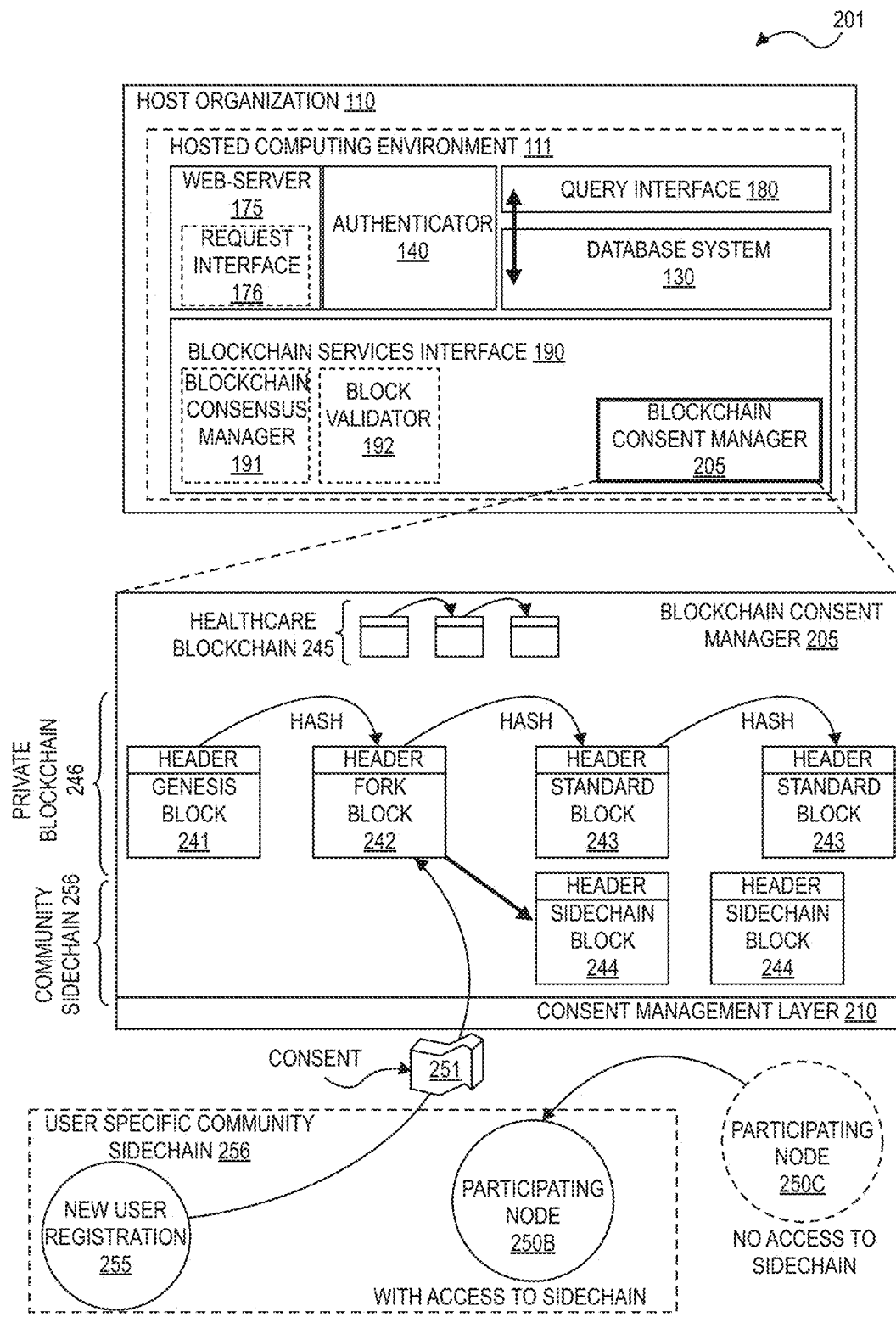
FIG. 2B depicts another exemplary architecture, with additional detail of a community sidechain with consent management, in accordance with described embodiments.

FIG. 2B depicts another exemplary architecture 201, with additional detail of a community sidechain with consent management, in accordance with described embodiments.

Depicted here are further details regarding the introduction of new participating nodes into the private blockchains. As shown here, there now exists two distinct private blockchains which are managed by the blockchain services interface 190, specifically, the healthcare blockchain 245 and the construction blockchain 246. According to described embodiments, there can be many different private blockchains, and they may be organized in a variety of ways. For instance, it is conceivable that different parties in the healthcare industry may wish to share data amongst one another, and therefore, they may participate within the same private healthcare blockchain 245, and where data sharing is needed, consent may be granted, a sidechain formed with the participating nodes needing access to the data to be shared, thus forming a sidechain community, and then the data shared amongst those participants of the newly created sidechain community, just as was described above.

However, there may be other participants which have no need for access to medical data, and therefore, those participating nodes are formed into a distinct private blockchain. For instance, depicted here is the construction blockchain 246 having participants such as hardware stores, construction materials manufacturers, building contractors, etc. While such actors likely have no need to access medical information, they likely would benefit from the ability to securely share data related to their construction industry, such as purchase orders, building plans, construction contracts, etc. These actors may wish to protect certain types of information, yet may nevertheless benefit from the use of blockchain functionality.

According to a particular embodiment, a new user registration (e.g., for instance the creation of a user profile with a website, etc.) 255 within the main construction blockchain 246 resulting in the creation of a new user specific community sidechain 256. Initially, the new user registration is the only participating node for the user specific community sidechain 256 as only that particular user by default will have access to private and protected data. However, the new user registration node 255 may consent 251 to another node, with the consent being written into the construction blockchain 246 (e.g., being written into the fork block 242 by way of example), thus resulting in the community sidechain 256 having both the new user registration 255 and also another participating node to whom consent was granted. As shown here, participating node 250B previously was part of the construction blockchain 246 with no access to the sidechain, however, upon the grant of consent for the new user registration node, the participating node 250B is then joined into the user specific community sidechain 256, through which access to private or protected data associated with the new user registration node 255 may be shared. All nodes having consent to enter the user specific community sidechain 256 will be given access to the private and protected information of the new user registration node 255. If the same user requires different access to be given to different participating nodes, then the user would require a separate new user registration node to be created. For example, if a user creates a profile with a website such as Home Depot or Lowe's within the construction blockchain 246 and elects to share information, for instance with a carpet installer, then consent may be granted to the carpet installer to join the user specific community sidechain 256 and access the relevant information. If the user wishes then to share the same information with, for example, a window installer, then the window installer may also be given consent 251 to join the user specific community sidechain 256 as a new participating node, however, if the user wishes to share different information with each provider, then two profiles would be required. Pragmatically, however, the same information for the user would be pertinent to each installer, and therefore, it is unlikely that the user encounters such problem.

It is therefore in accordance with a particular embodiment that users may create user specific community sidechains within the primary blockchain (e.g., such as the construction blockchain 246 or the healthcare blockchain 245, etc.) by creating a user profile with a participating website and such users may then grant consent to other nodes (e.g., via the same website) to permit sharing of their private or protected information with specified target nodes participating within the primary blockchain but without access to the user specific sidechain before being granted consent.

Although not specific to the concepts which are discussed in detail herein, a website, such as Home Depot, may operate as a node within the construction blockchain 246 and also as a customer of the host organization. Through the website of the customer Home Depot, new users may create user profiles and the blockchain services interface 190 of the host organization will then generate a new node within the construction blockchain 246 or other relevant primary blockchain corresponding to the new user registration 255. The blockchain services interface 190 will additionally generate the user specific community sidechain 256 via which the user may grant consent to share information with other participating nodes for the particular blockchain, such as the construction blockchain 246 in this example. For instance, according to one embodiment, when users login or create a profile with the website, such as with Home Depot, they are authenticating with the host organization 110 upon which the website operates and resides. Because the user is then authenticated with the host organization 110, the same host organization 110 can then create the new node for the new user registration on any blockchain accessible to the host organization 110 through the blockchain services interface 190.

To be clear, information is not shared between two different private blockchains. Therefore, while technically feasible, it is not contemplated that information would be shared between the healthcare blockchain 245 and the construction blockchain 246. Rather, each operates as a separate private blockchain, each with its own participating nodes, users, and sidechains. The same human user could, however, create profiles with different websites resulting in that human user having a node within the healthcare private blockchain and also a node within the construction private blockchain. The fact that both private blockchains are managed by the same host organization is irrelevant and would likely be unknowable to the particular user in question.

It should also be noted that a sidechain of the private blockchain is not a node, but rather, a permissible branch, or fork, from the main private blockchain. The sidechains depicted here remain immutably attached to, and associated with the primary blockchain and do not operate independently.

According to a particular embodiment, when user consent is captured for a particular node within the user specific sidechain, the consent is captured at the sidechain and then written into the primary blockchain where it is permanently kept. In such an embodiment, the fact that consent has been granted is not protected information, however, the restricted data is protected and the consent is only applicable to a specified participating node of the primary blockchain until such time that consent is rescinded. According to certain embodiments, the consent granted may be time limited, and will therefore expire after a specified period of time. In such case, access to the protected information is checked against the time expiration via the blockchain consent manager 205 as part of the blockchain protocol provided by the blockchain services interface 190.

Figure 3:
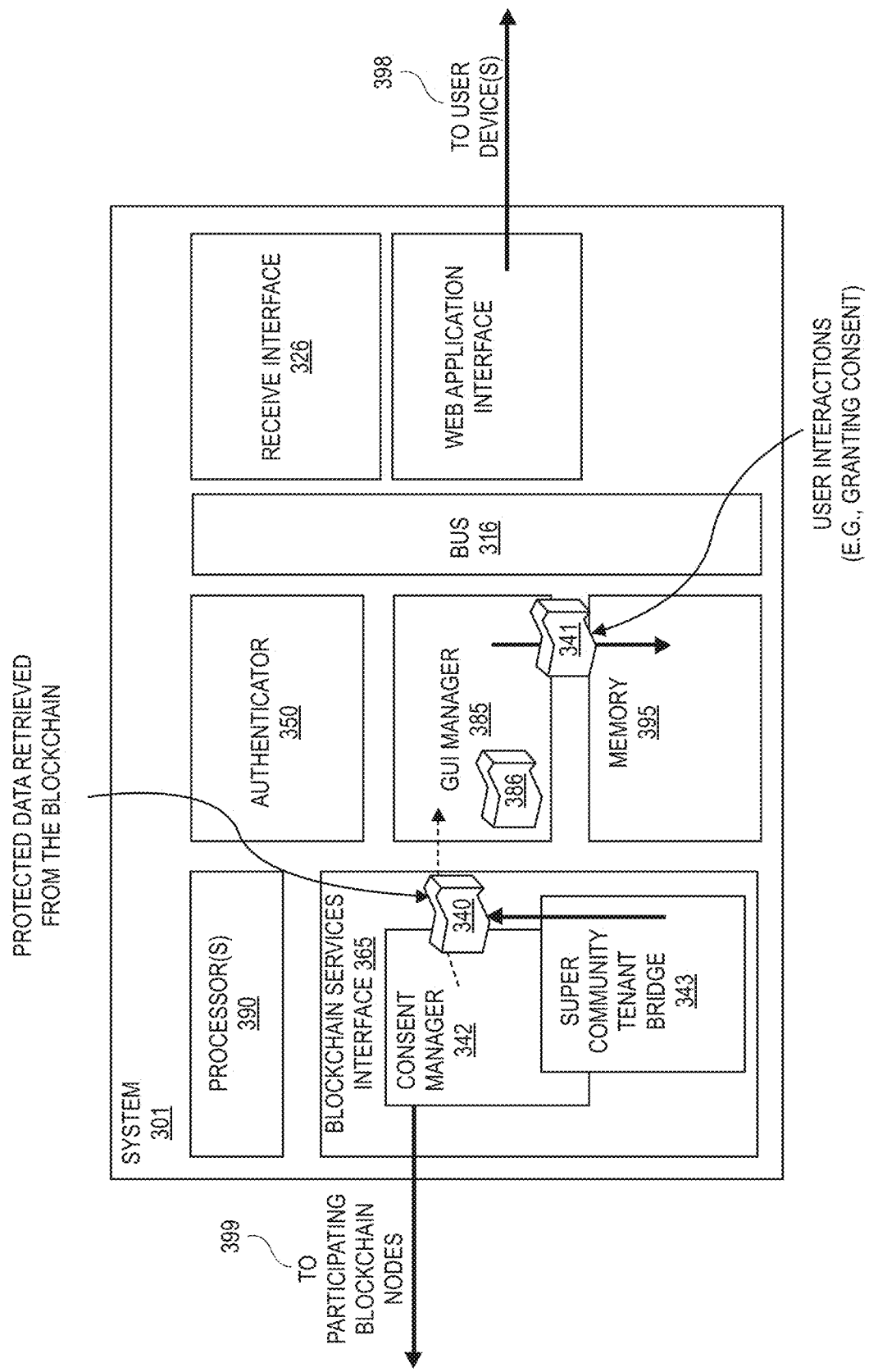
FIG. 3 shows a diagrammatic representation of a system within which embodiments may operate, be installed, integrated, or configured, in accordance with described embodiments.

FIG. 3 shows a diagrammatic representation of a system 301 within which embodiments may operate, be installed, integrated, or configured. In accordance with one embodiment, there is a system 301 having at least a processor 390 and a memory 395 therein to execute implementing application code 396 for the methodologies as described herein. Such a system 301 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 301, which may operate within a host organization, includes the processor 390 and the memory 395 to execute instructions at the system 301. According to such an embodiment, the processor 390 is to execute a blockchain services interface 365 to interface with a blockchain on behalf of a plurality of tenants of the host organization, in which each of the plurality of tenants are participating nodes 399 with the blockchain; a receive interface 326 is to receive a login request from a user device 398, the login request requesting access to a user profile associated with a first one of the plurality of tenants; an authenticator 350 to authenticate the user device 398 and to retrieve a user profile from the blockchain based on the authentication of the user device, in which the user profile is stored as a blockchain asset within the blockchain with a first portion of the user profile including non-protected data accessible to all participating nodes on the blockchain and with a second portion of the user profile including protected data 340 accessible only to participating nodes having user consent; a blockchain consent manager 342 to prompt the user device to grant user consent (e.g., element 341 showing granted consent) to share the protected data with a second one of the plurality of tenants (e.g., via a GUI 386 transmitted and managed by GUI manager 385); and a super community tenant bridge 343 to share the protected data with the second one of the plurality of tenants by permitting access to the protected data within the blockchain asset by the second tenant's participating node.

According to another embodiment of the system 301, the receive interface 326 communicates with a user client device 398 remote from the system and communicatively links the user device with the system via a public Internet. According to such an embodiment, the system operates at a host organization as a cloud based service provider to the user device 398; in which the cloud based service provider hosts a receive interface 326 exposed to the user client device via the public Internet, and further in which the receive interface receives inputs from the user device as a request for services from the cloud based service provider.

Bus 316 interfaces the various components of the system 301 amongst each other, with any other peripheral(s) of the system 301, and with external components such as external network elements, other machines, client devices, cloud computing services, etc. Communications may further include communicating with external devices via a network interface over a LAN, WAN, or the public Internet.

Figure 4A:
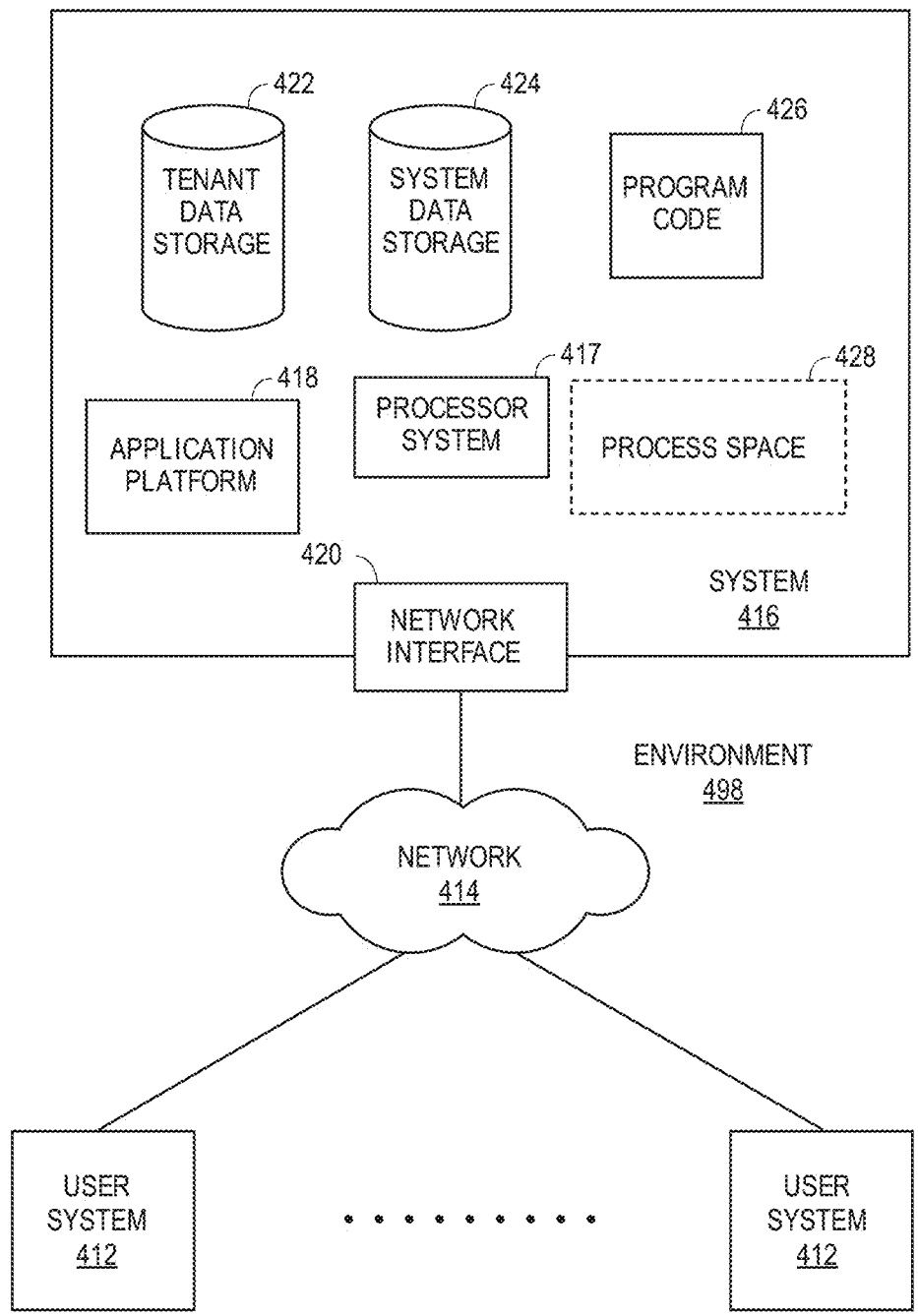
FIG. 4A illustrates a block diagram of an environment in which an on-demand database service may operate in accordance with the described embodiments.

FIG. 4A illustrates a block diagram of an environment 498 in which an on-demand database service may operate in accordance with the described embodiments. Environment 498 may include user systems 412, network 414, system 416, processor system 417, application platform 418, network interface 420, tenant data storage 422, system data storage 424, program code 426, and process space 428. In other embodiments, environment 498 may not have all of the components listed and/or may have other elements instead of, or in addition to, those listed above.

Environment 498 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4A (and in more detail in FIG. 4B) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" is used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4A, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4A, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4A include conventional, well-known elements that are explained only briefly here. For example, each user system 412 may include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units.

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4B:
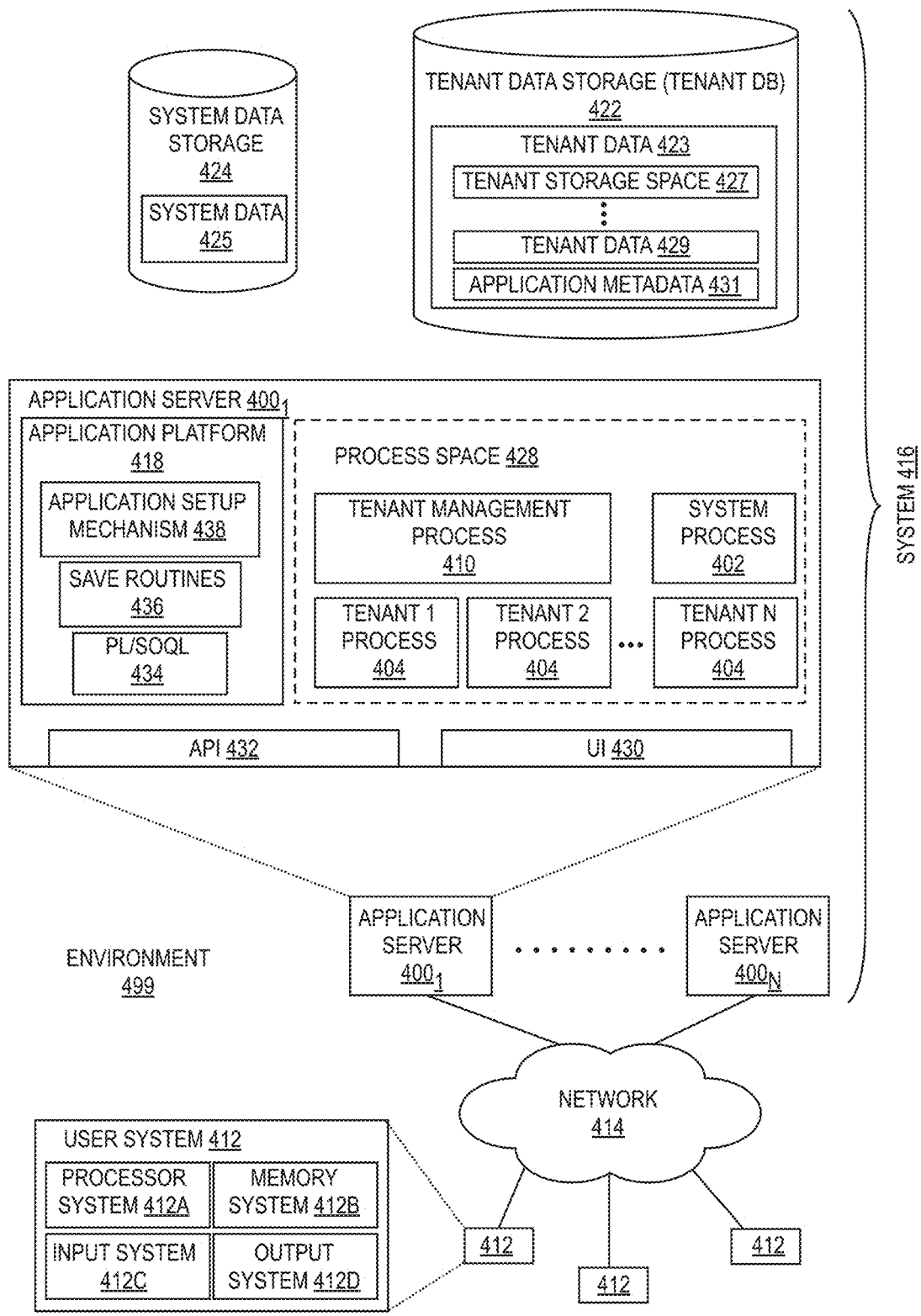
FIG. 4B illustrates another block diagram of an embodiment of elements of FIG. 4A and various possible interconnections between such elements in accordance with the described embodiments.

FIG. 4B illustrates another block diagram of an embodiment of elements of FIG. 4A and various possible interconnections between such elements in accordance with the described embodiments. FIG. 4B also illustrates environment 499. However, in FIG. 4B, the elements of system 416 and various interconnections in an embodiment are illustrated in further detail. More particularly, FIG. 4B shows that user system 412 may include a processor system 412A, memory system 412B, input system 412C, and output system 412D. FIG. 4B shows network 414 and system 416. FIG. 4B also shows that system 416 may include tenant data storage 422, having therein tenant data 423, which includes, for example, tenant storage space 427, tenant data 429, and application metadata 431. System data storage 424 is depicted as having therein system data 425. Further depicted within the expanded detail of application servers 400$_{1-N}$ are User Interface (UI) 430, Application Program Interface (API) 432, application platform 418 includes PL/SOQL 434, save routines 436, application setup mechanism 438, process space 428 includes system process space 402, tenant 1-N process spaces 404, and tenant management process space 410. In other embodiments, environment 499 may not have the same elements as those listed above and/or may have other elements instead of, or in addition to, those listed above.

User system 412, network 414, system 416, tenant data storage 422, and system data storage 424 were discussed above in FIG. 4A. As shown by FIG. 4B, system 416 may include a network interface 420 (of FIG. 4A) implemented as a set of HTTP application servers 400, an application platform 418, tenant data storage 422, and system data storage 424. Also shown is system process space 402, including individual tenant process spaces 404 and a tenant management process space 410. Each application server 400 may be configured to tenant data storage 422 and the tenant data 423 therein, and system data storage 424 and the system data 425 therein to serve requests of user systems 412. The tenant data 423 might be divided into individual tenant storage areas (e.g., tenant storage space 427), which can be either a physical arrangement and/or a logical arrangement of data. Within each tenant storage space 427, tenant data 429, and application metadata 431 might be similarly allocated for each user. For example, a copy of a user's most recently used (MRU) items might be stored to tenant data 429. Similarly, a copy of MRU items for an entire organization that is a tenant might be stored to tenant storage space 427. A UI 430 provides a user interface and an API 432 provides an application programmer interface into system 416 resident processes to users and/or developers at user systems 412. The tenant data and the system data may be stored in various databases, such as one or more Oracle™ databases.

Application platform 418 includes an application setup mechanism 438 that supports application developers' creation and management of applications, which may be saved as metadata into tenant data storage 422 by save routines 436 for execution by subscribers as one or more tenant process spaces 404 managed by tenant management process space 410 for example. Invocations to such applications may be coded using PL/SOQL 434 that provides a programming language style interface extension to API 432. Invocations to applications may be detected by one or more system processes, which manages retrieving application metadata 431 for the subscriber making the invocation and executing the metadata as an application in a virtual machine.

Each application server 400 may be communicably coupled to database systems, e.g., having access to system data 425 and tenant data 423, via a different network connection. For example, one application server 400$_1$ might be coupled via the network 414 (e.g., the Internet), another application server 400$_{N-1}$ might be coupled via a direct network link, and another application server 400$_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 412 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user may hit three different application servers 400, and three requests from different users may hit the same application server 400. In this manner, system 416 is multi-tenant, in which system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 400 to request and update system-level and tenant-level data from system 416 that may require sending one or more queries to tenant data storage 422 and/or system data storage 424. System 416 (e.g., an application server 400 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 5:
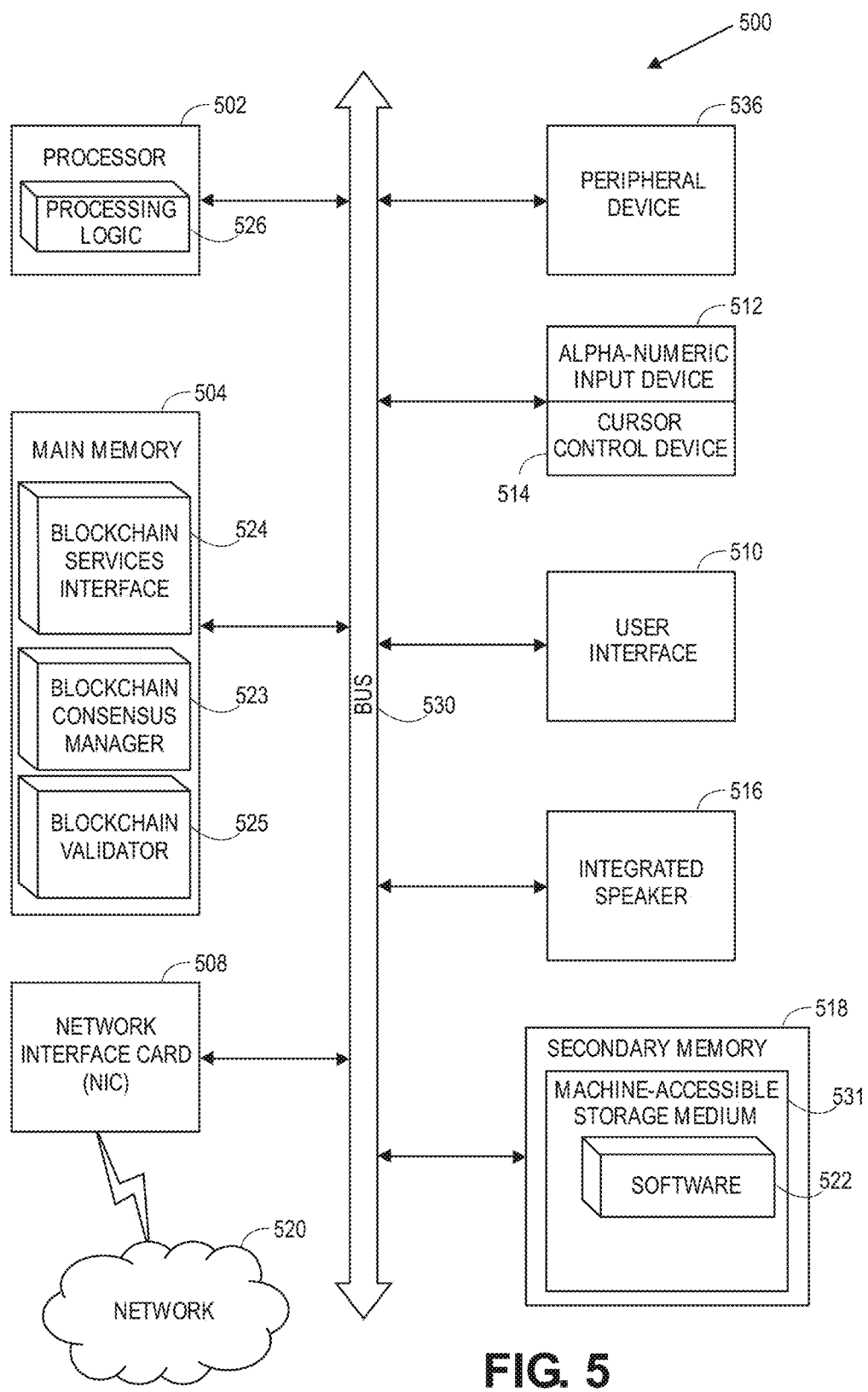
FIG. 5 illustrates a diagrammatic representation of a machine in the exemplary form of a computer system, in accordance with one embodiments.

FIG. 5 illustrates a diagrammatic representation of a machine 500 in the exemplary form of a computer system, in accordance with one embodiment, within which a set of instructions, for causing the machine/computer system 500 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and a persistent database and/or a multi-tenant database implementation), which communicate with each other via a bus 530. Main memory 504 includes a blockchain services interface 524 by which to interface tenants and users of the host organization with available supported blockchains, public or private. Main memory 504 also includes a blockchain consensus manager 523 and a block validator 525. Main memory 504 and its sub-elements are operable in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality which is discussed herein.

The computer system 500 may further include a network interface card 508. The computer system 500 also may include a user interface 510 (such as a video display unit, a liquid crystal display, etc.), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc.).

The secondary memory 518 may include a non-transitory machine-readable storage medium or a non-transitory computer readable storage medium or a non-transitory machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508.

Figure 6A:
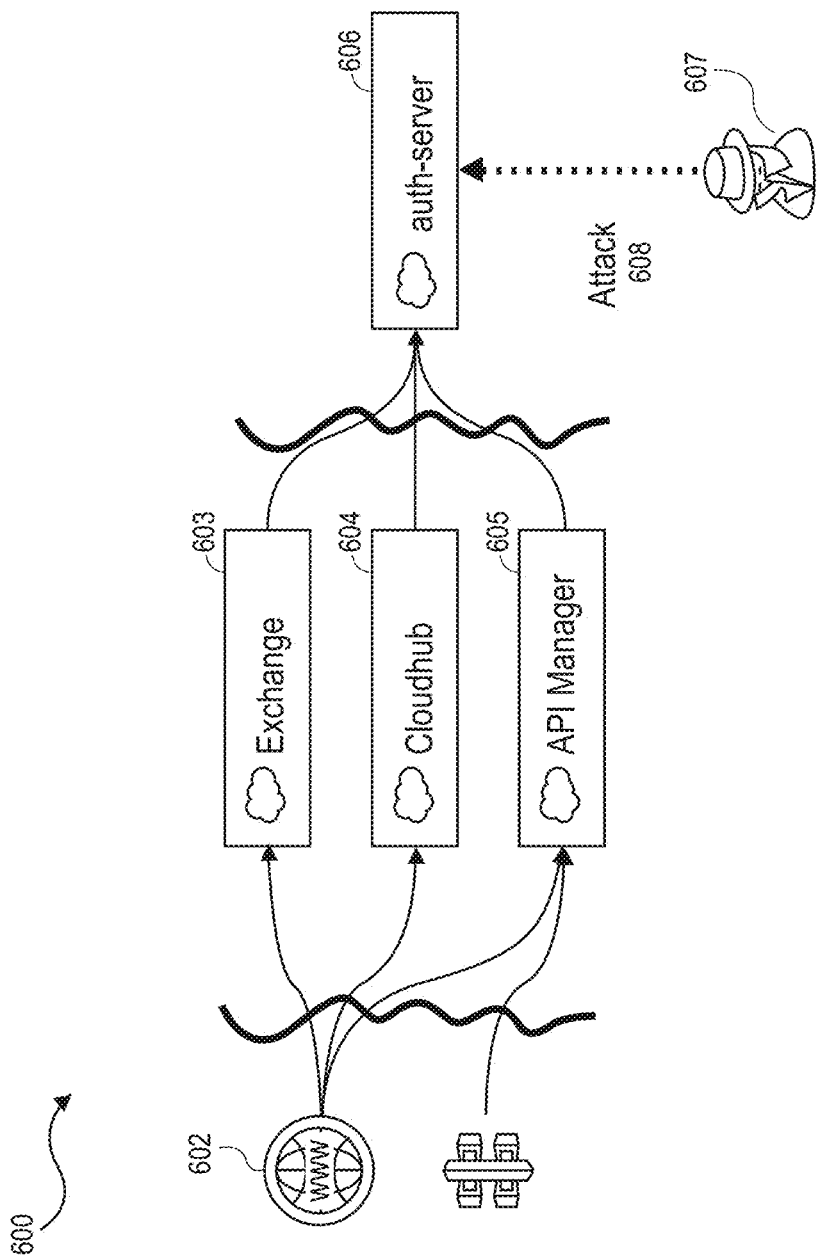
FIG. 6A depicts another exemplary architecture, in accordance with described embodiments.

FIG. 6A depicts another exemplary architecture 600, in accordance with described embodiments. Several components are connected with the world wide web (WWW) 602, including: Microsoft Exchange Online 603, a hosted messaging solution that delivers the capabilities of Microsoft Exchange Server as a cloud-based service and gives users access to email, calendar, contacts, and tasks from PCs, the web, and mobile devices; CloudHub services 604, a platform as a service (PaaS) component of Mulesoft's Anypoint Platform™—a global, fully-managed, multi-tenanted, secure, and highly available platform for APIs (i.e., an API gateway) and integrations; and an API manager service 605 that ensures every API is secure and governed, in particular, that secures APIs with policies, manages client access, groups APIs as products, and monitor and analyze traffic, providing the ability to manage all APIs from one place, no matter where the APIs and microservices are hosted and on which technologies they run. Each of the components 603, 604, and 605 is connected with an authentication-server 606. As shown here, the authentication server and service is potentially susceptible to attack 608 from a malicious user 607 due to the utilization of an access manager at the auth-server 606 in which every service call is authorized by the auth-server. Moreover, because the auth-server 606 must authorize every call, it presents a single point of failure and suffers from scalability problems, some of which are mitigated by client side caching and server side rate-limiting.

Figure 6B:
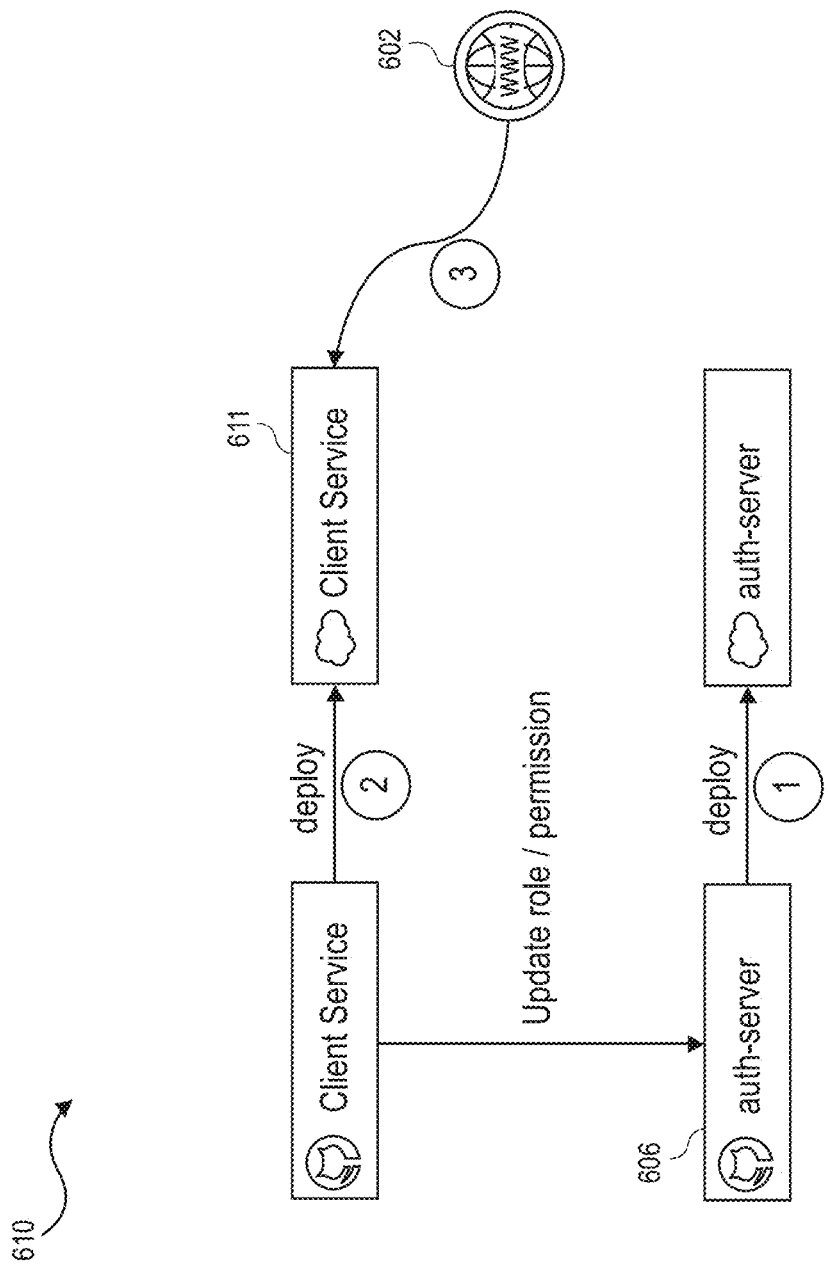
FIG. 6B depicts another exemplary architecture, in accordance with described embodiments.

FIG. 6B depicts another exemplary architecture 610, in accordance with described embodiments.

As shown here, there is again depicted the auth-server 606 which is in communication with other network components. When a request (3) comes from the world wide web (WWW) 602 to a client service cloud 611, the client service cloud deploys appropriate permissions or updated roles and permissions from the auth-server 606, with any updates also being concurrently deployed to the auth-service cloud. In such a way, an access manager or auth-server provides the necessary role and permission management, in which the client service owns the role and permission definition and changes are released depending on deploying any new version of auth-server.

While such a solution provides greater control for the client service who now owns the role permission definitions, some improvement may nevertheless be realized by migrating some portions to Distributed Ledger Technologies, such as blockchain.

Figure 6C:
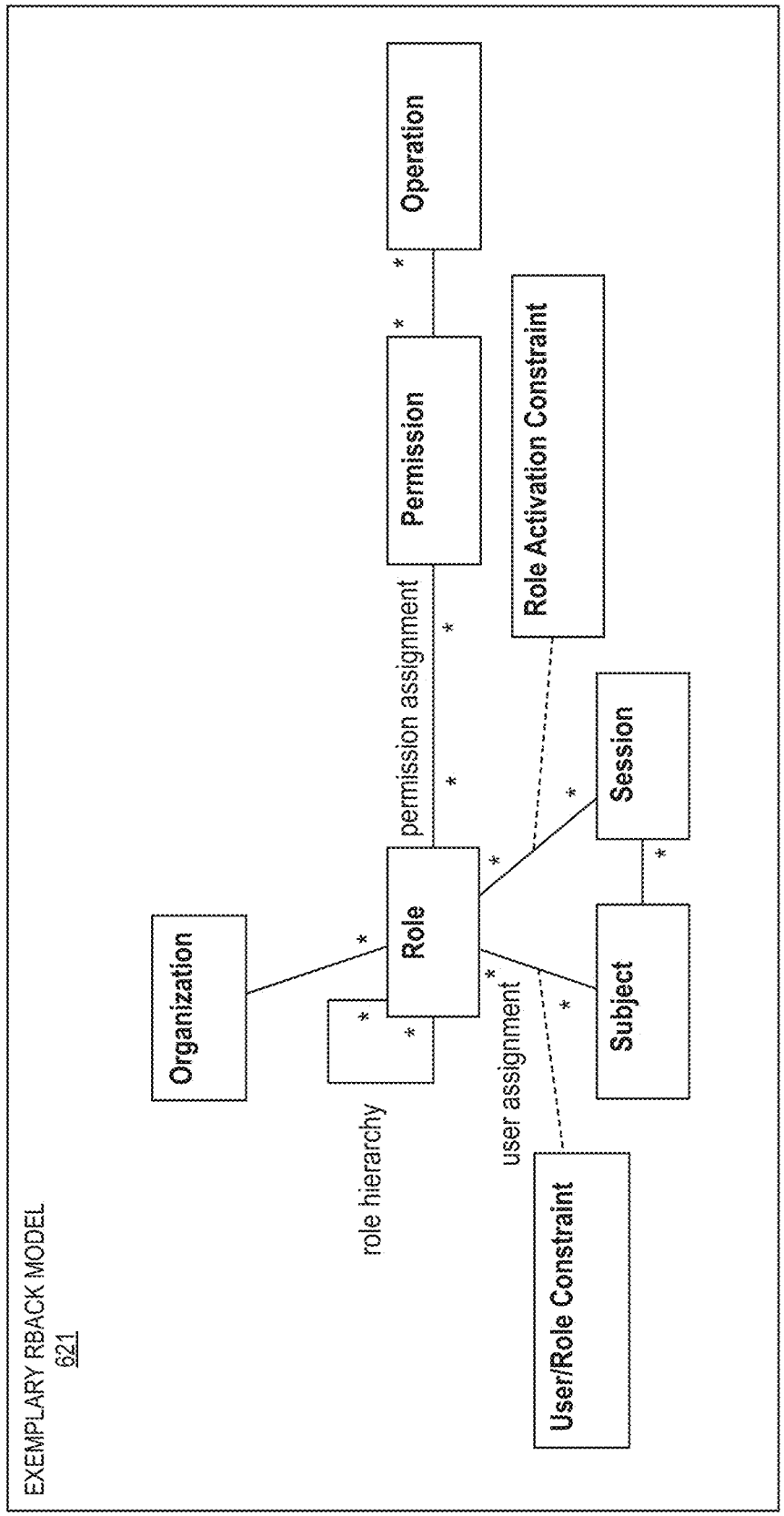
FIG. 6C depicts another exemplary architecture, specifically depicting an exemplary RBAC model, in accordance with described embodiments.

FIG. 6C depicts another exemplary architecture 620, specifically depicting an exemplary RBAC model 621, in accordance with described embodiments.

In computer systems security, Role-Based Access Control (RBAC) or role-based security is an approach to restricting system access by any unauthorized users. Utilized by many enterprises, RBAC implements Mandatory Access Control (MAC) or discretionary access control (DAC), thus rendering a policy-neutral access-control mechanism defined around roles and privileges. The components of RBAC such as role-permissions, user-role and role-role relationships make it simple to perform user assignments.

By way of example, roles may be created for various job functions with the permissions to perform certain operations being assigned to specific roles. Members or staff (or other system users) are assigned particular roles, and through those role assignments acquire the permissions needed to perform particular system functions. Since users are not assigned permissions directly, but only acquire them through their role (or roles), management of individual user rights becomes a matter of simply assigning appropriate roles to the user's account; this simplifies common operations, such as adding a user, or changing a user's department.

RBAC Rules include role assignment in which a subject can exercise a permission only if the subject has selected or been assigned a role; role authorization in which a subject's active role must be authorized for the subject. Operating with the first rule above, this ensures that users can take on only roles for which they are authorized. Lastly, rules for permission authorization exist in which a subject can exercise a permission only if the permission is authorized for the subject's active role and when used with the two preceding rules, this ensures that users may only exercise permissions for which they are authorized. Additional constraints may be applied as well, and roles can be combined in a hierarchy where higher-level roles subsume permissions owned by sub-roles.

In an RBAC-based system, an operation might be to 'create a credit account' transaction in a financial application or to 'populate a blood sugar level test' record in a medical application. The assignment of permission to perform a particular operation is meaningful, because the operations are granular with meaning within the application.

Figure 6D:
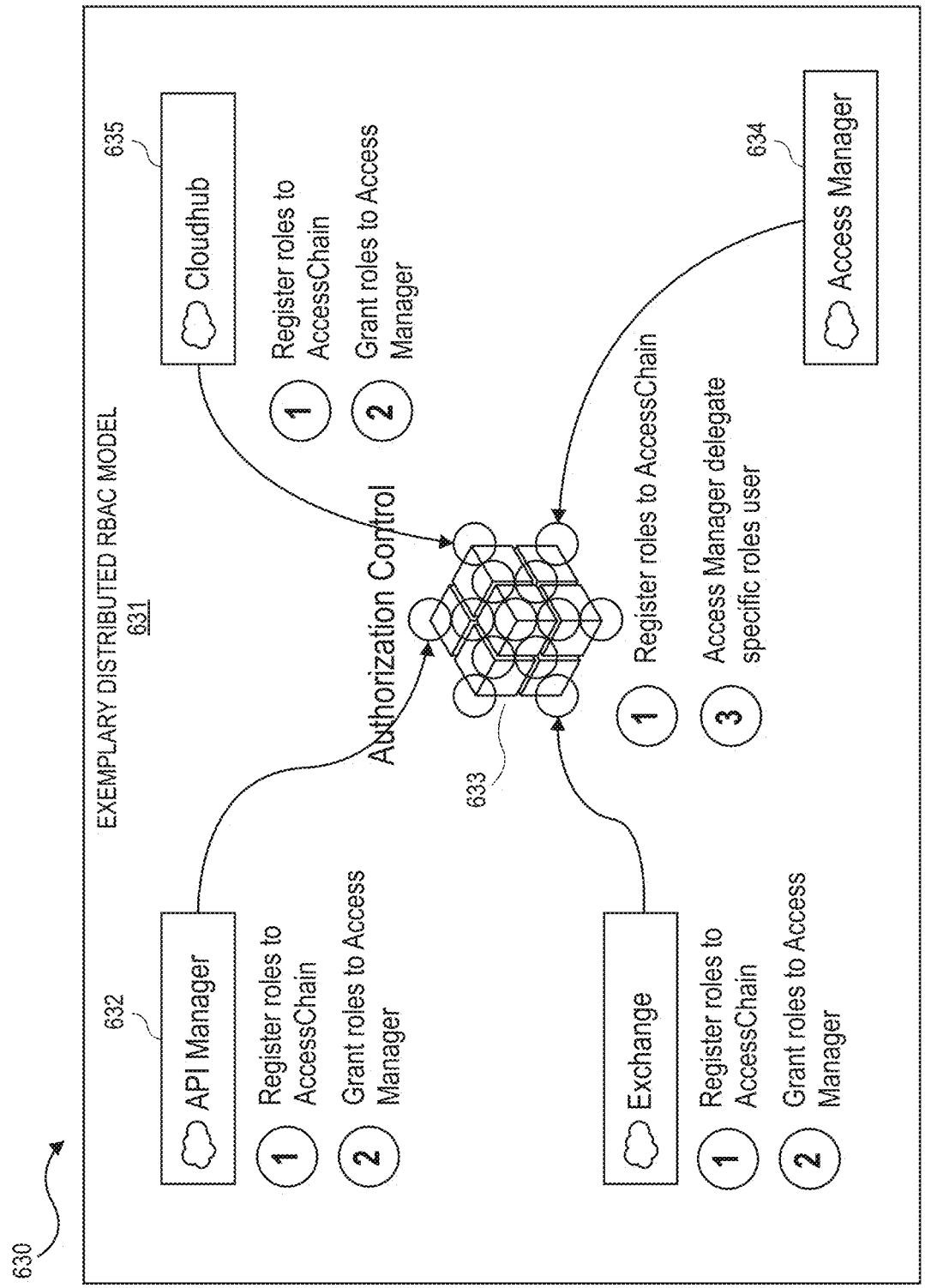
FIG. 6D depicts another exemplary architecture, specifically depicting an exemplary Distributed RBAC model, in accordance with described embodiments.

FIG. 6D depicts another exemplary architecture 630, specifically depicting an exemplary Distributed RBAC model 631, in accordance with described embodiments.

As shown here, the aspects of authorization control are distributed to the various end points including the API manager 632 which registers roles onto an AccessChain 633 (e.g., a blockchain configured for the purpose) and grants roles to the access manager 634, while the CloudHub 635 also registers roles to the AccessChain 633 and grants roles to the access manager 634, followed by the Exchange cloud 636 which, as with the other end points, also registers roles to the AccessChain 633 and grants roles to the access manager 634, and finally the Access Manager cloud which in addition to being able to register roles to the AccessChain, has the further capability of delegating specific roles to users.

In such a way, through the deployment of smart contracts onto an AccessChain configured blockchain network, all services own their own role definitions, while the AccessChain stores and validates and authorizes all permission mappings. Finally, the Access manager hosts "users" and facilitates the assignment of granular permissions at the user level.

Figure 6E:
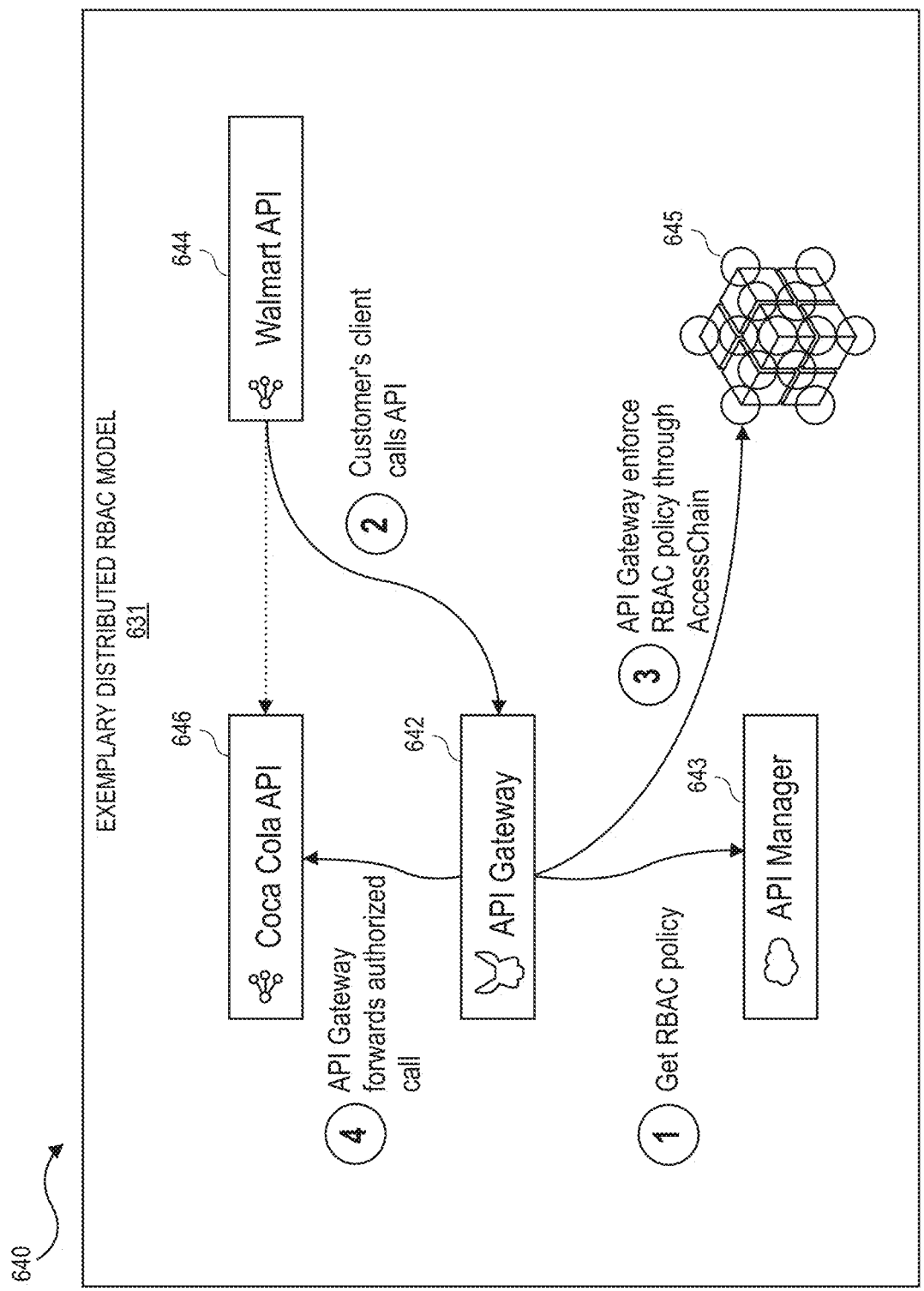
FIG. 6E depicts another exemplary architecture, specifically depicting an exemplary AccessChain configured Blockchain for Customer APIs, in accordance with described embodiments.

FIG. 6E depicts another exemplary architecture 640, specifically depicting an exemplary AccessChain configured Blockchain for Customer APIs 641, in accordance with described embodiments.

As shown here, there is an API gateway 642 which communicates with an API manager 643 to firstly receive or get the RBAC policy, and secondly the API gateway receives customers' client 644 calls to the API exposed by the API gateway. Third, the API gateway enforces the RBAC policies through the AccessChain configured blockchain 645. Fourth and finally, the API gateway forwards the authorized call to the customer specific or customer hosted API 646. Here it is shown that the Walmart API 644 is attempting to make a call to the CocaCola API 646, however, it must first be brokered through the API gateway 642 and subjected to RBAC policies which are persisted on the AccessChain configured blockchain.

According to such embodiments, the AccessChain 645 can enforce the RBAC policy between two distinct customers of the host organization, such as CocaCola and Walmart as shown in this example. Coca Cola defines the RBAC policy via the API manager 643 for the "CocaCola API" while Walmart requests access to the "/order" endpoint of the CocaCola API, to which access is granted pursuant to the RBAC policy enforced by the API gateway.

The API gateway 642 authorizes the request through the AccessChain 645 and responsively, pursuant to successful authorization, the API gateway forwards the call from Walmart to the CocaCola API 646.

Figure 6F:
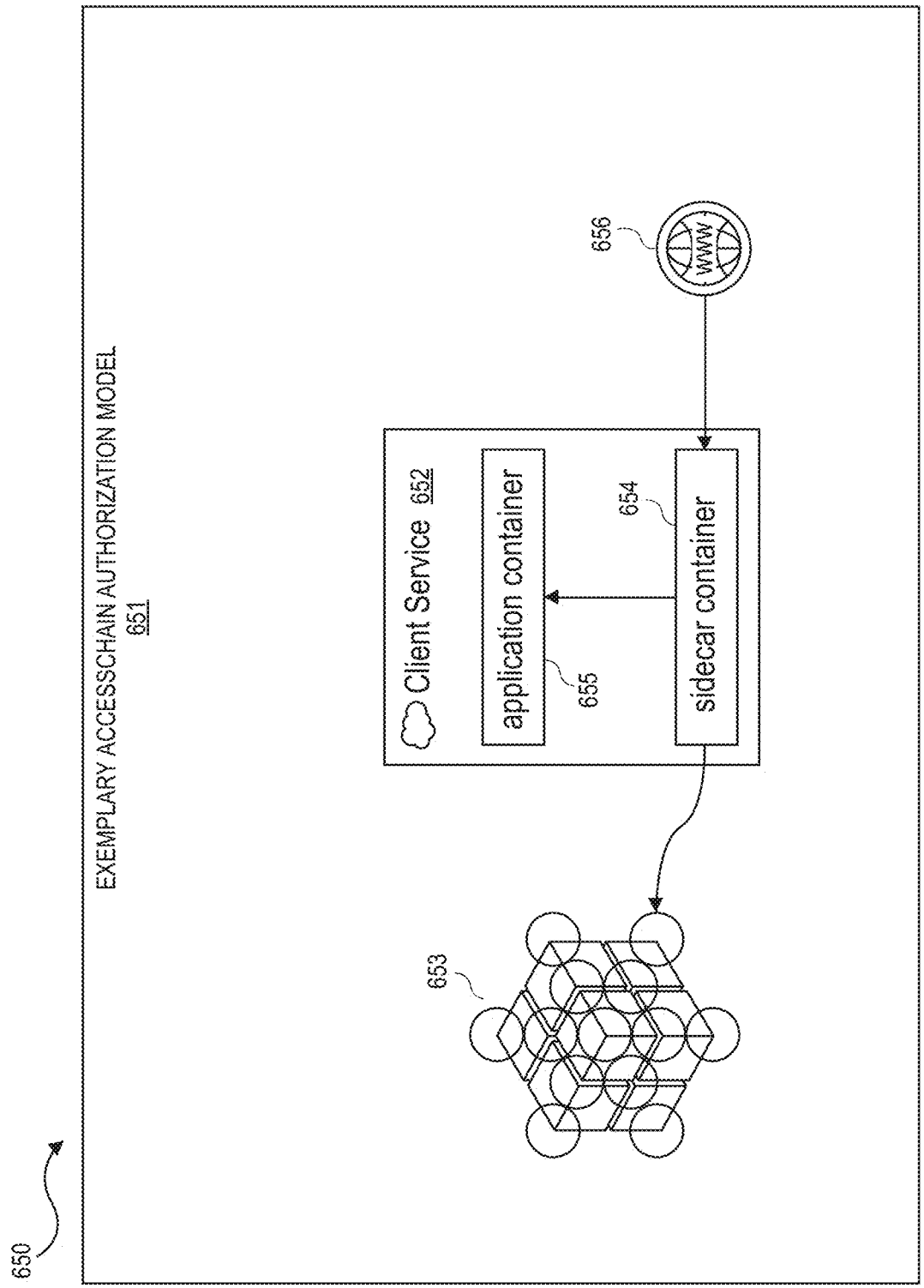
FIG. 6F depicts another exemplary architecture, specifically depicting an exemplary AccessChain Authorization Model in accordance with described embodiments.

FIG. 6F depicts another exemplary architecture 650, specifically depicting an exemplary AccessChain Authorization Model 651, in accordance with described embodiments.

As shown here, the Client Service cloud 652 communicates with the AccessChain configured blockchain 653 via its sidecar container 654 exposed via the application container 655 by the host organization's client service cloud, with the sidecar container being accessible from the WWW 656, and thus able to receive and process incoming API access authorization requests and RBAC policy enforcement.

In the sidecar, tasks such as authentication, validation, monitoring, logging, networking services, and configuration may be executed within the process as the parent application, making use of shared resources. Sidecar usage provides isolation of the parent and sidecar processes from other operations which may be running concurrently such that network fault will not jeopardize an entire application or other components. By separating the various application components (e.g., such as the access manager, the API manager, the Exchange service, the cloud hub, and the authorization control) into separate services, each of which are preferably built individually, it is possible to isolate any faults with one sub-part form the application as a whole. According to one embodiment, when an API call is intercepted, a sidecar is instantiated to perform the authentication of the API caller, with the sidecar process being tied to the API process having received the API call.

According to specific embodiments, the sidecar container 654 intercepts incoming requests and then the sidecar container utilizes the AccessChain 653 to perform the authorization check on the incoming user API request. If the user is authorized, then the sidecar container 654 forwards the request to the application container 655 for processing via the application logic. If the user is not authorized, then the sidecar simply returns an access denied message or ignores the request.

According to one embodiment, the host organization, via the API gateway cloud based services, provides microservices via a micro-service architecture, which performs authorization as a specially configured implementation of role based access control (RBAC) pattern in a centralized system.

Microservices are a software development technique, somewhat distinguished from service-oriented architecture (SOA) architectural styles in which Microservices structures provide an application as a collection of loosely coupled services. In a microservices architecture, services are fine-grained and the protocols are lightweight. The benefit of decomposing an application into different smaller services is that it improves modularity. This makes the application easier to understand, develop, test, and become more resilient to architecture erosion.

Moreover, microservices architectures parallelize development by enabling small autonomous teams to develop, deploy and scale their respective services independently while still permitting the architecture of an individual service to emerge through continuous refactoring, and thus enable continuous delivery and deployment which is ideal for fast paced markets or applications for which there are many customers with unique needs leading to high churn rates in the functionality provided.

According to described embodiments, a service resource (SR), and an authorization service (AS) is exposed as one of these microservice entities. The authorization service (AS) exposes a set of API for any service resource (SR) to create a set of permissions (P) and one or more roles (R), each role (R) can then be assigned with zero or more permissions (R) to access various entities (E) in the service resource (SR).

Later a user (U) may acquire some of the roles (R) by role assignment (by administrator) through RBAC compliant policies and with the designated roles (R), a user (U) can now attempt to access the service resource (SR).

When a resource service (SR) receives a request to access some entities it controls, the SR will communicate with authorization service (AS) to check whether the user has permission (P) to access the requested entity (E), if it does, SR will fetch the according data from its data store, and return the data back to user (U).

Sometimes, there are dependencies between resources, for example, SR(a) has an entity E(x) that partially depend on SR(b), and for each request made to retrieve a list of E(x), SR(a) first need to check AS for user's role and permission on E(x) and later it needs to fetch some data from SR(a)'s datastore and, at the same time, call SR(b) to retrieve some more data (here SR(b) may be a shared module used by many higher level services), SR(b) may also need to make a call to AS to check user's role/permissions.

From a user's standpoint, a single request to the host organization's cloud platform may therefore fan-out to many calls to authorization service (AS).

According to described embodiments, certain enhancements may be provided by the host organization on behalf of its customers.

The host organization's API gateway services provides integration software for connecting client or customer applications, data and devices. For example, the "Anypoint Platform" for integration permits customers of the host organization to integrate software as a service (SaaS) utilizing their own on-premises software and critically, their legacy systems.

The API gateway services may include middleware and messaging in addition to the integration platform as a service (iPaaS) approach for companies with such functionality including various modularized components available to customers such as Anypoint Design Center, which allows API developers to design and build APIs; Anypoint Exchange, a library for API providers to share APIs, templates, and assets; and Anypoint Management Center, a centralized web interface to analyze, manage, and monitor APIs and integrations, as well as a runtime engine which provides a runtime solution for connecting enterprise applications on-premises and to the cloud, which is designed to eliminate the need for custom point-to-point integration code by the business, with such capabilities instead being offered by the host organization's various cloud services.

As noted above, the scaling factor of an auth-server as a single point of contact is limited and could cause authorization service to degrade, especially as more customer utilize the service increasing total concurrent volume. Adding more resource types also potentially degrades authorization service (AS), thus resulting in the projected degradation of authorization service (AS) to be non-linear with an increase in volume. Moreover, while a resource service (RS) is the owner of the roles (R) and permissions (P) that access its entities, the storage, maintenance, validation and management of such information is handled by the authorization service (AS), thus centralizing RBAC policy enforcement. Therefore, the distributed RBAC model is utilized in accordance with certain embodiments so as to reduce the overhead consumed by data synchronization needs.

Where the authorization service (AS) is utilized as a centralized system, it is also the single point of failure, and therefore, the distributed RBAC model is utilized with roles and permissions being stored or persisted within an Access-Chain configured blockchain platform.

Use of the distributed model therefore improves scaling of the authorization service (AS) by adding caching capabilities on both sides of the API relationship (e.g., the requestor and the receiver), with each resource service (RS) needing to cache the role/permission mapping on their respective side which thus permits authorization service (AS) downtime at any single node, thus overcoming the problem of a single point of failure since the authorization service (AS) may be referenced by any functioning node of the Access-Chain configured blockchain network.

With such an architecture, the authorization service (AS) itself needs includes caching to handle increased loads over time, thus again improving scaling. Moreover, through the use of the distributed RBAC model and AccessChain configured blockchain, the authorization service (AS) becomes significantly more resilient to attack from, for example, a coordinated DDoS or DoS attack. Even if a malicious actor were to attack the distributed authorization service (AS), only a single node would be taken down. While multiple nodes may be attacked simultaneously, it takes a computationally infeasible amount of computational processing power and network bandwidth to attack all nodes of a blockchain network of any significant size, thus thwarting any such attack in terms of the attack's effectiveness. Should a massive DDOS attack occur, the profile of the increased network activity with predictable nodes corresponding to the participating nodes of the AccessChain configured blockchain network would quickly attract attention by network operators, thus making the attack again an ineffective exercise.

The distributed blockchain network via an AccessChain configured blockchain for the authorization service (AS) overcomes the above scalability issues, the single point of failure issues, and the susceptibility to attack issues by utilizing blockchain and Distributed Ledger Technologies (DLT) to persist and manage the roles, permissions, and user mappings via a distributed system which execute smart contracts.

With such a model, there simply is no need for a centralized authorization service (AS) as each resource service (RS) creates a smart contract that maps a set of roles (R) to a set of entities (E) owned by the resource service (RS).

Users (U) acquire roles by creating a smart contract that maps the user's ID to a role entity. All of the mappings in conjunction with the smart contracts are themselves stored in the blockchain. When a user (U) makes a request to access an entity (E) on some resource service (RS), the permission check is validated via the AccessChain configured distributed network of miners with a router sitting in front of each resource service. Such a distributed system thus requires any DOS/DDOS to interact with the AccessChain configured blockchain, which dramatically increases the resource requirements for the attacker and thus makes their efforts highly inefficient.

Further still, scaling of such a distributed system is greatly simplified since the capacity may be increased simply by deploying more miners into the network, which is relatively simple to do elastically and automatically.

Therefore, such an approach scales linearly, is more cost efficient, is more resilient to DDOS/DoS attacks and is nearly impenetrable to any data mutation penetration attack.

It is therefore in accordance with the described embodiments that the host organization improves resiliency and speed on behalf of its customers by operating blockchain network nodes in more than one location and in more than one datacenter, thus eliminating any risk of a single point of failure.

In accordance with additional embodiments, the host organization's API service cloud additionally aids customers with identifying and understanding the shape of their own API. Prior solutions required that any customer providing an API must themselves define, document, and help anyone interacting with the API to understand how to utilize the API.

For example, if CocaCola provides an API to order goods and Walmart wishes to utilize the API, then it is CocaCola who must define and help Walmart understand how to utilize the API.

However, through the use of the AccessChain configured blockchain, according to certain embodiments, metadata defining the structure of the API and what entities and field definitions are permissibly utilized via the API may be documented and persisted onto the blockchain along with the roles, permissions, and users, such that any participating node may access and retrieve such information from the blockchain without having to request such data directly from the API creator. In this example, Walmart can pull the necessary data from the blockchain without having to contact CocaCola directly, assuming Walmart has access rights to the blockchain (e.g., depending upon whether it is a private or a public blockchain).

However, it is still possible that the API caller may not understand how to utilize the API. In such a situation, the host organization may actually provide support services on behalf of CocaCola, if desired, to help any business calling the API. Such support may come in the way of simplified GUIs published by the host organization which may be auto-generated based on saved API metadata, as well as written "how to" and "FAQ" support pages, and live customer service support, if necessary.

Consider for example that a content publisher has multiple APIs, one for movie data, an API for sports data, and another API for TV data.

Prior solutions required replicating the databases to permit access by the different APIs, which is a difficult process, a wasteful and inefficient process, and a process which may sometimes lead to downtime as the replicated database must be halted or locked for a period of time, just for the sake of replication. Then any updates to the database creates synchronization problems as well as additional downtime when upgrading smart contracts, which is a somewhat frequent operation.

However, through the use of the distributed model of the distributed RBAC and the use of the AccessChain configured blockchain, it is possible to roll out new smart contract upgrades without any downtime, as it is not necessary to lock any database. Rather, each node on the blockchain, upon consensus for the smart contract upgrade, with reference the new block on the main or primary chain of the blockchain as the authoritative source, which will have the upgraded smart contract.

Moreover, even if a node on the blockchain goes down, there is no overall negative effect on the blockchain network since by definition it is a distributed network with many operational participating nodes at any given time. Therefore, even if a node being utilized goes offline, the data persisted to the blockchain remains accessible via other participating nodes.

Further still, any attack against the host organization's authentication services for accessing the API gateway services, such as submission of fake credentials, requires the attacker to first authenticate with the blockchain itself and then perform work hashing just to transact their attack onto the blockchain, which will then reject the fraudulent transactions through a lack of consensus. As described above, it is possible in theory, but computationally infeasible to produce enough computational resources to hash and transact sufficient blocks at a sufficient number of participating nodes, to force consensus of a fraudulent transaction as the malicious actor would be in competition with the entirety of the remaining distributed network. Therefore, any actor requires enough of the participating nodes to either conspire with them, which the nodes have no incentive whatsoever to do, or must themselves possess a sufficient number of malicious conspiring participating nodes to grant themselves consensus for their own fraudulent transaction, which again, would simply require too great of computational resources to be worthwhile for nearly any malicious actor and possibly for any malicious actor.

With Blockchain, miners use special software to solve math problems and are typically issued some value from Blockchain in exchange, such as bitcoin, transaction fees, etc. This provides an incentive for more people to mine. In the case of the host organization, however, additional computational resources may be applied as miners, without necessarily having additional individual actors join the mining pool, though they may if the AccessChain configured blockchain is a publicly accessible blockchain.

Historically, miners used central processing unit (CPU) to mine, but soon this wasn't fast enough and it bogged down the system resources of the host computer. Miners quickly moved on to using the graphical processing unit (GPU) in computer graphics cards because they were able to hash data 50 to 100 times faster and consumed much less power per unit of work.

An entire industry sprang up with custom equipment that pushed the performance standards even higher, for instance, using field-programmable gate array (FPGA) processors and attached to computers using a convenient USB connection. FPGA miners used much less power than CPU's or GPU's and made concentrated mining farms possible for the first time.

Now, Application-specific integrated circuit (ASIC) miners have taken over with the ASIC machines mining at unprecedented speeds while consuming much less power than FPGA or GPU mining hardware.

Through the use of the application-specific integrated circuit chips (ASICs), Blockchain miners can solve blocks much quicker and use less electricity or power than older Blockchain mining hardware like CPUs, GPUs or FPGAs.

Regardless of the technology utilized, the blockchain miners are incentivized to apply computational resources to the workload demands of the blockchain, being rewarded with bitcoin or some other value in by the Blockchain or being rewarded with transaction fees on certain blockchains.

However, the application of computational resources is entirely based upon the blockchain miners having the current capacity, capable computer hardware, and sometimes an element of luck.

Figure 7:
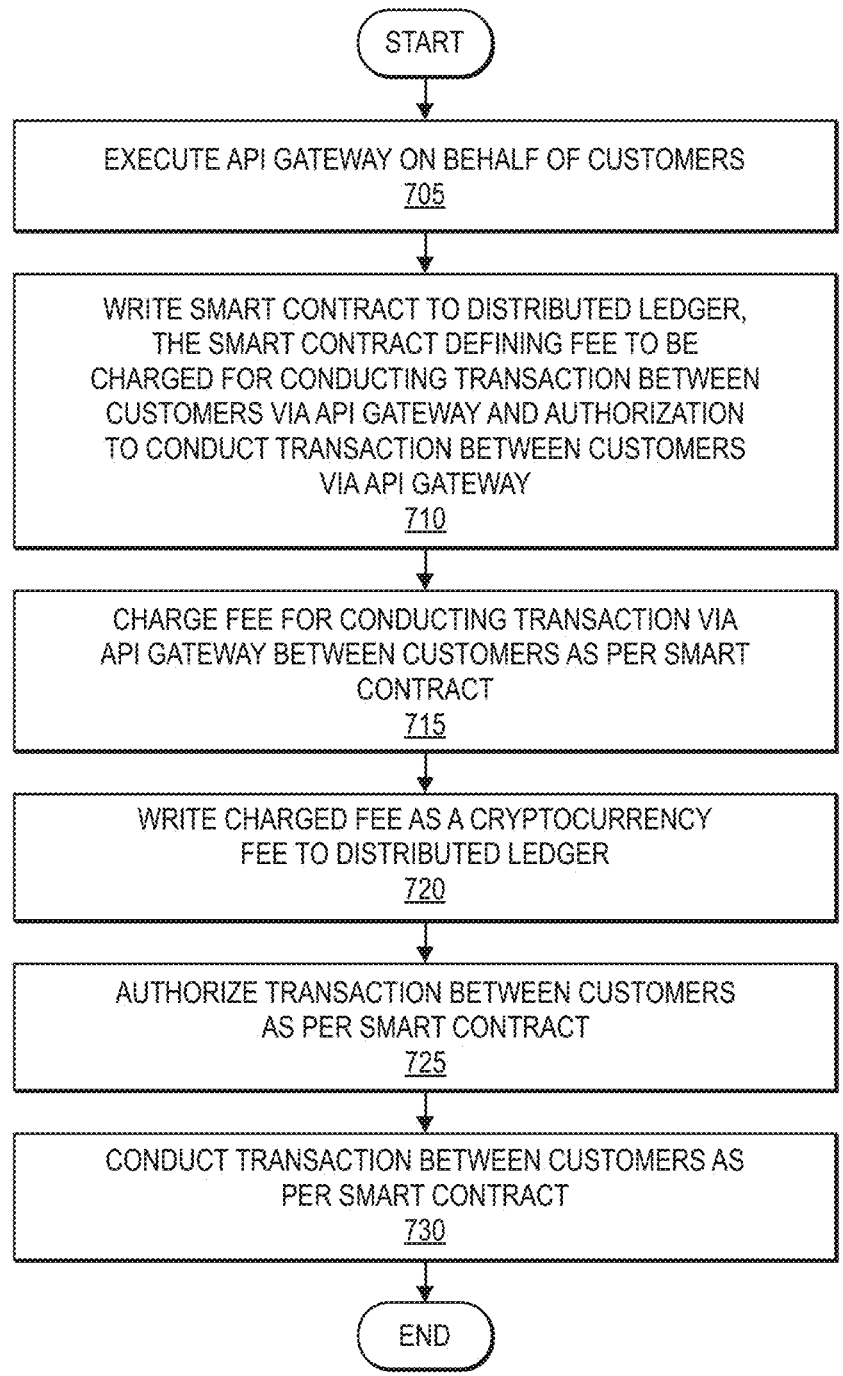
FIG. 7 is a flow chart of a method in accordance with described embodiments.

FIG. 7 is a flow diagram illustrating a method performed by a system of a host organization, according to an embodiment of the invention. At logic block 705, an API gateway, for example, executing on or by a host organization in a cloud computing environment, operates an interface to a private electronic distributed ledger on behalf of customers of the host organization. In one embodiment, each of the customers operate as a participating node on the distributed ledger. The API gateway is a platform that provides API integration on behalf of the and between customers of the host organization.

Logic 710 transacts, or writes, a smart contract to the distributed ledger. In one embodiment, the distributed ledger is a permissioned (private) blockchain. The smart contract defines, among many other things, a fee to be charged for conducting a transaction between two or more customers via the API gateway. Additionally, logic 715 provides for the smart contract to define fees that can be charged for conducting transactions via the API gateway between the customers as per the smart contract. The fees can vary according the type, timing, or number of transactions conducted between the customers, as per the smart contract.

According to an embodiment, logic 720 may record, or write, the charged fees on to the distributed ledger as a cryptocurrency transaction between the customers. As discussed above in connection with FIGS. 6A-6F, logic 725 provides for the smart contract further defining appropriate authorizations for conducting transactions between the customers via the API gateway. Accordingly, logic 725 provides for defining in the smart contract a unique identifier of, and security information for, each customer, as well as the number and types of transactions that may be conducted between the customers.

Finally, logic 725 authorizes the transaction between the customers via the API gateway as per the smart contract, and logic 730 executes the transaction between the customers as per the smart contract, responsive to the authorization, via the API gateway.

According to another embodiment of the method, the private blockchain operates as a private electronic distributed ledger ("distributed ledger") upon which transaction fees are levied for transactions initiated by the customers as per the smart contract; and in which the method further includes writing the charged fee as a cryptocurrency fee to the distributed ledger in realization of the transaction fees for all transactions initiated by the customers.

According to another embodiment of the method, the smart contract further defining authorization for conducting the transaction between the customers via the API gateway.

According to another embodiment of the method, the smart contract defining authorization for conducting the transaction between the customers includes the smart contract defining a unique identifier of and security information for each customer, and a number and types of transactions that may be conducted between the customers.

According to another embodiment, the method further includes: authorizing at the API gateway the transaction between the customers as per the smart contract.

According to another embodiment, the method further includes: conducting at the API gateway the transaction between the customers as per the smart contract, responsive to the authorization.

According to another embodiment of the method, authorizing at the API gateway the transaction between the customers as per the smart contract includes: receiving at the API gateway a request from a first one of the customers to conduct the transaction between the customers via the API gateway; and obtaining at the API gateway from the smart contract on the distributed ledger authorization to conduct the transaction between the customers via the API gateway responsive to the request.

According to another embodiment of the method, authorizing at the API gateway the transaction between the customers as per the smart contract further includes confirming at the API gateway that the customer requesting to conduct the transaction is financially able to pay the fee for conducting the transaction between the customers as per the smart contract.

According to another embodiment, the method further includes: conducting the transaction at the API gateway between the customers as per the smart contract.

According to another embodiment of the method, receiving at the API gateway the request from the first one of the customers to conduct the transaction between the customers via the API gateway includes receiving at the API gateway the request from an API for the first one of the customers to conduct the transaction between the customers via the API gateway; and in which conducting the transaction at the API gateway between the customers as per the smart contract includes receiving at the API gateway a reply from an API for a second of the customers in response to the request from the API for the first of the customers to conduct the transaction between the customers via the API gateway.

According to another embodiment of the method, writing at the API gateway the smart contract to the distributed ledger includes writing at the API gateway the smart contract to a permissioned blockchain.

According to a particular embodiment, there is a non-transitory computer readable storage medium having instructions stored thereon that, when executed in a hosted computing environment by a processor and a memory therein, cause the hosted computing environment to perform the following operations: operating an interface to a private electronic distributed ledger (hereinafter "distributed ledger") on behalf of a plurality of customers of the host organization, in which each of the plurality of customers operate as a participating node on the distributed ledger; executing an API gateway on behalf of the plurality of customers; writing a smart contract to the distributed ledger, the smart contract defining a fee to be charged for conducting a transaction between the customers via the API gateway; and charging the fee for the conducting the transaction via the API gateway between the customers as per the smart contract.

According to yet another embodiment, there is a system to execute at a host organization, in which the system includes: a memory to store instructions; a processor to execute instructions; in which the system is configurable to execute the instructions via the processor to carry out operations including: executing instructions via the processor for operating a blockchain services interface to a private blockchain on behalf of a plurality of customers of the host organization, in which each of the plurality of customers operate as a participating node on the private blockchain; executing an API gateway on behalf of the plurality of customers; writing a smart contract to the private blockchain, the smart contract defining a fee to be charged for conducting a transaction between the customers via the API gateway; and charging the fee for the conducting the transaction via the API gateway between the customers as per the smart contract.

Figure 8:
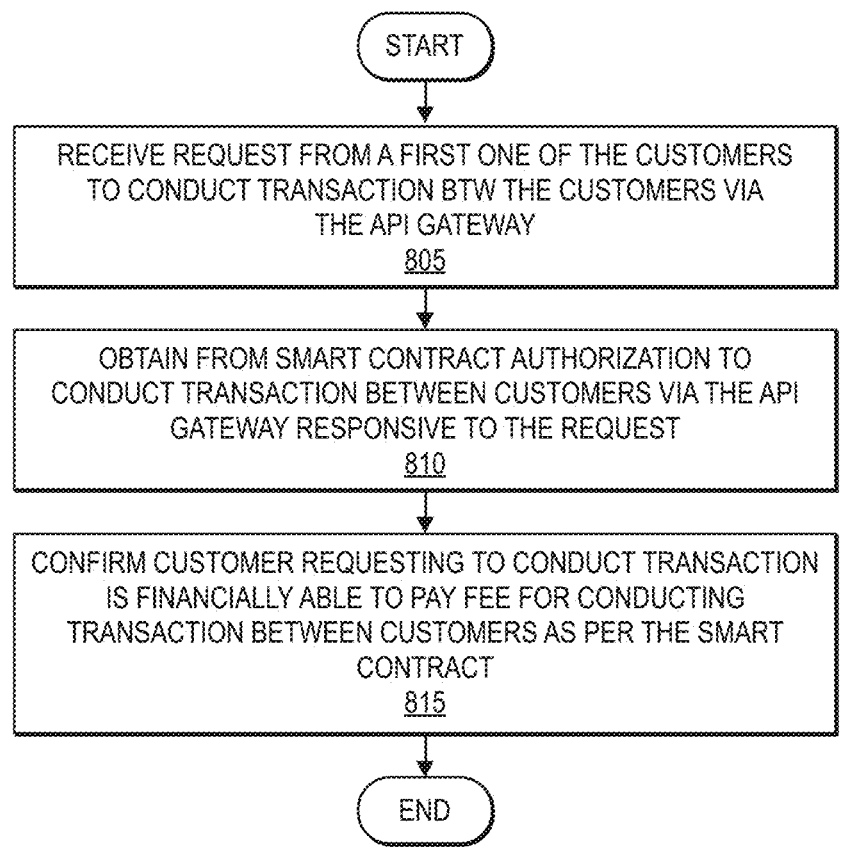
FIG. 8 is a flow chart of a method in accordance with described embodiments.

FIG. 8 is another flow diagram illustrating further aspects of the method performed by the system of the host organization according to an embodiment of the invention. According to the embodiment, logic 805 for authorizing at the API gateway the transaction between the customers as per the smart contract comprises logic for receiving at the API gateway a request from a first one of the customers to conduct the transaction between the customers via the API gateway, and logic 810 for obtaining at the API gateway from the smart contract on the distributed ledger authorization to conduct the transaction between the customers via the API gateway, responsive to the request.

According to the embodiment the logic for authorizing at the API gateway the transaction between the customers as per the smart contract further comprises logic 815 for confirming at the API gateway that the customer requesting to conduct the transaction is financially able to pay the fee for conducting the transaction between the customers as per the smart contract. The logic then provides for actually conducting the transaction at the API gateway between the customers as per the smart contract.

According to the embodiment, logic 805 receives at the API gateway the request from an API for the first one of the customers to conduct the transaction between the customers via the API gateway. Likewise, the logic providing for conducting the transaction at the API gateway between the customers as per the smart contract receives at the API gateway a reply from an API for a second of the customers in response to the request from the API for the first of the customers to conduct the transaction between the customers via the API gateway. In such a manner, the API gateway provides integration between the respective customer APIs.

Thus, embodiments of the invention provide for the ability to leverage a cryptocurrency charge for every transaction traversing the API gateway between cooperating customers. The API gateway provides for managing the contract between the customers, including managing a smart contract that manages the APIs between the customers, wherein the smart contract is stored on a distributed ledger accessible to the API gateway. The API gateway itself can enforce actual payment of transaction fees between the customer APIs and track such via the distributed ledger, based on one or more of the number, type, timing, and rate, of transactions between the customers that the API gateway authorizes to conduct transactions, all of which can be tracked by the API gateway in a distributed ledger.

Figure 9:
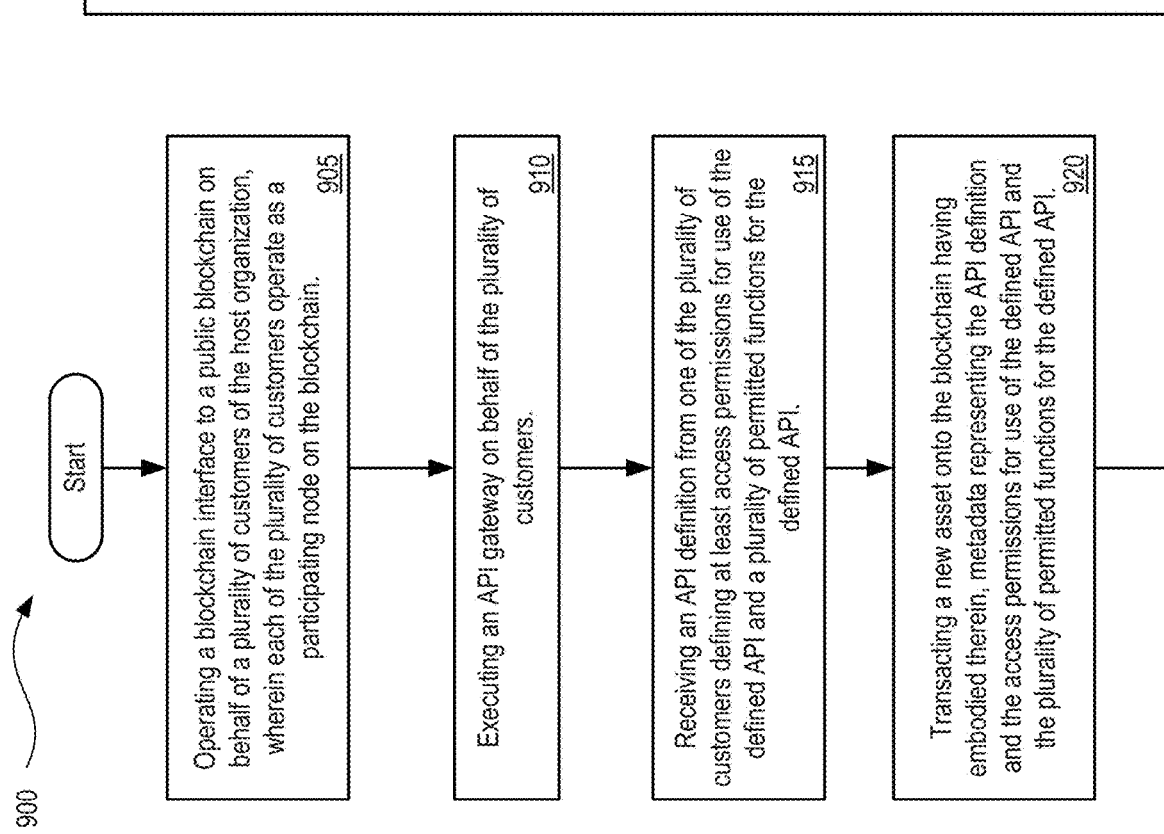
FIG. 9 depicts a flow diagram illustrating a method for implementing a role based access control and authorization validator via blockchain smart contract execution using Distributed Ledger Technology (DLT), in accordance with described embodiments.

FIG. 9 depicts a flow diagram illustrating a method 900 for implementing a role based access control and authorization validator via blockchain smart contract execution using Distributed Ledger Technology (DLT) in conjunction with a cloud based computing environment, such as a database system implementation supported by a processor and a memory to execute such functionality to provide cloud based on-demand functionality to users, customers, and subscribers.

Method 900 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 190, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 900 depicted at FIG. 9, beginning with block 905, processing logic operates a blockchain interface to a public blockchain on behalf of a plurality of customers of the host organization, wherein each of the plurality of customers operate as a participating node on the blockchain.

At block 910, processing logic executes an API gateway on behalf of the plurality of customers.

At block 915, processing logic receives an API definition from one of the plurality of customers defining at least access permissions for use of the defined API and a plurality of permitted functions for the defined API.

At block 920, processing logic transacts a new asset onto the blockchain having embodied therein, metadata representing the API definition and the access permissions for use of the defined API and the plurality of permitted functions for the defined API.

At block 925, processing logic intercepts, via the executing API gateway, an API call directed at the defined API.

At block 930, processing logic retrieves the metadata from the blockchain.

At block 935, processing logic authenticates an API caller associated with the API call based on the access permissions from the retrieved metadata.

At block 940, processing logic forwards the API call to the appropriate customer pursuant to successful authentication of the API caller.

According to another embodiment of method 900, the metadata is written to the blockchain upon the new asset having reached consensus from the participating nodes of the blockchain.

According to another embodiment of method 900, access to the metadata from a non-responsive participating node on the blockchain is restored by requesting the metadata from a different participating node on the blockchain.

According to another embodiment, method 900 further includes: generating a GUI interface at the host organization based on the metadata for the defined API stored to the blockchain; and publishing the generated GUI to the API caller to receive API call input; and in which intercepting the API call directed at the defined API includes receiving the API call at the generated GUI and subjecting the API caller to authentication.

According to another embodiment of method 900, intercepting the API call directed at the defined API includes receiving the API call from a bot or system performing Machine to Machine (M2M) communications between a customer and an API gateway owner.

According to another embodiment of method 900, authenticating the API caller includes applying distributed Role-Based Access Control (RBAC) to the intercepted API call to authenticate the API caller based on one or more specific roles delegated to a user having originated the API call.

According to another embodiment of method 900, the host organization operates an access manager to delegate one or more specific roles to each of a plurality of users; in which the access manager registers the delegated one or more specific roles onto the blockchain by transacting metadata defining the delegated one or more specific roles onto the blockchain to be persistently stored.

According to another embodiment of method 900, the host organization operates an AccessChain via the blockchain to apply and enforce distributed Role-Based Access Control (RBAC) for any API call received and intercepted; and in which the AccessChain is to perform an authorization check for a user having originated the incoming API call.

According to another embodiment of method 900, the API call is associated with a specific transaction type; in which the API call is received as a transaction at the blockchain and automatically triggers a smart contract based on the specific transaction type associated with the API call; and in which the smart contract is to perform an authorization check for a user having originated the incoming API call pursuant to defined distributed Role-Based Access Control (RBAC) having been previously written onto the blockchain.

According to another embodiment of method 900, the metadata written onto the blockchain within the new asset defines one or more delegated roles for a plurality of users; and in which the smart contract automatically triggers implements AccessChain functionality by executing the smart contract at the blockchain to perform an authorization check for a user having originated the incoming API call.

According to another embodiment of method 900, the API call intercepted at the API gateway is intercepted via a sidecar process tied to an API process executing the defined API; in which the sidecar is to perform an authorization check for a user having originated the incoming API call; in which the sidecar returns an access denied message or ignores the request in the event of a failed authentication attempt; and in which the sidecar forwards the API call intercepted at the API gateway to an application container for processing via application logic for handling an authenticated and successfully received API call.

According to another embodiment of method 900, an AccessChain executing at the blockchain levies a cryptocurrency fee for all transactions intercepted at the API gateway which are successfully authenticated.

According to a particular embodiment, there is a non-transitory computer readable storage medium having instructions stored thereon that, when executed by a system of a host organization having at least a processor and a memory therein, the instructions cause the system to perform the following operations: operating a blockchain interface to a public blockchain on behalf of a plurality of customers of the host organization, in which each of the plurality of customers operate as a participating node on the blockchain; executing an API gateway on behalf of the plurality of customers; receiving an API definition from one of the plurality of customers defining at least access permissions for use of the defined API and a plurality of permitted functions for the defined API; transacting a new asset onto the blockchain having embodied therein, metadata representing the API definition and the access permissions for use of the defined API and the plurality of permitted functions for the defined API; intercepting, via the executing API gateway, an API call directed at the defined API; retrieving the metadata from the blockchain; authenticating an API caller associated with the API call based on the access permissions from the retrieved metadata; and forwarding the API call to the appropriate customer pursuant to successful authentication of the API caller.

According to yet another embodiment, there is a system to execute at a host organization, in which the system includes: a memory to store instructions; a processor to execute instructions; in which the system is configurable to execute the instructions via the processor to carry out operations including: operating a blockchain interface to a public blockchain on behalf of a plurality of customers of the host organization, in which each of the plurality of customers operate as a participating node on the blockchain; executing an API gateway on behalf of the plurality of customers; receiving an API definition from one of the plurality of customers defining at least access permissions for use of the defined API and a plurality of permitted functions for the defined API; transacting a new asset onto the blockchain having embodied therein, metadata representing the API definition and the access permissions for use of the defined API and the plurality of permitted functions for the defined API; intercepting, via the executing API gateway, an API call directed at the defined API; retrieving the metadata from the blockchain; authenticating an API caller associated with the API call based on the access permissions from the retrieved metadata; and forwarding the API call to the appropriate customer pursuant to successful authentication of the API caller.

Figure 10:
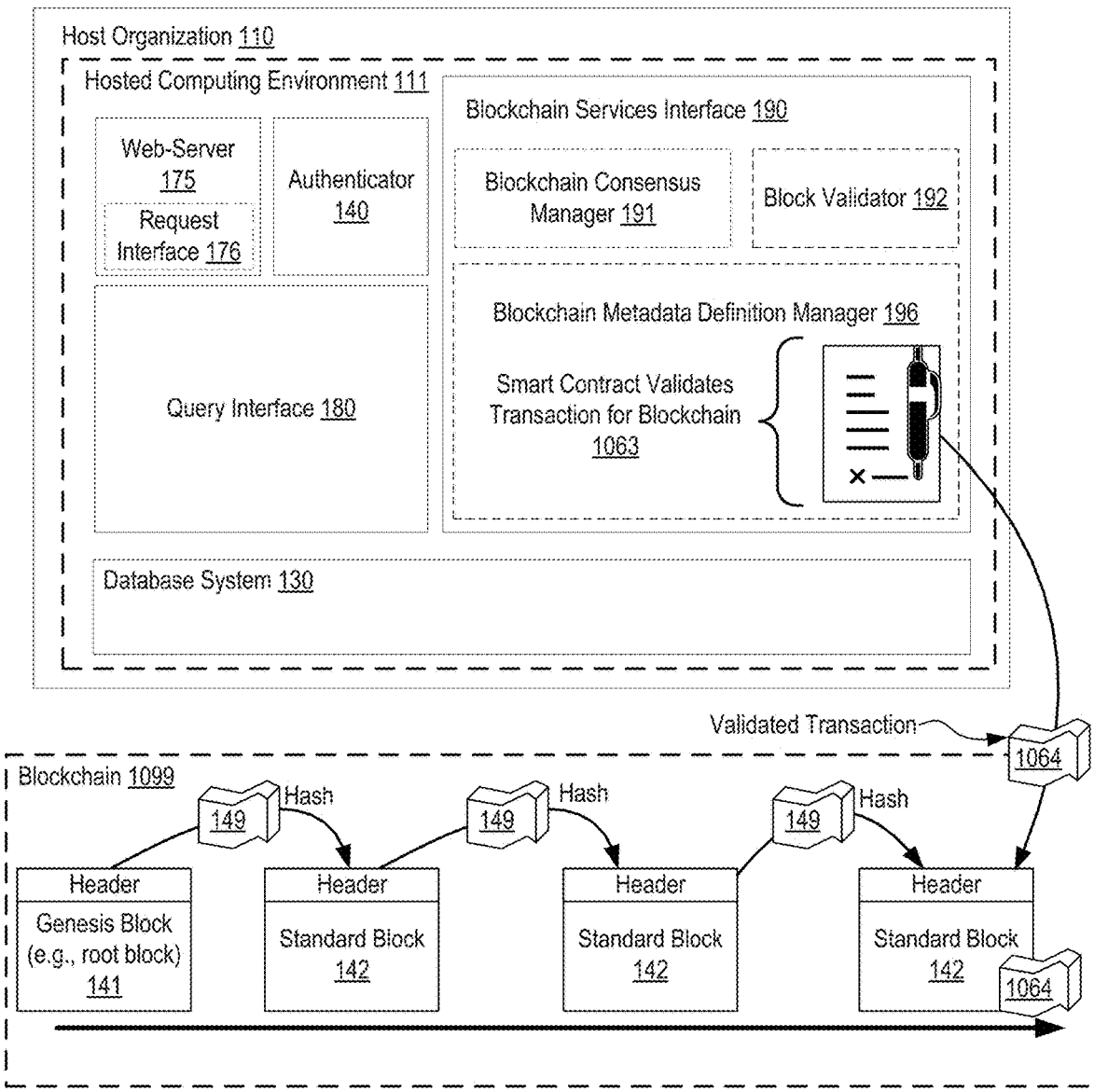
FIG. 10 depicts another exemplary architecture in accordance with described embodiments.

FIG. 10 depicts another exemplary architecture 1000 in accordance with described embodiments.

According to one embodiment, the blockchain metadata definition manager 196 writes data or metadata onto a blockchain by transacting an asset to the blockchain or adding an asset to the blockchain via a new transaction with the blockchain. According to a particular embodiment, the transaction has a specific transaction type, for instance, defined as a blockchain storage transaction type, which triggers execution of a smart contract to perform validation of the transaction and specifically to perform validation of the data or metadata within the asset being added to or transacted onto the blockchain.

For example, such a smart contract 1063 may execute via the host organization's blockchain services interface 190 which performs the validation and then transacts the new asset onto the blockchain pursuant to successful validation of the data or metadata within the asset being stored on the blockchain. As shown here at element 1063, a smart contract executes and validates the transaction for the blockchain. Subsequently, a validated transaction 1064 is then added to or transacted onto the blockchain 1099.

Figure 11A:
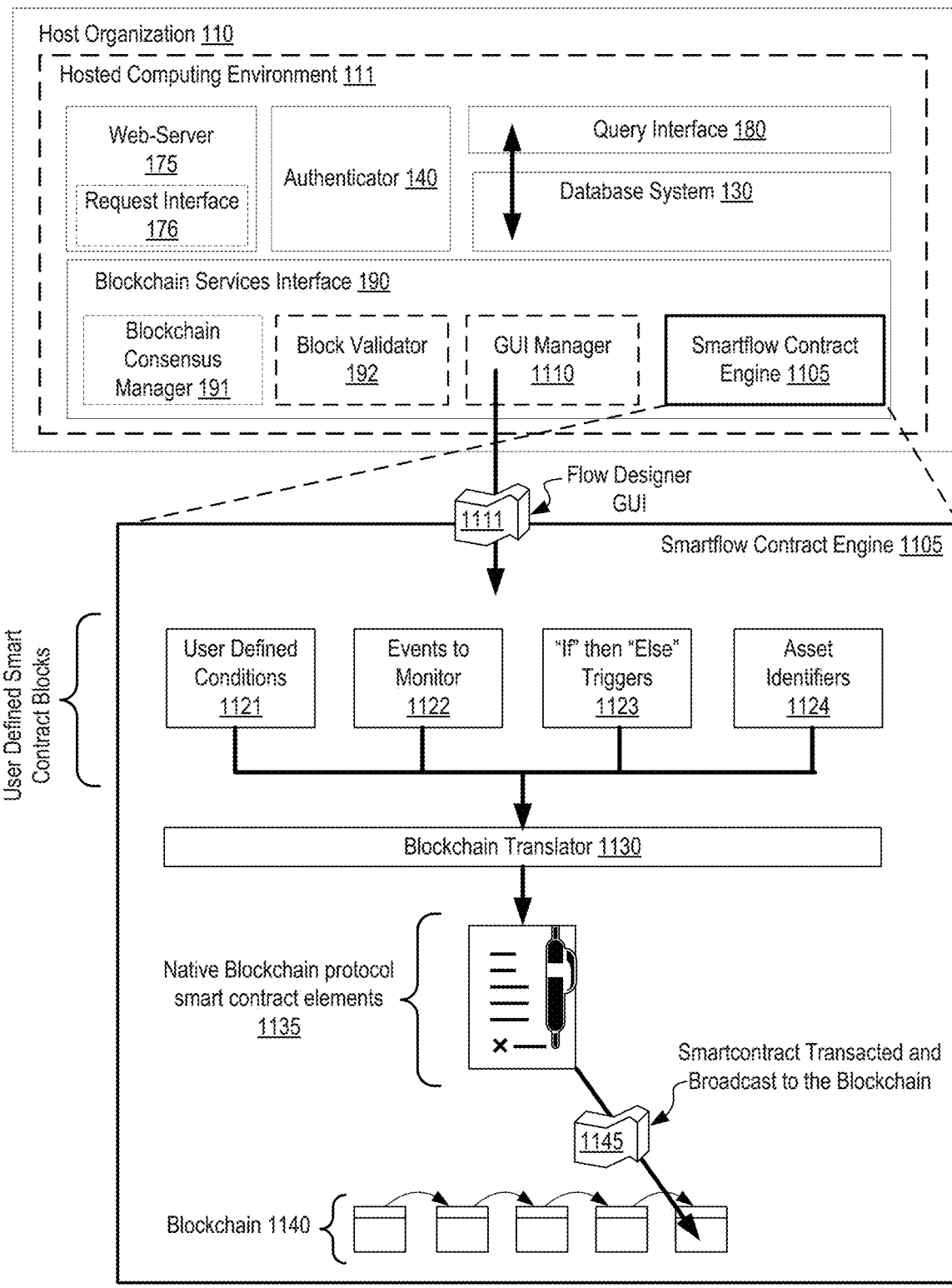
FIG. 11A depicts another exemplary architecture, with additional detail of a blockchain implemented smart contract created utilizing a smartflow contract engine, in accordance with described embodiments.

FIG. 11A depicts another exemplary architecture 1100, with additional detail of a blockchain implemented smart contract created utilizing a smartflow contract engine 1105, in accordance with described embodiments.

In particular, there is depicted here within the host organization the blockchain services interface 190 which now includes the smartflow contract engine 1105 and additionally includes the GUI manager 1110.

Because blockchain utilizes a distributed ledger, creation and execution of smart contracts may be technically complex, especially for novice users. Consequently, a smart flow visual designer allows implementation of smart contracts with greater ease. The resulting smart flow contract has mathematically verifiable auto-generated code, as created by the blockchain translator 1130 freeing customers and users from having to worry about the programming language used in any given blockchain protocol. Moreover, the smart flow contract engine implements visual designers that coordinate with the blockchain translator 1130 to generate the requisite native code capable of executing on each of the participating nodes of the blockchain, thus further allowing easy processing and verification of the smart contract. According to certain embodiments, each smart flow contract utilizes a mathematical code based verifiable encryption scheme.

Flow designers provide users with a simple, intuitive, web-based interface for designing applications and customized process flows through a GUI based guided flow design experience. The flow designer enables even novice users to create otherwise complex functionality, without necessarily having coding expertise or familiarity with the blockchain.

The GUI manager 1110 presents a flow designer GUI 1111 interface to a user device via which users may interact with the host organization. The smartflow contract engine 1105 in coordination with the GUI manager interprets the various rules, conditions, and operations provided by the user, to generate a smartflow contract which is then translated or written into the target blockchain protocol.

Through the flow designer GUI 1111, a user may completely define utilizing visual flow elements how a particular process, event, agreement, contract, purchase, or some other transaction needs to occur, including dependencies, checks, required process inputs and outputs, triggers, etc.

Using the flow designer GUI 1111, the user simply drags and drops operational blocks and defines various conditions and "if then else" events, such as if this event occurs, then take this action. As depicted here, there are a variety of user defined smart contract blocks including user defined conditions 1121, events to monitor 1122, "if" then "else" triggers 1123, and asset identifiers 1124.

Once the user has completed defining the flow including all of its operational blocks, conditions, triggers and events, the smartflow contract engine takes each of the individual blocks and translates them into a native target blockchain protocol via the blockchain translator 1130, and then generates a transaction to write the translated smartflow contract 1145 into the blockchain 1140 via the blockchain services interface 190.

Once transacted to the blockchain, every participating node with the blockchain will have a copy of the smart contract, and therefore, if any given event occurs, the corresponding trigger or rule or condition will be viewable to all participating nodes, some of which may then take an action based on the event as defined by the smart contract.

The blockchain services interface 190 of the host organization provides customers, users, and subscribers access to different blockchains, some of which are managed by the host organization 110, such as private blockchains, others being public blockchains which are accessible through the host organization 110 which participates as a node on such public blockchains. Regardless, each blockchain utilizes a different blockchain protocol and has varying rules, configurations, and possibly different languages via which interfaces must use to communicate with the respective blockchains. Consequently, the blockchain translator 1130 depicted here translates the user defined smart contract blocks into the native or required language and structure of the targeted blockchain 1140 onto which the resulting smart contract is to be written or transacted.

Once the smart contract is transacted and broadcast to the blockchain 1145 it is executed within the blockchain and its provisions, as set forth by the user defined smart contract blocks, are then carried out and enforced.

According to one embodiment, a salesforce.com visual flow designer is utilized to generate the user defined smart contract blocks which are then translated into a blockchain smart contract. According to other embodiments, different visual flow designers are utilized and the blockchain translator 1130 translates the user defined smart contract blocks into a blockchain smart contract.

The resulting native blockchain protocol smart contract elements 1135 may be embodied within a code, structure, or language as dictated by the blockchain 1140 onto which the smart contract is to be written. For instance, if the smart contract is to be written to Ethereum then the blockchain translator 1130 must translate the user defined smart contract blocks into the Ethereum compliant "Solidity" programming language. Solidity is a contract-oriented, high-level language for implementing smart contracts specifically on Ethereum. Influenced by C++, Python and JavaScript, the language is designed to target the Ethereum Virtual Machine (EVM). Smart contract elements include support for voting, crowd funding, blind auctions, multi-signature wallets, as well as many other functions.

Conversely, if the smart contract is to be written to Hyperledger, then the language is different, utilizing the Go programming language which permits use of a distributed ledger blockchain for and smart contracts, among other capabilities.

While smart contracts are beneficial and supported by many blockchain protocols they may be cumbersome to implement to the requirement that they be programmed in differing languages depending on the particular blockchain being targeted. Therefore, not only must users understand programming constructs, but also the particular syntactical nuances of the required programming language for the blockchain protocol in question.

By utilizing the smart flow contract engine 1105, even novice users may create compliant smart contracts by generating the smart contract elements with the flow designer and then leveraging the blockchain translator 1130 to actually render the native blockchain programming language code embodying the smart contract elements as defined by the user, subsequent to which the blockchain services interface 190 handles the transacting of the smart contract onto the blockchain.

Consider for example a vendor that sells to Home Depot and wants to execute a smart contract with Home Depot which uses Ethereum. The vendor logs in with the host organization, assuming he is an authenticated user and has access to the cloud subscription services, and then accesses the smartflow contract engine 1105 through which the user may generate whatever flow he wishes. When done, the user, via the flow designer GUI 1111, instructs the blockchain services interface 190 to execute the smart contract, thus causing the smartflow contract engine to translate the user's custom designed smartflow contract into Ethereum compliant "Solidity" code, subsequent to which the smart contract is then written into the blockchain for execution. The vendor need not know how to program or even understand the details of transacting with the blockchain. Rather, the cloud based services accessible through the host organization 110 remove the complexity from the process and present the user with a simple flow designer GUI 1111 through which all the necessary operations may thus be carried out.

According to such embodiments, writing the smart contract to the blockchain requires storing metadata defining the smart contract in the blockchain as supported by the particular blockchain protocol. According to one embodiment, when a transaction occurs on the blockchain, having the metadata for the smart contract therein, the smart contract is executed and the various user defined smart contract events, conditions, and operations are then effectuated.

According to certain embodiments, the user defined smart contract, having been translated and transacted onto the blockchain, triggers events within the host organization.

For example, consider that Wal-Mart and Nestle have an agreement that a shipment must be transported within a climate controlled trailer within a range of 35 to 39 degrees Fahrenheit at all times. Moreover, if the temperature exceeds 39 degrees at anytime, then the payment is nullified.

Within the host organization, a Customer Relationship Management (CRM) platform defines and manages the various relationships and interactions between customers, vendors, potential customers. suppliers, etc. The term CRM is usually in reference to a CRM system, which is a tool that helps businesses with contact management, sales management, workflow processes, productivity and so forth.

In the above example with Wal-Mart and Nestle, the CRM system will possess the requirements for the shipment. Because the host organization through the CRM system monitors the shipment and subscribes to shipment events, such as temperature data, the CRM system will monitor for and become aware of a temperature related event for the particular shipment which may then be linked back to the smart contract automatically. More particularly, because the host organization operates as a participating node for the blockchain within which the smart contract is executing, the host organization has visibility to both the smart contract terms and conditions accessible via the blockchain and also the CRM requirements for the shipment, such as the required temperature range.

Therefore, upon the occurrence of a smart contract condition violation, the host organization will synchronize the violation with the CRM system (which is not part of the blockchain) to halt the payment associated with that particular shipment, pursuant to the terms of the executing smart contract.

According to one embodiment, the blockchain sends out an event which the CRM system of the host organization will listen to, and then conduct some substantive action based on the event according to what is specified by the user defined smart contract flow. With the above example, the substantive action being to halt payment for the shipment pursuant to the smart contract on the blockchain.

Each of the participating parties for an executing smart contract will likely have their respective CRM systems subscribed to events of the blockchain associated with the executing smart contract, and therefore, both parties are likely to be aware of the event.

According to one embodiment, logic is written into the CRM system to facilitate a specific action responsive to a blockchain event. Stated differently, non-blockchain actions may be carried out pursuant to an executing blockchain smart contract.

Figure 11B:
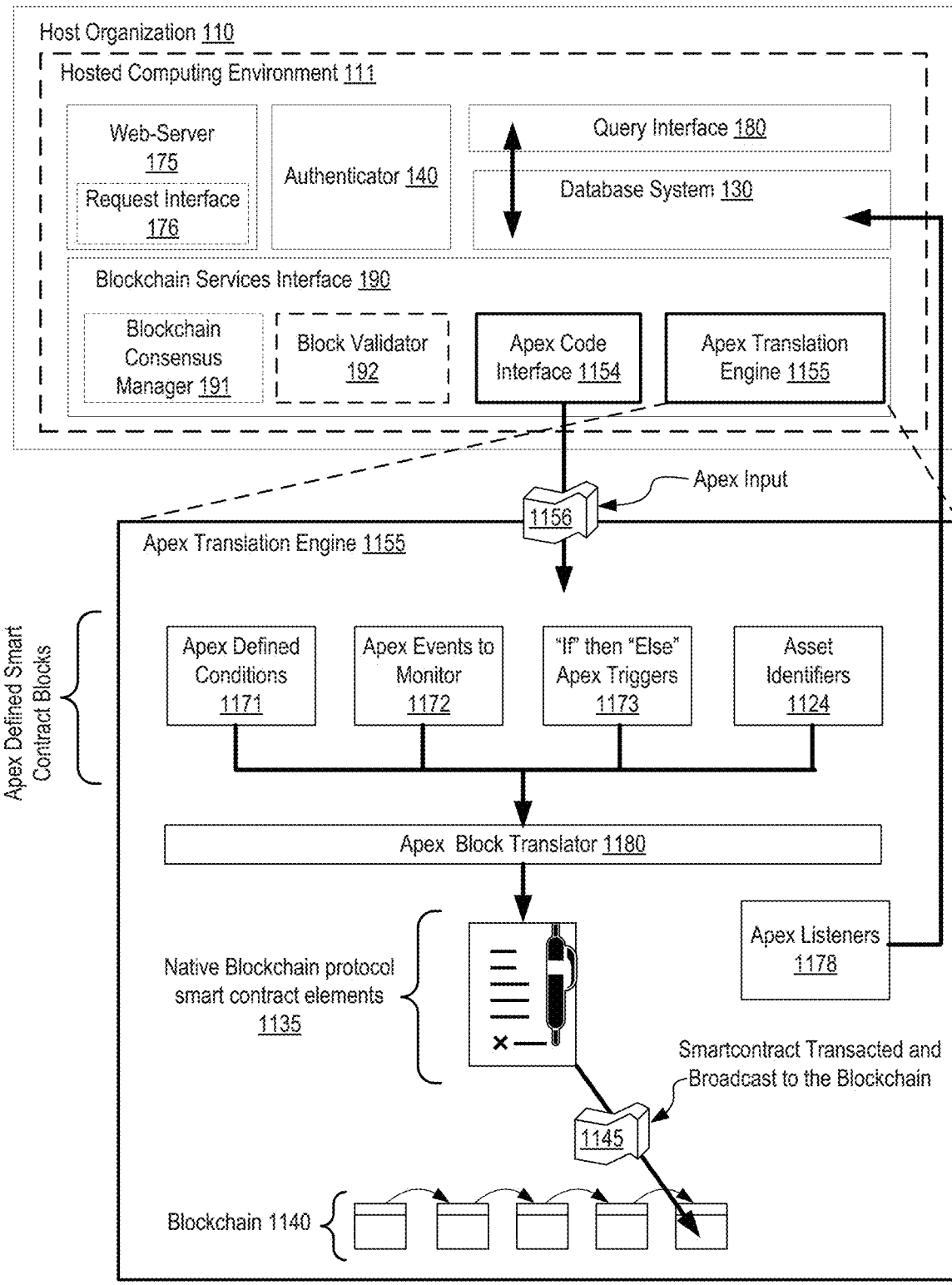
FIG. 11B depicts another exemplary architecture, with additional detail of a blockchain implemented smart contract created utilizing an Apex translation engine, in accordance with described embodiments.

FIG. 11B depicts another exemplary architecture 1101 with additional detail of a blockchain implemented smart contract created utilizing an Apex translation engine 1155, in accordance with described embodiments.

As depicted here, there is an Apex translation engine 1155 within the blockchain services interface 190.

Apex is a programming language provided by the Force.com platform for developers. Apex is similar to Java and C# as it is a strongly typed, object-oriented based language, utilizing a dot-notation and curly-brackets syntax. Apex may be used to execute programmed functions during most processes on the Force.com platform including custom buttons and links, event handlers on record insertion, update, or deletion, via scheduling, or via the custom controllers of Visualforce pages.

Developers of the salesforce.com host organization utilize Apex frequently to implement SQL programming, database interactions, custom events for GUI interfaces, report generation, and a multitude of other functions. Consequently, there is a large community of developers associated with the host organization 110 which are very familiar with Apex and prefer to program in the Apex language rather than having to utilize a less familiar programming language.

Problematically, smart contracts must be written in the native language of the blockchain protocol being targeted for execution of the smart contract on the respective blockchain.

For instance, as noted above, if the smart contract is to be written to Ethereum then the smart contract must be written with the Ethereum compliant "Solidity" programming language.

Like the smart contracts, Apex is a kind of metadata. Therefore, the Apex translation engine 1155 permits developers familiar with Apex to program their smart contracts for blockchains utilizing the Apex programming language rather than utilizing the native smart contract protocol programming language.

As depicted here, developers write their smart contracts utilizing the Apex programming language and then provide the Apex input 1156 to the Apex translation engine 1155 via the depicted Apex code interface, for example, by uploading a text file having the developer's Apex code embedded therein.

The Apex translation engine 1155 parses the Apex input 1156 to identify the Apex defined smart contract blocks and breaks them out in preparation for translation. As despite here, there are Apex defined conditions 1171, Apex events to monitor 1172, "if" then "else" Apex triggers 1173, and as before, asset identifiers 1124 which are not Apex specific.

The Apex defined smart contract blocks are then provided to the Apex block translator 1180 which converts them into the native blockchain protocol smart contract elements 1135 for the targeted blockchain protocol. Once translated, the process is as described above, in which the translated smart contract is transacted and broadcast 1145 to the blockchain 1140 for execution 1145.

Unlike the visual flow GUI, because Apex is programmatic, users writing Apex code may write programs to execute on a smart contract and are not limited by the available functions within the visual flow GUI.

According to a particular embodiment, the Apex input 1156 is first translated into JavaScript and then subsequently translated into a specific blockchain API appropriate for the targeted blockchain protocol upon which the smart contract is to be executed.

According to another embodiment, listening events may be written using the Apex language and provided in the Apex input 1156, however, such listening events are to be executed by the host organization. Therefore, the Apex block translator 1180 separates out any identified Apex listeners 1178 and returns those to the host organization 110 where they may be implemented within the appropriate CRM system or other event monitoring system. In such a way, developers may write the Apex input 1156 as a single program and not have to separately create the smart contract and also the related listening events in separate systems.

Figure 12:
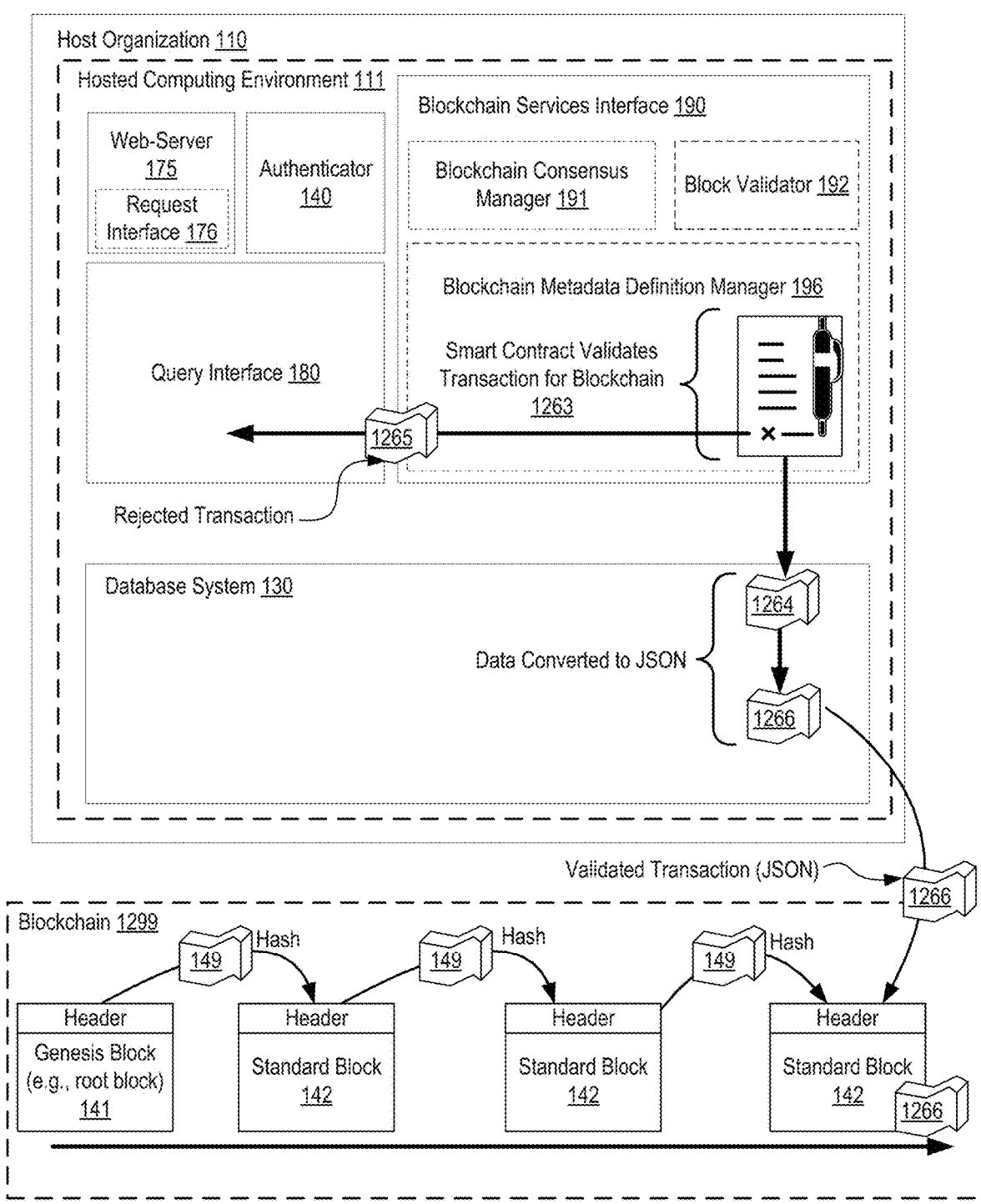

FIG. 12 depicts another exemplary architecture 1201 in accordance with described embodiments.

Conventional solutions permit the storage of free-form text within an asset transacted onto the blockchain, for instance, storing such data within a payload portion of the asset, however, because such data is not validated, there is a risk that corrupted or incorrect data is written to the blockchain and later retrieved on the assumption that such data is valid.

By executing a smart contract to perform transaction validation of the entity or asset being transacted onto the blockchain, it is therefore possible to enforce various masks, data structures, data types, data format, or other requirements prior to such data being written to the blockchain 1299.

According to such embodiments, the blockchain metadata definition manager 196 executes smart contract validation 1263, and if the data to be written to the blockchain is not compliant with the requirements set forth by the executed smart contract, then the transaction is rejected 1265, for instance, sending the transaction back to a query interface to inform the originator of the transaction. Otherwise, assuming the transaction is compliant pursuant to smart contract execution, then the transaction is validated 1264 and written to the blockchain.

According to one embodiment, the smart contract applies a data mask to validate compliance of the data or metadata to be written to the blockchain. In other embodiments, the smart contract enforces rules which are applied to the data as part of the validation procedure.

According to one embodiment, the smart contract executes as part of a pre-defined smart contract system which executes with any blockchain which permits the use of smart contracts, and the smart contract performs the necessary data validation.

According to one embodiment, the data or metadata to be written to the blockchain 1299 is converted to a JSON format to improve storage efficiency. JavaScript Object Notation (JSON) provides an open-standard file format that uses human-readable text to transmit data objects consisting of attribute—value pairs and array data types or any other serializable value. It is a very common data format used for asynchronous browser—server communication, including as a replacement for XML in some AJAX-style systems. Additionally, because JSON is a language-independent data format, it may be validated by the smart contract on a variety of different smart contract execution platforms and blockchain platforms, regardless of the underlying programming language utilized for such platforms.

Thus, as depicted here, data or metadata to be written to the blockchain may be converted into a JSON format 1266 (e.g., within database system 130 of the host organization 110) and the validated and converted JSON data is then transacted onto the blockchain.

FIG. 13A depicts another exemplary architecture 1301 in accordance with described embodiments.

As shown here, the asset created 1314 by application #1 is written onto the blockchain as asset 1315. The blockchain 699 is depicted as receiving the written asset 1315 at standard block 685A following genesis block 684, as shown. Although it will be written to the latest new block on the blockchain 699, such as standard block 685B, or 685C, or some other later block, whatever block that is at the time of the transaction.

Many customer organizations and businesses operate in a network-centric manner as they are obligated by the marketplace to solve customer problems. Therefore, it becomes necessary for businesses, including sometimes unrelated business organizations, to share data amongst one another on behalf of their customers.

Understandably, however, different businesses have a fundamental lack of trust in one another. Thus, many businesses find themselves in a situation today where they need to share data to satisfy their customers, and yet, they cannot trust that the other businesses with whom they share data can be trusted.

Distributed Ledger Technology and blockchain platforms specifically solve the issue of trust as is described above. This is true because data written onto the blockchain is immutable insomuch that updates may be provided, but the historical data is always accessible, and further still, all participating nodes for the blockchain cooperatively contribute to consensus based upon an agreed consensus model. The exception to this is the modified DLT technology discussed above for which a shared ledger (e.g., element 157 at FIG. 1C, et seq.) is hosted internally to a host organization and for which the host organization operates as the single and centralized trust authority, or alternatively for which trust determination is delegated to a customer organization operating a modified DLT shared ledger instance 157, pursuant to which the customer organization then determines for themselves who has access rights, such as what partner organizations or users, etc., have consent from the customer organization to access data in the modified DLT shared ledger.

Therefore, utilization of DLT technologies and blockchain technology specifically is considered to solve the issue of trust amongst businesses wishing to share data.

Notwithstanding the issue of trust having been largely solved, there remains two further obstacles which prevent adoption of the technology.

Firstly, adoption of blockchain is technologically complex and exceedingly difficult for most businesses to implement on their own. Even a technical evaluation of such data requires specialized computer programmers and developers having adequate skill in this particular area of expertise coupled with an understanding of the needs of the business, often provided by a technical business analyst, and then the procurement of additional computing infrastructure and either the development of a blockchain platform and protocol themselves or the identification and then participation with an existing public or private blockchain that meets the needs of the business. These developers must understand how to package and transact assets (sometimes called "coins") onto the blockchain and how to transfer those assets, within which their information of interest is embedded, between nodes and make such data available to other participating nodes on the blockchain, such that the information may be shared. Further still, there needs to be a consensus model by such a blockchain which is acceptable to the business. For these reasons alone, adoption of blockchain technologies, though promising, remains an insurmountable burden for many businesses.

Secondly, even assuming the above mentioned obstacles are overcome, there remains a significant problem with data standardization across applications for information which is written to, stored within, or persisted by the blockchain. For instance, even assuming a business manages to transact information to the blockchain and make that data accessible to another business, there simply is no guarantee whatsoever that the information written to the blockchain by a first business will be understandable by a second business. Therefore, the transportability of data amongst businesses wishing to share data presents another significant problem, due to the lack of standardization of data written onto the variously available blockchain platforms.

Consider the exemplary depiction shown here at FIG. 13A, in which there are two businesses 1305A and 1305B, which have managed to agree to share data with one another and have successfully implemented the necessary computing architecture to transact with a blockchain 699.

With all data sharing agreements in place, business 1305A creates an asset via its application #1 executing at the user client device 1306A, and as depicted, embeds a customer record into that asset 1314 which is to then be transacted onto the blockchain 699. As shown here, application #1 creates the asset with the following information:
Data Format Used:
First_Name=John
Last_Name=Doe
Phone_Number=###-###-####
E_Mail_Address=J.Doe@Email.com Notably, for this record, there are four fields, including "First_Name" and "Last_Name" followed by "Phone_Number" which has a particular format mask used as well in which there are hyphens "-" required in between certain digits, and finally an email address which has a field identifier of "E_Mail_Address."

Each of the various fields are then populated with data.

The created asset is then transacted onto the blockchain 699 as depicted by the asset written 1315 onto the blockchain and at some later time, business 1305B elects to retrieve the information via its own application #2.

As shown here, business 1305B transacts with the blockchain and the asset retrieved 1316 is successfully transmitted to the application #2 executing at user client device 1306B.

All seems well, until the application #2 utilizes its own understanding of the data to interpret the asset 1317 via the code executing at application #2, which expects the following information:
Data Format Expected:
Customer_Name="John Doe"
Phone=##########
email="J.Doe@Email.com"
RETRIEVAL ERROR:
---->No Data Found in Asset As might be expected, application #2 encounters a retrieval error message: "No Data found in Asset."

This is the result when application #2 looks for a field named "Customer_Name" and yet there is no such field. Application #2 additionally looks for the field "Phone" and finds no such field, and finally searches for "email" and again finds no such field.

While a human reader may readily understand that "First_Name" with the value "John" represents a sub-portion of the field "Customer_Name," such logic simply is not available within applications and computing programs which simply search for the field name that they are instructed (e.g., programmed) to search for, which is "Customer_Name" and not a combination of "First_Name" and "Last_Name."

While such a conversion between the two field types would be trivial for any programmer, the fact remains that the two applications by each of the respective businesses are simply incompatible, and if they are to be made compatible, then custom translation for these fields needs to be programmed.

Fundamentally, the non-transferability of this date is due to a lack of data standardization. The two distinct application entities each are enabled to write to the blockchain and retrieve from it, and an agreement is in place between the businesses to share such data, and yet, the two entity applications lack the ability to share the data because there is no definition of what constitutes a customer's name. One application expects this to be a combination of "First_Name" and "Last_Name" fields whereas another application expects the field "Customer_Name" to be utilized as a single field for the customer's full name.

FIG. 13B depicts another exemplary architecture 1302 in accordance with described embodiments.

In particular, there is now depicted a blockchain administrator defining metadata for the data utilized by an application which then standardizes the data which is written onto the blockchain on behalf of the two businesses, business 1305A and business 1305B.

As depicted here, the blockchain administrator defines metadata via the integration builder's (element 153) GUIs or via the integration builder's API, and that defined metadata 1321 is then pushed onto the specified blockchain 1399. The defined metadata 1321 may be transacted through the REST API 178 provided by the blockchain services interface 190 and ultimately the asset created 1314 is written onto the accessible public blockchain 1399.

Now, there is, transacted onto the blockchain, a clearly defined metadata specifying the requirements for the declared application "ApplicationXYZ" and specifically for the "Customer_Record," which is now structured as follows, as per the defined metadata:
DEFINED METADATA REQUIREMENTS
Declared Application=ApplicationXYZ
Customer_Record
First_Name=$string
Last_Name=$string
Phone_Number=$NumericString
E_Mail_Address=$emailString Because the defined metadata 1321 is transacted onto the blockchain, any application with permission to access data records on the blockchain 1399 will be able to read and write data in compliance with the requirements specified by the defined metadata 1321. This may be the specifically declared application, "ApplicationXYZ," or this may be other applications which utilized the data generated or managed by the declared application. Any application can read out the defined metadata 1321 and operate in compliance with the requirements.

FIG. 13C depicts another exemplary architecture 1303 in accordance with described embodiments.

In particular, it is now depicted that businesses 1305A and 1305B are enabled to share data transacted onto the blockchain 1399 and because the defined metadata 1321 specifies the requirements for formatting such data, the data written to the blockchain 1399 and retrieved from the blockchain will embody a known format, and thus be transferable between the various businesses.

As shown here, the blockchain administrator defines the metadata via the blockchain services interface 190 which is transacted onto the blockchain, and then later, business 1305A creates an asset 1314 via application #1 and it writes that asset having the details of a customer record into the blockchain. Subsequently, business 1305B retrieves the asset from the blockchain and when the asset is interpreted 1317 via application #2 executing at business 1305B, that data is successfully interpreted and understood by the application because there is a known and defined metadata structure for the customer record data.

Therefore, according to a particular embodiment, there are operations by a system of a host organization that declare a new application and transact defined metadata for the new application onto a blockchain. For instance, such operations may include operating a blockchain interface to the blockchain on behalf of a plurality of tenants of the host organization, in which each one of the plurality of tenants operate as a participating node with access to the blockchain. Such operations may further include, receiving, from a user device communicably interfaced with the system, first input declaring the new application. Such operations may further include, receiving second input from the user device adding a plurality of network participants for the new application, in which the network participants are granted access rights to the new application. Such operations may further include, receiving third input from the user device declaring a plurality of entity types for the new application. Such operations may further include, receiving fourth input from the user device declaring one or more new field definitions for each of the plurality of entity types. Such operations may further include, generating a blockchain asset having encoded therein as the defined metadata for the new application, at least (i) the plurality of network participants declared, (ii) the plurality of entity types declared, and (iii) the one or more new field definitions declared for each of the plurality of entity types. Such operations may further include, transacting the blockchain asset having the defined metadata encoded therein for the new application onto the blockchain.

According to the operations of another embodiment, the blockchain asset has a defined transaction type; and in which the defined transaction type for the blockchain asset having the defined metadata encoded therein associates the defined metadata for the new application with a smart contract to execute data validation for any data transacted onto the blockchain for the new application; in which the smart contract validates the data transacted onto the blockchain for the new application is in compliance with the defined metadata for the new application transacted onto the blockchain.

According to another embodiment such operations may further include: receiving a transaction at the blockchain specifying data for the new application; and triggering a smart contract based on the received transaction specifying the data for the new application; and executing the smart contract to validate the specified data for the new application is in compliance with the defined metadata for the new application; and in which the transaction is rejected if the specified data is non-compliant with the defined metadata for the new application.

According to the operations of another embodiment, transacting the blockchain asset onto the blockchain includes: adding a transaction to a new block on the blockchain specifying the defined metadata for the new application as payload data for the transaction; subjecting the added transaction to consensus by participating nodes of the blockchain, in which the added transaction is subjected to a consensus protocol by the participating nodes of the blockchain prior to the added transaction being accepted as part of a primary chain of the blockchain by the participating nodes of the blockchain; and in which the defined metadata for the new application is persisted within an accepted transaction on a new block of the blockchain pursuant to successful consensus for the added transaction.

According to another embodiment, such operations may further include: receiving new input at the system, in which the new input declares a second new application; and receiving additional input at the system selecting one of the plurality of entity types declared for the first new application as a selected entity type for the second new application, in which the selected entity type inherits the one or more new field definitions as specified via the defined metadata for the respective one or more entity types associated with the first new application.

According to the operations of another embodiment, multiple different declared applications specify at least one of the plurality of entity types declared for the first new application as a selected entity type for the multiple different declared applications; and in which a single instance of the defined metadata corresponding to the respective one of the plurality of entity types declared for the first new application and all of the one or more new field definitions associated with the respective entity type declared for the first new application controls both (i) the respective one of the plurality of entity types declared for the first new application and (ii) the selected entity type for all of the multiple different declared applications having selected the respective entity type declared for the first application.

According to the operations of another embodiment, receiving the fourth input from the user device declaring one or more new field definitions for each of the plurality of entity types further includes receiving the fourth input defining a field definition type for each of the one or more new field definitions; and in which each field definition type is selected from the group including: integer, Boolean, numeric, alphanumeric, date, hyperlink, computed, or custom.

According to another embodiment such operations may further include: authenticating the user device with the host organization as being associated with one of the plurality of tenants; and in which the one of the plurality of tenant is a subscriber to cloud based on-demand services provided by the host organization over a public Internet.

According to another embodiment such operations may further include: executing an event listener to monitor any changes to the blockchain associated with the new application; and triggering an event when the changes to the blockchain associated with the new application are observed by the event listener.

According to another embodiment such operations may further include: receiving fifth input from the user device declaring an event and one or more monitored event conditions for the new application declared; in which the declared event specifies one of: (i) a process flow to execute at the host organization responsive to occurrence of the event at the blockchain or (ii) a database transaction to execute against a database system internal to the host organization responsive to occurrence of the event at the blockchain; and monitoring, via an event listener, for any change to the blockchain meeting the specified event and the one or more event conditions.

According to the operations of another embodiment, each network participant is granted access rights to the new application and to data on the blockchain associated with the new application.

According to the operations of another embodiment, each of the plurality of network participants are selected from among the group including: a user of the host organization associated with one of the plurality of tenants of the host organization; a partner user corresponding to one of the plurality of tenants of the host organization; a customer organization corresponding to one of the plurality of tenants of the host organization; a non-user of the host organization; a partner organization which is not one of the plurality of tenants of the host organization; and one or more participating nodes on the blockchain which correspond to either a tenant of the host organization or a customer organization which subscribes to cloud computing services from the host organization; and one or more participating nodes on the blockchain which do not subscribe to cloud computing services from the host organization.

According to the operations of another embodiment, receiving the first input from the user device declaring the application further includes: receiving with the first input for the new application declared one or both of specified administrative control for the new application or ownership for the new application declared.

According to another embodiment, such operations may further include: receiving instructions to deploy the new application declared and the defined metadata for the new application onto the blockchain; and in which transacting the blockchain asset having the defined metadata encoded therein for the new application onto the blockchain includes deploying the new application and the defined metadata via the blockchain responsive to receiving the instructions to deploy.

According to the operations of another embodiment, receiving the inputs defining each of (i) the plurality of network participants declared, (ii) the plurality of entity types declared, and (iii) the one or more new field definitions declared for each of the plurality of entity types includes receiving the inputs as programming code via an API at a blockchain metadata definition manager exposed by the host organization.

According to another embodiment such operations may further include: transmitting a GUI to the user device from a blockchain metadata definition manager, in which the GUI prompts for the inputs defining each of (i) the plurality of network participants declared, (ii) the plurality of entity types declared, and (iii) the one or more new field definitions declared for each of the plurality of entity types; in which the inputs are received at the GUI via one or more interactive click events, drag events, drop down selection events, text input events, and touch events; and in which receiving the inputs includes receiving the inputs from the GUI transmitted to the user device.

According to the operations of another embodiment, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

According to another embodiment such operations may further include: receiving an SQL query at a receive interface requesting data associated with the new application; translating the SQL query into native blockchain executable code via an Apex translator engine at the host organization; executing the native blockchain executable code against the blockchain to retrieve the data requested; and returning the data requested responsive to receipt of the SQL query.

According to another embodiment such operations may further include: generating a virtual table within a database system of the host organization; and structuring the virtual table at the database system of the host organization based on the metadata declared for the new application; in which entity types are represented as tables within the virtual table and further in which the one or more new field definitions declared for each of the plurality of more entity types for the new application are represented as columns within the tables at the virtual table.

According to the operations of another embodiment, the virtual table includes a materialized view hosted at the database system of the host organization structured based on the metadata declared for the new application; and in which the materialized view hosted at the database system of the host organization does not store any data associated with the new application; and in which SQL queries requesting read-only access are processed against the materialized view by translating the read-only SQL queries into a blockchain transaction to retrieve the requested data associated with the new application from the blockchain.

According to another embodiment such operations may further include: retrieving the defined metadata for the new application from the blockchain, including plurality of entity types declared for the new application, the one or more new field definitions declared for each of the plurality of entity types, and any field types applied to the one or more new field definitions; generating a materialized view of the data persisted with the blockchain within a virtual table at the host organization by structuring the virtual table based on the defined metadata for the new application; in which the materialized view represents the structure of the data associated with the new application which is persisted to the blockchain without storing the data associated with the new application within the materialized view at the host organization.

According to another embodiment such operations may further include: receiving, at the host organization, an SQL statement from a user device, in which the SQL statement is directed toward the materialized view requesting an SQL update or an SQL insert for the data persisted to the blockchain and associated with the new application; processing the SQL statement against the materialized view by translating the SQL statement requesting the SQL update or the SQL insert into a corresponding blockchain transaction to update or add the data associated with the new application at the blockchain; and issuing an acknowledgment to the user device confirming successful processing of the SQL statement against the materialized view pursuant to the corresponding blockchain transaction being accepted by consensus to the blockchain and successfully updating or adding the data associated with the new application at the blockchain.

According to another embodiment such operations may further include: receiving an SQL statement directed toward the materialized view at the host organization; in which the SQL statement specifies one or more of (i) a SELECT from SQL statement, (ii) an INSERT into SQL statement, and (iii) an UPDATE set SQL statement; and in which the SQL statement received is processed by translating the SQL statement into a corresponding blockchain transaction and executing the corresponding blockchain transaction against the blockchain in fulfillment of the SQL statement directed toward the materialized view at the host organization.

According to another embodiment, such operations may further include: in which the metadata defined for the new application represents user specified relationships between two or more of the plurality of entity types by linking together assets at the blockchain.

According to another embodiment, such operations may further include: declaring, at the host organization, new business logic for the new application within a table structure having one or more relationships between elements of the new business logic and one or more of the plurality of entity types for the new application; and defining the new business logic any all relationships within the metadata persisted to the blockchain.

According to another embodiment such operations may further include: executing an event listener to monitor for any changes to the defined metadata for the new application at the blockchain; and triggering an event when the changes to the metadata for the new application at the blockchain are observed by the event listener; and in which the triggered event automatically pushes a metadata update to the host organization to update a materialized view of the data associated with the new application by re-structuring the materialized view at the host organization based on the metadata update triggered by the event listener.

According to the operations of another embodiment, triggering the event via the event listener based on changes to the metadata for the new application further includes: triggering one or more of: a business user defined process flow to execute responsive to changes to the defined metadata persisted to the blockchain; a business user defined data retrieval operation to execute responsive to changes to the defined metadata persisted to the blockchain; a business user defined data filtering operation to execute responsive to changes to the defined metadata persisted to the blockchain; an administrator defined process flow to update a data analytics feed responsive to changes to the defined metadata persisted to the blockchain; and an administrator defined process flow to update an Artificial Intelligence (AI) training data stream responsive to changes to the defined metadata persisted to the blockchain.

According to a particular embodiment, there is non-transitory computer-readable storage media having instructions stored thereupon that, when executed by a processor of a system having at least a processor and a memory therein, the instructions cause the system to perform operations including: operating a blockchain interface to the blockchain on behalf of a plurality of tenants of the host organization, in which each one of the plurality of tenants operate as a participating node with access to the blockchain; receiving, from a user device communicably interfaced with the system, first input declaring a new application; receiving second input from the user device adding a plurality of network participants for the new application, in which the network participants are granted access rights to the new application; receiving third input from the user device declaring a plurality of entity types for the new application; receiving fourth input from the user device declaring one or more new field definitions for each of the plurality of entity types; generating a blockchain asset having encoded therein as the defined metadata for the new application, at least (i) the plurality of network participants declared, (ii) the plurality of entity types declared, and (iii) the one or more new field definitions declared for each of the plurality of entity types; and transacting the blockchain asset having the defined metadata encoded therein for the new application onto the blockchain.

According to yet another embodiment, there is a system to execute at a host organization, in which the system includes: a memory to store instructions; a processor to execute instructions; in which the processor is to execute a blockchain services interface on behalf of on behalf of a plurality of tenants of the host organization, in which each one of the plurality of tenants operate as a participating node with access to the blockchain; a receive interface to receive first input from a user device communicably interfaced with the system, the received first input declaring a new application; the receive interface to further receive second input from the user device adding a plurality of network participants for the new application, in which the network participants are granted access rights to the new application; the receive interface to further receive third input from the user device declaring a plurality of entity types for the new application; the receive interface to further receive fourth input from the user device declaring one or more new field definitions for each of the plurality of entity types; a blockchain services interface to generate a blockchain asset having encoded therein as the defined metadata for the new application, at least (i) the plurality of network participants declared, (ii) the plurality of entity types declared, and (iii) the one or more new field definitions declared for each of the plurality of entity types; and in which the blockchain services interface further is to transact the blockchain asset having the defined metadata encoded therein for the new application onto the blockchain.

According to the embodiment of the system, the receive interface is further to receive fifth input from the user device declaring an event and one or more monitored event conditions for the new application declared; in which the declared event specifies one of: (i) a process flow to execute at the host organization responsive to occurrence of the event at the blockchain or (ii) a database transaction to execute against a database system internal to the host organization responsive to occurrence of the event at the blockchain; and in which the system further includes an event listener, in which the event listener is to monitor for any change to the blockchain meeting the specified event and the one or more event conditions and trigger the declared event responsive to a monitored change on the blockchain.

FIG. 14A depicts another exemplary architecture 1401 in accordance with described embodiments.

As shown here, there is a GUI 1410 executing at a computing device 1499, such as a user device of the blockchain administrator, with the GUI 1410 being pushed to the computing device 1400 by the blockchain metadata definition manager 196 of the host organization.

As shown here, the blockchain administrator may view the deployed applications as shown at the top of the GUI 1410 and by clicking the "new" button at the GUI 1410, the declarative capability is provided for the blockchain administrator to declare a new application. While depicted here is the declaration of a new application via the GUI 1410, the blockchain administrator may alternatively utilize an API provided via the blockchain metadata definition manager 196 to create the new application.

FIG. 14B depicts another exemplary architecture 1402 in accordance with described embodiments.

In addition to the declaration of the new application or declaring the new application, there is additionally the ability for the blockchain administrator to define what participants have access to the data associated with this particular application, thus defining the network participants for this newly declared application.

FIG. 14C depicts another exemplary architecture 1403 in accordance with described embodiments.

There is again depicted the GUI 1410, however, now depicted is the blockchain administrator viewing and editing entities for the "bank record application" by clicking on that application.

Thus, the blockchain administrator may first declare or create a new "application" and then once created, the blockchain administrator may edit or view that application and may create or declare new "entities" within the application, with each declarative entity defining the metadata for a particular custom field within which the application may ultimately store information in compliance with the defined metadata and which other applications may also interact with such data and reference such data, and possibly update, add to, or delete such data where adequate permissions exist, but again, doing so in compliance with the defined metadata.

For example, there is defined here for the bank record application, a "claim" having the entity name "Auto_Claim" and thus, any application wishing to write information to the blockchain pertaining to claims, at least to the extent such information will be utilized by the bank record application, then it is necessary to comply with the requirements of the defined entity "Auto_Claim."

FIG. 14D depicts another exemplary architecture 1404 in accordance with described embodiments.

Depicted here is a GUI 1410 resulting from the blockchain administrator clicking on the "new" button on the prior screen to declare and create a new entity within the newly created application, or within a viewed application.

As shown here, there is a "New Entity Definition" GUI presented, in which the blockchain administrator can now create a new entity by entering the entity name, entity label, and selecting an owner for the entity, which by default is the user creating the entity. Clicking save then creates and declares this new entity. The blockchain administrator may additionally change the status to "deployed" and once saved, the entity will be transacted onto the blockchain, whereas in draft status, it will be retained only at the host organization's blockchain metadata definition manager 196.

According to a particular embodiment, every GUI has a corresponding API via which to interact with the blockchain metadata definition manager 196.

FIG. 14E depicts another exemplary architecture 1405 in accordance with described embodiments.

Clicking on an existing entity, including the one just created at the prior GUI 1410 as depicted at FIG. 14D, will result in the Field Definition GUI being presented, via which the blockchain administrator may now create any number of fields which are to be stored within that particular entity.

By way of analogy, it may be helpful to think of the declared application as a computer program, albeit one that runs via the cloud, and the declarative entities as tables comparable to tables in a relational database, and finally the declarative fields as column identifiers or populatable fields within a table, and lastly, the collection of fields would thus form a record. While the comparison is not exact, relationships between the various declarative elements and the metadata defined for them should help to illustrate their use.

Because the defined metadata specifies precisely what data is permissible, and the format and type of that data, any permitted application may then both successfully write information to the blockchain in a predictable and pre-defined format as specified by the metadata and additionally, applications with whom they are sharing may also successfully retrieve the information from the blockchain, knowing based on the defined metadata, how that information is supposed to look, and be structured, and thus how that information is to be interpreted.

Because the information is defined in blockchain via the metadata, all the participants know what each element of data means, based on the defined metadata, and therefore, for that network of participants, all participating nodes can share information via the blockchain.

Moreover, the participants are not restricted to the existing metadata transacted onto the blockchain, but they may create additional elements, create new metadata definitions, alter metadata definitions, etc.

For example, Bank Wells Fargo may decide that they, as a participant, require a new entity having fields X, Y, and Z. That participant may therefore define that metadata for the new entity (via the API or the GUI) having the fields X, Y, and Z, and then transact that new entity onto the blockchain.

The new entity will then be subjected to consensus by the other participating nodes. If the other participating nodes disagree, then consensus is not reached, and the change is negated. However, if consensus is reached, then the new entity having fields X, Y, and Z is transacted onto the blockchain by writing the defined metadata for that new entity onto the blockchain within a consensus block, or stated differently, the entity having already been written onto the blockchain, once consensus is attained, becomes a part of the "primary" chain on the blockchain which is accepted by all participants as the main chain.

According to another embodiment, smart contracts are executed for transactions on the blockchain which attempt to write or update data on the blockchain for an entity having defined metadata. For instance, there may be a trigger which causes the execution of the smart contract, in which case the smart contract retrieves or applies the defined metadata to validate that every field within the entity has a data type, data naming compliance, and a date mask which is in compliance with the requirements of the defined metadata.

Where the smart contract enforces the defined metadata, any transaction which fails compliance is either prohibited from being transacted onto the blockchain or if written to the blockchain, the transaction will never be accepted into a block on the main chain as the smart contract validation failure will prevent the transaction from reaching consensus for acceptance.

Thus, through the use of the described GUIs, it is possible for business users lacking programming and program development expertise to nevertheless declare a new application and declare new entity names as well as declaratively create new field definitions for those entity names. For those with greater technical expertise, they may utilize the APIs to interact with the blockchain metadata definition manager 196, if it is preferable for them to do so.

Regardless of the method chosen, the blockchain administrator can declaratively create a new application, new entities, and new field definitions, all without writing any code whatsoever, and the blockchain metadata definition manager 196 will then transact the defined metadata for the new application, the new entity, and/or the new field definitions onto the blockchain for voting and consensus.

Until consensus is reached, the defined metadata cannot be utilized. However, once transacted onto the blockchain and consensus is reached, then other participating nodes or participants on the blockchain can interact with all data for the declared application and the smart contract execution by the blockchain services interface 190 will force or mandate compliance with those interactions.

FIGS. 14F and 14G depict additional exemplary architectures 1406 and 1407 in accordance with described embodiments.

Depicted here is the generated code which is created on behalf of the blockchain administrator's declarative actions to define the application and declare the entity and declare the various defined fields, resulting in the API compliant code being represented within the defined metadata, despite no code having been written by the blockchain administrator. In other embodiments, a programmer or developer may elect to utilize the API to generate this code, in which case the GUIs will reflect the coded entities and the coded defined fields, just as if they had been declared via the GUIs originally.

Thus, the disclosed platform permits the creation of the necessary code to transact with the blockchain and to interact with the blockchain and to define and declare an application, and entities for that application (which may be depicted as tables within a database system via a materialized view as is discussed below), and to further define and declare new field definitions for each entity, and also define permissible network participants which may utilize the declared application.

In such a way, the declarative metadata platform performs all the heavy lifting on behalf of the blockchain administrator, allowing a non-programmer to create all the necessary code to interact with the blockchain for the newly declared application by using only point and click actions through a series of GUIs.

Moreover, the constructs of an application, and allowed network participants, and new declarative entities and new declarative field definitions are presented in a familiar manner to the blockchain administrator since the various elements may be thought of as database tables, columns, fields, and records, etc., despite the fact that database entries and database tables are not being created. Instead, the information is transacted onto the blockchain as an asset, while permitting the blockchain administrator to point and click their way through the entire process without any knowledge or requirement that the blockchain administrator understands how to transact to the underlying blockchain or how to add and update or transfer assets on a blockchain. Therefore, practice of the disclosed embodiments drastically reduces the complexity on the part of a non-programmer user operating as a blockchain administrator.

And yet, for more sophisticated users having programming knowledge and understanding of blockchain, the same code may be written and generated via the APIs exposed by the blockchain services interface 190 and specifically the blockchain metadata definition manager 196 provided by the host organization.

FIG. 15 depicts another exemplary architecture 1501 in accordance with described embodiments.

As shown here, the blockchain administrator transacts the defined metadata 1510 onto the blockchain, which presumably will be accepted once consensus is reached, and a partner user next transacts a metadata compliant transaction 1515 onto the blockchain.

Further depicted here, is the materialized view 1520 which permits a host organization user 1525 to interact with the data transacted onto the blockchain via the metadata compliant transaction 1515 from the accessible cloud platforms 156 available via the host organization 110.

In computing, a materialized view 1520 is a database object that contains the results of a query. For example, the materialized view 1520 may be a local copy of data located remotely, or may be a subset of the rows and/or columns of a table or join result, or may be a summary using an aggregate function.

The process of setting up a materialized view is sometimes called materialization. In a sense, data materialization is a form of caching the results of a query, similar to other forms of precomputation, in which database administrators leverage materialized views for performance reasons for purposes of optimization.

In any database management system following the relational model, a view is a virtual table representing the result of a database query. Whenever a query or an update addresses an ordinary view's virtual table, the DBMS converts these into queries or updates against the underlying base tables.

Conversely, a materialized view takes a different approach insomuch that the query result is cached as a concrete ("materialized") table that may be updated separately from the original base tables. Such an approach permits for more efficient access, at the cost of extra storage and of some data being potentially out-of-date. Materialized views find use especially in data warehousing scenarios, where frequent queries of the actual base tables can be expensive.

In the example depicted here, the accessible cloud platforms 156 generally utilize information stored within the databases 130 of the host organization 110, however, where certain information is transacted to the blockchain and thus persisted at the blockchain, the materialized view permits the accessible cloud platforms 156 to interact with data stored by the blockchain via the materialized view 1520. In such a way, both the host organization user 1525 and the accessible cloud platforms may interact with the blockchain data as if it were data stored within the databases 130 of the host organization simply by referencing the materialized view.

Thus, it is in accordance with certain embodiments that any time information is transacted to the blockchain, the smart contract triggers and executes a validation scheme for the data transacted onto the blockchain to ensure it is in compliance with the defined metadata 1510 and the smart contract additionally generates the materialized view 1520 so as to create a referenceable copy within the database 130 of the host organization 110, thus permitting the standard query interface of the host organization to reference the information within the materialized view, which in turn corresponds to the information transacted onto the blockchain.

Thus, any entity which is declared and created for the blockchain, and for which data is then written or transacted onto the blockchain, will automatically have an equivalent entity (e.g., a table in a relational database) created within the database of the host organization 110 within the materialized view, and as defined fields are created and accepted onto the blockchain, those corresponding columns will then be created within the host organization database system 130, and then when data is transacted onto the blockchain, that corresponding entity table within the database system 130 of the host organization will then be populated, within the materialized view, such that users and processes interacting with the data from the side of the host organization, may access the information from the materialized view.

Consequently, developers and users may interact with the declared application which utilizes data and defined metadata persisted to the blockchain without any knowledge that they are actually utilizing blockchain and without any requirement that such users have any knowledge of how to interact with the blockchain.

According to certain embodiments, a new table is not created within the databases 130 of the host organization and therefore, it is not necessary to synchronize any data between the databases 130 of the host organization and the blockchain. Rather, a channel, pipeline, or view of the data persisted by the blockchain external from the host is represented via the materialized view at the databases 130 of the host organization, but the materialized view, although being referenceable, is not a copy that is synchronized back to the blockchain and does not allow updates or modifications. The materialized view is only permissible for read-only referencing from the databases 130 of the host organization. All modifications, updates, changes, etc., must be transacted onto the blockchain, and a refreshed materialized view will then pull those changes from the blockchain and reflect those modifications at the database 130. While such an arrangement creates additional overhead, the arrangement expressly negates the need to synchronize data within the materialized view as such data is wholly non-authoritative.

Consequently, developers, programs, processes, and users may utilize standard SQL queries to interact with the blockchain data, by referencing the materialized view 1520. For example, specifying SELECT from $Table_Name WHERE . . . when specifying the entity name as the table name for the materialized view 1520 will result in a database query result being returned by the host organization's database 130, despite the fact that the authoritative copy of the data resides within the blockchain itself. While this structure does create some duplicative data, and thus arguably results in wasted storage, the structure has the benefit of greatly simplifying queries originating from any of the accessible cloud platforms 156 which may utilize standard SQL without having to identify the blockchain or construct more complex blockchain transactions to retrieve the data, as the replication of the data to the materialized view 1520 is performed automatically by the smart contract triggers. According to such embodiments, SQL commands which update, create, or delete records are not permitted for execution against the materialized view, however, such SQL commands which update, create, or delete records will be accepted and translated to the apex translation engine and Apex code interface 1154 (shown at FIG. 11B) into native blockchain executable compliant code to perform the equivalent action of an SQL update, create, or delete command, but as a blockchain transaction which is then transacted against the blockchain, submitted for consensus, and then accepted onto the blockchain assuming voting or consensus is successful. Note also that a smart contract will execute to validate the transaction against the blockchain to enforce data compliance with the defined metadata persisted at the blockchain.

For example, an SQL query submitted from a host organization user may request an update for customer record John Doe for a specified application. Because such information is persisted at the blockchain, the SQL cannot be executed against the database systems 130 of the host organization. Moreover, the blockchain does not accept an SQL query which requests, "Please return all data for customer record John Doe." The information on the blockchain is not human readable and also does not permit this kind of query.

Consequently, the Apex code interface 1154 will translate the SQL code received into native blockchain code to transact updated payload data onto the blockchain for the customer record John Doe for the specified application. Note that when this occurs, the newest and latest information for customer record John Doe will now be reflected at the blockchain as the most up to date information and also at any materialized view of the same data, however, the old information for customer record John Doe remains within the blockchain as the blockchain records are immutable, thus creating an immutable audit trail which may be referenced at any time. Thus, any party with access rights to such data, can look back at prior blocks of the blockchain to determine what information was previously recorded for customer record John Doe, or in the case that customer record John Doe is deleted, such a change will be again reflected by the blockchain, but the old record itself remains immutably within the prior blocks of the blockchain, though the application will understand that such information is indicated as "deleted" and thus, the deleted record will not be referenced as live current data, but it always remains available, as per the inherent design of the DLT blockchain technology.

In alternative embodiments, the Apex code interface 1154 (shown at FIG. 11B) is utilized to translate SQL database queries into a native blockchain protocol, permitting the translated SQL query to then be executed against the blockchain and generate a result set, which is then translated back into an SQL compliant format and returned responsive to the SQL queries. In yet other embodiments, a smart contract engine performs transactions against the blockchain to retrieve the defined entities and defined fields and translates those into the materialized view which is then stored within the host organization database system 130, subsequent to which non-translated SQL queries may be executed to retrieve the blockchain data directly from the materialized view.

Because the application itself is declarative, as are the declared entities and the declared defined fields for those entities, all data constructs are wholly customizable and may be tailored to the particular needs of the business, subject only to consensus on the blockchain by the network participants or the participating nodes which operate on that particular blockchain.

None of the claims in the are intended to invoke paragraph six of 35 U.S.C. § 115 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system of a host organization, wherein the method comprises:
    operating a blockchain interface to a public blockchain on behalf of a plurality of customers of the host organization, wherein each of the plurality of customers operate as a participating node on the blockchain;
    executing an API gateway on behalf of the plurality of customers;
    receiving an API definition from one of the plurality of customers defining at least access permissions for use of the defined API and a plurality of permitted functions for the defined API;
    transacting a new asset onto the blockchain having embodied therein, metadata representing the API definition and the access permissions for use of the defined API and the plurality of permitted functions for the defined API;
    intercepting, via the executing API gateway, an API call directed at the defined API;
    retrieving the metadata from the blockchain;
    authenticating an API caller associated with the API call based on the access permissions from the retrieved metadata; and
    forwarding the API call to the appropriate customer pursuant to successful authentication of the API caller.

2. The method of claim 1, wherein the metadata is written to the blockchain upon the new asset having reached consensus from the participating nodes of the blockchain.

3. The method of claim 1, wherein access to the metadata from a non-responsive participating node on the blockchain is restored by requesting the metadata from a different participating node on the blockchain.

4. The method of claim 1, further comprising:
generating a GUI interface at the host organization based on the metadata for the defined API stored to the blockchain; and
publishing the generated GUI to the API caller to receive API call input; and
wherein intercepting the API call directed at the defined API comprises receiving the API call at the generated GUI and subjecting the API caller to authentication.

5. The method of claim 1, wherein intercepting the API call directed at the defined API comprises receiving the API call from a bot or system performing Machine to Machine (M2M) communications between a customer and an API gateway owner.

6. The method of claim 1, wherein authenticating the API caller comprises applying distributed Role-Based Access Control (RBAC) to the intercepted API call to authenticate the API caller based on one or more specific roles delegated to a user having originated the API call.

7. The method of claim 1:
wherein the host organization operates an access manager to delegate one or more specific roles to each of a plurality of users;
wherein the access manager registers the delegated one or more specific roles onto the blockchain by transacting metadata defining the delegated one or more specific roles onto the blockchain to be persistently stored.

8. The method of claim 1, wherein the host organization operates an AccessChain via the blockchain to apply and enforce distributed Role-Based Access Control (RBAC) for any API call received and intercepted; and
wherein the AccessChain is to perform an authorization check for a user having originated the incoming API call.

9. The method of claim 1:
wherein the API call is associated with a specific transaction type;
wherein the API call is received as a transaction at the blockchain and automatically triggers a smart contract based on the specific transaction type associated with the API call; and
wherein the smart contract is to perform an authorization check for a user having originated the incoming API call pursuant to defined distributed Role-Based Access Control (RBAC) having been previously written onto the blockchain.

10. The method of claim 1:
wherein the metadata written onto the blockchain within the new asset defines one or more delegated roles for a plurality of users; and
wherein the smart contract automatically triggers implements AccessChain functionality by executing the smart contract at the blockchain to perform an authorization check for a user having originated the incoming API call.

11. The method of claim 1:
wherein the API call intercepted at the API gateway is intercepted via a sidecar process tied to an API process executing the defined API;
wherein the sidecar is to perform an authorization check for a user having originated the incoming API call;
wherein the sidecar returns an access denied message or ignores the request in the event of a failed authentication attempt; and
wherein the sidecar forwards the API call intercepted at the API gateway to an application container for processing via application logic for handling an authenticated and successfully received API call.

12. The method of claim 1, wherein an AccessChain executing at the blockchain levies a cryptocurrency fee for all transactions intercepted at the API gateway which are successfully authenticated.

13. Non-transitory computer readable storage media having instructions stored thereon that, when executed by a system of a host organization having at least a processor and a memory therein, the instructions cause the system to perform the following operations:
operating a blockchain interface to a public blockchain on behalf of a plurality of customers of the host organization, wherein each of the plurality of customers operate as a participating node on the blockchain;
executing an API gateway on behalf of the plurality of customers;
receiving an API definition from one of the plurality of customers defining at least access permissions for use of the defined API and a plurality of permitted functions for the defined API;
transacting a new asset onto the blockchain having embodied therein, metadata representing the API definition and the access permissions for use of the defined API and the plurality of permitted functions for the defined API;
intercepting, via the executing API gateway, an API call directed at the defined API;
retrieving the metadata from the blockchain;
authenticating an API caller associated with the API call based on the access permissions from the retrieved metadata; and
forwarding the API call to the appropriate customer pursuant to successful authentication of the API caller.

14. The non-transitory computer readable storage media of claim 13, wherein the instruction, when executed by the processor, cause the system to perform operations further including:
generating a GUI interface at the host organization based on the metadata for the defined API stored to the blockchain; and
publishing the generated GUI to the API caller to receive API call input; and
wherein intercepting the API call directed at the defined API comprises receiving the API call at the generated GUI and subjecting the API caller to authentication.

15. The non-transitory computer readable storage media of claim 13, wherein intercepting the API call directed at the defined API comprises receiving the API call from a bot or system performing Machine to Machine (M2M) communications between a customer and an API gateway owner.

16. The non-transitory computer readable storage media of claim 13, wherein authenticating the API caller comprises applying distributed Role-Based Access Control (RBAC) to the intercepted API call to authenticate the API caller based on one or more specific roles delegated to a user having originated the API call.

17. The non-transitory computer readable storage media of claim 13:
wherein the host organization operates an access manager to delegate one or more specific roles to each of a plurality of users;
wherein the access manager registers the delegated one or more specific roles onto the blockchain by transacting metadata defining the delegated one or more specific roles onto the blockchain to be persistently stored.

18. The non-transitory computer readable storage media of claim 13:
  wherein the API call is associated with a specific transaction type;
  wherein the API call is received as a transaction at the blockchain and automatically triggers a smart contract based on the specific transaction type associated with the API call; and
  wherein the smart contract is to perform an authorization check for a user having originated the incoming API call pursuant to defined distributed Role-Based Access Control (RBAC) having been previously written onto the blockchain.

19. The non-transitory computer readable storage media of claim 13:
  wherein the metadata written onto the blockchain within the new asset defines one or more delegated roles for a plurality of users; and
  wherein the smart contract automatically triggers implements AccessChain functionality by executing the smart contract at the blockchain to perform an authorization check for a user having originated the incoming API call.

20. A system to execute at a host organization, wherein the system comprises:
  a memory to store instructions;
  a processor to execute instructions;
  wherein the system is configurable to execute the instructions via the processor to carry out operations including:
  operating a blockchain interface to a public blockchain on behalf of a plurality of customers of the host organization, wherein each of the plurality of customers operate as a participating node on the blockchain;
  executing an API gateway on behalf of the plurality of customers;
  receiving an API definition from one of the plurality of customers defining at least access permissions for use of the defined API and a plurality of permitted functions for the defined API;
  transacting a new asset onto the blockchain having embodied therein, metadata representing the API definition and the access permissions for use of the defined API and the plurality of permitted functions for the defined API;
  intercepting, via the executing API gateway, an API call directed at the defined API;
  retrieving the metadata from the blockchain;
  authenticating an API caller associated with the API call based on the access permissions from the retrieved metadata; and
  forwarding the API call to the appropriate customer pursuant to successful authentication of the API caller.

21. The system of claim 20, wherein the system is specially configured to execute instructions to perform operations further including:
  generating a GUI interface at the host organization based on the metadata for the defined API stored to the blockchain; and
  publishing the generated GUI to the API caller to receive API call input; and
  wherein intercepting the API call directed at the defined API comprises receiving the API call at the generated GUI and subjecting the API caller to authentication.

22. The system of claim 20, wherein an AccessChain executing at the blockchain levies a cryptocurrency fee for all transactions intercepted at the API gateway which are successfully authenticated.

* * * * *